US012567553B2

(12) United States Patent
Kawai et al.

(10) Patent No.: US 12,567,553 B2
(45) Date of Patent: Mar. 3, 2026

(54) PHOTOELECTRIC CONVERSION DEVICE, ELECTROMAGNETIC WAVE DETECTION DEVICE, PHOTOELECTRIC CONVERSION METHOD AND ELECTROMAGNETIC WAVE DETECTION METHOD

(71) Applicant: HAMAMATSU PHOTONICS K.K., Hamamatsu (JP)

(72) Inventors: Naoya Kawai, Hamamatsu (JP); Hideaki Yoshiara, Hamamatsu (JP); Simon Lehnskov Lange, Copenhagen NV (DK); Peter Uhd Jepsen, Copenhagen S (DK)

(73) Assignees: HAMAMATSU PHOTONICS K.K., Hamamatsu (JP); Danmarks Tekniske Universitet, Kongens (DK)

( * ) Notice: Subject to any disclaimer, the term of this patent is extended or adjusted under 35 U.S.C. 154(b) by 3 days.

(21) Appl. No.: 18/682,305

(22) PCT Filed: Aug. 5, 2022

(86) PCT No.: PCT/EP2022/072099
§ 371 (c)(1),
(2) Date: Feb. 8, 2024

(87) PCT Pub. No.: WO2023/016940
PCT Pub. Date: Feb. 16, 2023

(65) Prior Publication Data

US 2024/0363302 A1 Oct. 31, 2024

(30) Foreign Application Priority Data

Aug. 10, 2021 (EP) .................................... 21190608

(51) Int. Cl.
*H01J 31/26* (2006.01)
*H01J 40/06* (2006.01)
*H01J 40/14* (2006.01)

(52) U.S. Cl.
CPC .............. *H01J 31/26* (2013.01); *H01J 40/06* (2013.01); *H01J 40/14* (2013.01)

(58) Field of Classification Search
CPC .. H01J 31/26; H01J 40/06; H01J 40/14; H01J 43/06; H01J 43/08
See application file for complete search history.

(56) References Cited

U.S. PATENT DOCUMENTS 6,563,185 B2 * 5/2003 Moddel .................. H10N 60/10 257/E29.241
2007/0222693 A1 9/2007 Popa-Simil
(Continued)

FOREIGN PATENT DOCUMENTS

FR 2972094 A1 8/2012
JP H05-167343 A 7/1993

OTHER PUBLICATIONS

Lange, Simon L. et al., "A terahertz and infrared sensitive photo-multiplier tube with a fieldmixing photocathode," 2020 45th International Conference on Infrared, Millimeter, and Terahertz Waves (IRMMW-THZ), IEEE, Nov. 8, 2020, XP033885539.
(Continued)

*Primary Examiner* — Seung C Sohn
(74) *Attorney, Agent, or Firm* — Faegre Drinker Biddle & Reath LLP

(57) ABSTRACT

In a photoelectric conversion device, the meta-surface includes a first antenna portion, a first bias portion, a second antenna portion, and a second bias portion. The first antenna portion extends in a first direction and emits an electron in response to incidence of the electromagnetic wave. The first bias portion faces the first antenna portion and is configured
(Continued)

to generate an electric field having a component in the first direction between the first bias portion and the first antenna portion. The second antenna portion extends in a second direction intersecting the first direction and emits an electron in response to incidence of the electromagnetic wave. The second bias portion faces the second antenna portion and is configured to generate an electric field having a component in the second direction between the second bias portion and the second antenna portion.

18 Claims, 13 Drawing Sheets

(56) References Cited

U.S. PATENT DOCUMENTS

2016/0216201 A1 7/2016 Iwaszczuk et al.
2018/0151338 A1 5/2018 Conley

OTHER PUBLICATIONS

Turchetti, M. et al., "Low-Energy Optical Pulse Detection using Biased Plasmonic Nanoantennas," 2020 Conference on Lasers and Electro-Optics (CLEO), OSA, May 10, 2020, pp. 1-2, XP033822957.
Written Opinion of the International Searching Authority mailed Nov. 7, 2022 for PCT/EP2022/072099.
Lange S.L., "Terahertz-Enabled Ultrafast Electron Field Emission", DTU Library, DK, 2020, 40 Pages, p. 125-p. 162.

* cited by examiner

PHOTOELECTRIC CONVERSION DEVICE, ELECTROMAGNETIC WAVE DETECTION DEVICE, PHOTOELECTRIC CONVERSION METHOD AND ELECTROMAGNETIC WAVE DETECTION METHOD

TECHNICAL FIELD

An aspect of the present invention relates to a photoelectric conversion device, an electromagnetic wave detection device, a photoelectric conversion method and an electromagnetic wave detection method.

BACKGROUND

Typically there are four types of electron emission such as thermionic emission, photoelectric emission, secondary emission, and field emission. The thermionic emission is achieved by heating electrode. The photoelectric emission is achieved by application of photons. The secondary emission is achieved by bombarding light speed electron. The field emission is achieved in the presence of electrostatic field. US Patent Application Publication No. 2016/0216201 illustrates an electromagnetic wave detection system which detects an electromagnetic wave. The system includes a photoelectric conversion device which converts an electromagnetic wave into an electron. The photoelectric conversion device is provided with an electron emitter having a metamaterial structure. The system detects an electromagnetic wave entering the electron emitter.

SUMMARY

The electron emitter of the photoelectric conversion device mentioned above emits an electron in response to incidence of the electromagnetic wave. The system detects the entered electromagnetic wave, based on the electron emitted from the electron emitter. According to the system mentioned above, for example, a terahertz-wave can be detected.

There is a demand for detecting the polarization state of the entered electromagnetic wave. For detecting the polarization state, it is conceivable to use an optical system in which a polarizer and a detector are combined. For example, an optical system in which a wire grid and a detector are combined is used. However, when such an optical system is used, the structure of the device is complicated, and the cost of detecting the polarization state is high.

An object of an aspect of the present invention is to provide a photoelectric conversion device capable of easily achieving detection of the polarization state of an electromagnetic wave. An object of another aspect of the present invention is to provide an electromagnetic wave detection device capable of easily detecting the polarization state of an electromagnetic wave. An object of yet another aspect of the present invention is to provide a photoelectric conversion method capable of easily achieving detection of the polarization state of an electromagnetic wave. An object of another aspect of the present invention is to provide an electromagnetic wave detection method capable of easily detecting the polarization state of an electromagnetic wave.

A photoelectric conversion device according to an aspect of the present invention is provided with an electron emitter. The electron emitter includes a meta-surface emitting an electron in response to incidence of an electromagnetic wave. The meta-surface includes a first antenna portion, a first bias portion, a second antenna portion, and a second bias portion. The first antenna portion extends in a first direction and emits an electron in response to incidence of the electromagnetic wave. The first bias portion faces the first antenna portion and is configured to generate an electric field having a component in the first direction between the first bias portion and the first antenna portion. The second antenna portion extends in a second direction intersecting the first direction and emits an electron in response to incidence of the electromagnetic wave. The second bias portion faces the second antenna portion and is configured to generate an electric field having a component in the second direction between the second bias portion and the second antenna portion.

In this photoelectric conversion device, the first antenna portion and the second antenna portion extend in the first and second directions, which intersect with each other. The first bias portion is configured to generate an electric field having a component in the first direction between the first bias portion and the first antenna portion. The second bias portion is configured to generate an electric field having a component in the second direction between the second bias portion and the second antenna portion. According to such a configuration, the first antenna portion emits an electron according to the component in the first direction of the electric field strength of the entered electromagnetic wave. The second antenna portion emits an electron according to the component in the second direction of the electric field strength of the entered electromagnetic wave. As a result, there can be detected an electron emitted according to the component in the first direction of the electric field strength of the entered electromagnetic wave and an electron emitted according to the component in the second direction of the electric field strength of the entered electromagnetic wave. With the detection of them, detection of the polarization state of an electromagnetic wave can be easily achieved.

In the aspect mentioned above, the photoelectric conversion device may further include a potential control unit configured to control electric potentials applied to the meta-surface. The potential control unit may switch between a first state and a second state and switch between a third state and a fourth state by controlling the electric potentials applied to the meta-surface. In the first state, a component of an electric field from the first bias portion toward the first antenna portion in the first direction may be positive. In the second state, a component of an electric field from the first bias portion toward the first antenna portion in the first direction may be negative. In the third state, a component of an electric field from the second bias portion toward the second antenna portion in the second direction may be positive. In the fourth state, a component of an electric field from the second bias portion toward the second antenna portion in the second direction may be negative. In this case, when the electromagnetic wave enters the meta-surface in the first state, the electron is emitted from the first antenna portion according to the positive component in the first direction of the electric field strength of the entered electromagnetic wave. When the electromagnetic wave enters the meta-surface in the second state, the electron is emitted from the first antenna portion according to the negative component in the first direction of the electric field strength of the entered electromagnetic wave. When the electromagnetic wave enters the meta-surface in the third state, the electron is emitted from the second antenna portion according to the positive component in the second direction of the electric field strength of the entered electromagnetic wave. When the electromagnetic wave enters the meta-surface in the fourth state, the electron is emitted from the second antenna portion according to the negative component in the second direction of the electric field strength of the entered electromagnetic wave. Therefore, the photoelectric conversion device can achieve measurement of the electric field strength of the electromagnetic wave entering the electron emitter for each polarity in each of the first direction and the second direction by detecting the electron emitted from the meta-surface in each of the states. As a result, the detection of the polarization state of the electromagnetic wave can be achieved more accurately.

In the aspect mentioned above, the first antenna portion may include first and second leading ends which are disposed at mutually different positions in the first direction. The first bias portion may include a first portion and a second portion. The first portion may face the first leading end and generate an electric field having a component in the first direction between the first portion and the first leading end. The second portion may face the second leading end and generate an electric field having a component in the first direction between the second portion and the second leading end. The second antenna portion may include third and fourth leading ends which are disposed at mutually different positions in the second direction. The second bias portion may include a third portion and a fourth portion. The third portion may face the third leading end and generate an electric field having a component in the second direction between the third portion and the third leading end. The fourth portion may face the fourth leading end and generate an electric field having a component in the second direction between the fourth portion and the fourth leading end. In the first direction, the second portion, the second leading end, the first leading end, and the first portion may be disposed in this order. In the second direction, the fourth portion, the fourth leading end, the third leading end, and the third portion may be disposed in this order. In this case, the measurement of the electric field strength of the electromagnetic wave entering the electron emitter can be achieved for each polarity in each of the first direction and the second direction by detecting the electron emitted from the meta-surface, with a simple configuration.

In the aspect mentioned above, a potential control unit configured to control electric potentials applied to the meta-surface may be further included. The potential control unit may switch between a first state and a second state and switch between a third state and a fourth state by controlling the electric potentials applied to the meta-surface. In the first state, a component of the electric field from the first leading end toward the first portion in the first direction may be positive, a component of the electric field from the second portion toward the second leading end in the first direction may be positive, a component of the electric field from the third leading end toward the third portion in the second direction may be positive, and a component of the electric field from the fourth leading end toward the fourth portion in the second direction may be negative. In the second state, a component of the electric field from the first portion toward the first leading end in the first direction may be negative, a component of the electric field from the second leading end toward the second portion in the first direction may be negative, a component of the electric field from the third leading end toward the third portion in the second direction may be positive, and a component of the electric field from the fourth leading end toward the fourth portion in the second direction may be negative. In the third state, a component of the electric field from the first leading end toward the first portion in the first direction may be positive, a component of the electric field from the second leading end toward the second portion in the first direction may be negative, a component of the electric field from the third leading end toward the third portion in the second direction may be positive, and a component of the electric field from the fourth portion toward the fourth leading end in the second direction may be positive. In the fourth state, a component of the electric field from the first leading end toward the first portion in the first direction may be positive, a component of the electric field from the second leading end toward the second portion in the first direction may be negative, a component of the electric field from the third portion toward the third leading end in the second direction may be negative, and a component of the electric field from the fourth leading end toward the fourth portion in the second direction may be negative. In this case, when the electromagnetic wave enters the meta-surface in the first state, the electron is emitted from the first antenna portion according to the positive component in the first direction of the electric field strength of the entered electromagnetic wave, and the emission of electron according to the other component of the electric field strength of the entered electromagnetic wave is suppressed. When the electromagnetic wave enters the meta-surface in the second state, the electron is emitted from the first antenna portion according to the negative component in the first direction of the electric field strength of the entered electromagnetic wave, and the emission of electron according to the other component of the electric field strength of the entered electromagnetic wave is suppressed. When the electromagnetic wave enters the meta-surface in the third state, the electron is emitted from the second antenna portion according to the positive component in the second direction of the electric field strength of the entered electromagnetic wave, and the emission of electron according to the other component of the electric field strength of the entered electromagnetic wave is suppressed. When the electromagnetic wave enters the meta-surface in the fourth state, the electron is emitted from the second antenna portion according to the negative component in the second direction of the electric field strength of the entered electromagnetic wave, and the emission of electron according to the other component of the electric field strength of the entered electromagnetic wave is suppressed.

In the aspect mentioned above, a potential control unit configured to control electric potentials applied to the meta-surface may be further included. The potential control unit may switch between a first state and a second state and switch between a third state and a fourth state by controlling the electric potentials applied to the meta-surface. In the first state, an electric potential applied to the first portion may be lower than an electric potential applied to the first antenna portion, an electric potential applied to the second portion may be higher than the electric potential applied to the first antenna portion, an electric potential applied to the third portion may be lower than the electric potential applied to the second antenna portion, and an electric potential applied to the fourth portion may be lower than the electric potential applied to the second antenna portion. In the second state, the electric potential applied to the first portion may be higher than the electric potential applied to the first antenna portion, the electric potential applied to the second portion may be lower than the electric potential applied to the first antenna portion, the electric potential applied to the third portion may be lower than the electric potential applied to the second antenna portion, and the electric potential applied to the fourth portion may be lower than the electric potential applied to the second antenna portion. In the third state, the electric potential applied to the first portion may be lower than the electric potential applied to the first antenna portion, the electric potential applied to the second portion may be lower than the electric potential applied to the first antenna portion, the electric potential applied to the third portion may be lower than the electric potential applied to the second antenna portion, and the electric potential applied to the fourth portion may be higher than the electric potential applied to the second antenna portion. In the fourth state, the electric potential applied to the first portion may be lower than the electric potential applied to the first antenna portion, the electric potential applied to the second portion may be lower than the electric potential applied to the first antenna portion, the electric potential applied to the third portion may be higher than the electric potential applied to the second antenna portion, and the electric potential applied to the fourth portion may be lower than the electric potential applied to the second antenna portion. In this case, an electric potential difference occurs between the first leading end and the first portion, between the second leading end and the second portion, between the third leading end and the third portion, and between the fourth leading end and the fourth portion. An electric field is generated by the electric potential difference. As a result, when the electromagnetic wave enters the meta-surface in the first state, the electron is emitted from the first antenna portion according to the positive component in the first direction of the electric field strength of the entered electromagnetic wave, and the emission of electron according to the other component of the electric field strength of the entered electromagnetic wave is suppressed. When the electromagnetic wave enters the meta-surface in the second state, the electron is emitted from the first antenna portion according to the negative component in the first direction of the electric field strength of the entered electromagnetic wave, and the emission of electron according to the other component of the electric field strength of the entered electromagnetic wave is suppressed. When the electromagnetic wave enters the meta-surface in the third state, the electron is emitted from the second antenna portion according to the positive component in the second direction of the electric field strength of the entered electromagnetic wave, and the emission of electron according to the other component of the electric field strength of the entered electromagnetic wave is suppressed. When the electromagnetic wave enters the meta-surface in the fourth state, the electron is emitted from the second antenna portion according to the negative component in the second direction of the electric field strength of the entered electromagnetic wave, and the emission of electron according to the other component of the electric field strength of the entered electromagnetic wave is suppressed.

In the aspect mentioned above, the first direction and the second direction may be orthogonal to each other. The meta-surface may further include a third antenna portion and a third bias portion. The third antenna portion may extend in a third direction intersecting the first direction and the second direction and may emit an electron in response to incidence of the electromagnetic wave. The third bias portion may face the third antenna portion and be configured to generate an electric field having a component in the third direction between the third bias portion and the third antenna portion. According to such a configuration, the third antenna portion emits an electron according to the component in the third direction of the electric field strength of the entered electromagnetic wave. In this case, an electron emitted according to the component in the third direction of the electric field strength of the entered electromagnetic wave can be further detected. Therefore, the polarization state of the entered electromagnetic wave including circular polarization can be detected by a simple computation processing by detecting the electron emitted from the meta-surface.

In the aspect mentioned above, a potential control unit configured to control electric potentials applied to the meta-surface may be further included. The potential control unit may switch between the first state and the second state, switch between the third state and the fourth state, and switch between a fifth state and a sixth state by controlling the electric potentials applied to the meta-surface. In the first state, a component of an electric field from the first bias portion toward the first antenna portion in the first direction may be positive. In the second state, a component of an electric field from the first bias portion toward the first antenna portion in the first direction may be negative. In the third state, a component of an electric field from the second bias portion toward the second antenna portion in the second direction may be positive. In the fourth state, a component of an electric field from the second bias portion toward the second antenna portion in the second direction may be negative. In the fifth state, a component of an electric field from the third bias portion toward the third antenna portion in the third direction may be negative. In the sixth state, a component of an electric field from the third bias portion toward the third antenna portion in the third direction may be positive. In this case, when the electromagnetic wave enters the meta-surface in the first state, the electron is emitted from the first antenna portion according to the positive component in the first direction of the electric field strength of the entered electromagnetic wave. When the electromagnetic wave enters the meta-surface in the second state, the electron is emitted from the first antenna portion according to the negative component in the first direction of the electric field strength of the entered electromagnetic wave. When the electromagnetic wave enters the meta-surface in the third state, the electron is emitted from the second antenna portion according to the positive component in the second direction of the electric field strength of the entered electromagnetic wave. When the electromagnetic wave enters the meta-surface in the fourth state, the electron is emitted from the second antenna portion according to the negative component in the second direction of the electric field strength of the entered electromagnetic wave. When the electromagnetic wave enters the meta-surface in the fifth state, the electron is emitted from the second antenna portion according to the negative component in the third direction of the electric field strength of the entered electromagnetic wave. When the electromagnetic wave enters the meta-surface in the sixth state, the electron is emitted from the second antenna portion according to the positive component in the third direction of the electric field strength of the entered electromagnetic wave. Therefore, the photoelectric conversion device is capable of achieving the measurement of the electric field strength of the electromagnetic wave entering the electron emitter for each polarity in each of the first direction, the second direction, and the third direction by detecting the electron emitted from the meta-surface in each of the states.

In the aspect mentioned above, the photoelectric conversion device may be further provided with a housing configured to airtightly sealed and have a window unit transmitting the electromagnetic wave. The electron emitter may be disposed in the housing. In this case, an amount of emission of the electron in response to incidence of the electromagnetic wave can be improved by making the housing vacuum or filling the housing with gas.

An electromagnetic wave detection device according to the other aspect of the present invention is provided with the photoelectric conversion device mentioned above, a detection unit and a computing unit. The detection unit is configured to detect an electron emitted from the electron emitter. The computing unit is configured to compute polarization information of the electromagnetic wave based on a result of detection of the detection unit in the first state, a result of detection of the detection unit in the second state, a result of detection of the detection unit in the third state, and a result of detection of the detection unit in the fourth state. In this case, the electromagnetic wave detection device is capable of easily detecting the polarization state of an electromagnetic wave.

A photoelectric conversion method according to yet another aspect of the present invention is provided with a step of using a meta-surface including a first antenna portion extending a first direction, a first bias portion facing the first antenna portion, a second antenna portion extending in a second direction intersecting the first direction, and a second bias portion facing the second antenna portion, and emitting an electron from a first antenna portion in a state where an electric field having a component in the first direction is generated between the first bias portion and the first antenna portion in response to incidence of an electromagnetic wave to be measured on the meta-surface, and a step of using the meta-surface and emitting an electron from the second antenna portion in a state where an electric field having a component in the second direction is generated between the second bias portion and the second antenna portion in response to incidence of an electromagnetic wave to be measured on the meta-surface. The first antenna portion extends in the first direction. The first bias portion faces the first antenna portion. The second antenna portion extends in the second direction intersecting the first direction. The second bias portion faces the second antenna portion.

In the photoelectric conversion method, an electron is emitted from the first antenna portion when the electromagnetic wave to be measured enters the meta-surface in a state where an electric field having a component in the first direction is generated between the first bias portion and the first antenna portion. An electron is emitted from the second antenna portion when the electromagnetic wave to be measured enters the meta-surface in a state where an electric field having a component in the second direction is generated between the second bias portion and the second antenna portion. In this case, the first antenna portion emits an electron according to the component in the first direction of the electric field strength of the entered electromagnetic wave. The second antenna portion emits an electron according to the component in the second direction of the electric field strength of the entered electromagnetic wave. As a result, there can be detected an electron emitted according to the component in the first direction of the electric field strength of the entered electromagnetic wave and an electron emitted according to the component in the second direction of the electric field strength of the entered electromagnetic wave. According to the detection of them, detection of the polarization state of an electromagnetic wave can be easily achieved.

In yet another aspect mentioned above, the step of emitting an electron from the first antenna portion may be provided with a first electron emission step and a second electron emission step. In the first electron emission step, in the first state, an electron may be emitted from the first antenna portion in response to incidence of an electromagnetic wave to be measured on the meta-surface. In the first state, the electric potentials may be applied to the meta-surface in such a manner that the component of the electric field from the first bias portion toward the first antenna portion in the first direction is positive. In the second electron emission step, in the second state, an electron may be emitted from the first antenna portion in response to incidence of an electromagnetic wave to be measured on the meta-surface. In the second state, the electric potentials may be applied to the meta-surface in such a manner that the component of the electric field from the first bias portion toward the first antenna portion in the first direction is negative. The step of emitting an electron from the second antenna portion may be provided with a third electron emission step and a fourth electron emission step. In the third electron emission step, in the third state, an electron may be emitted from the second antenna portion in response to incidence of an electromagnetic wave to be measured on the meta-surface. In the third state, the electric potentials may be applied to the meta-surface in such a manner that the component of the electric field from the second bias portion toward the second antenna portion in the second direction is positive. In the fourth electron emission step, in the fourth state, an electron may be emitted from the second antenna portion in response to incidence of an electromagnetic wave to be measured on the meta-surface. In the fourth state, the electric potentials may be applied to the meta-surface in such a manner that the component of the electric field from the second bias portion toward the second antenna portion in the second direction is negative. In this case, in the first state, a component of an electric field from the first bias portion toward the first antenna portion in the first direction is positive. Therefore, when the electromagnetic wave enters the meta-surface in the first state, the electron is emitted from the first antenna portion according to the positive component in the first direction of the electric field strength of the entered electromagnetic wave. In the second state, a component of an electric field from the first bias portion toward the first antenna portion in the first direction is negative. Therefore, when the electromagnetic wave enters the meta-surface in the second state, the electron is emitted from the first antenna portion according to the negative component in the first direction of the electric field strength of the entered electromagnetic wave. In the third state, a component of an electric field from the second bias portion toward the second antenna portion in the second direction is positive. Therefore, when the electromagnetic wave enters the meta-surface in the third state, the electron is emitted from the second antenna portion according to the positive component in the second direction of the electric field strength of the entered electromagnetic wave. In the fourth state, a component of an electric field from the second bias portion toward the second antenna portion in the second direction is negative. Therefore, when the electromagnetic wave enters the meta-surface in the fourth state, the electron is emitted from the second antenna portion according to the negative component in the second direction of the electric field strength of the entered electromagnetic wave. Therefore, according to the photoelectric conversion method, measurement of the electric field strength of the electromagnetic wave entering the electron emitter can be achieved for each polarity in each of the first direction and the second direction by detecting the electron emitted from the meta-surface in each of the states.

In yet another aspect mentioned above, the first direction and the second direction may be orthogonal to each other. The meta-surface may further include a third antenna portion and a third bias portion. The third antenna portion may extend in the third direction intersecting the first direction and the second direction. The third bias portion may face the third antenna portion. The photoelectric conversion method may be further provided with a step of emitting an electron from the third antenna portion in response to incidence of an electromagnetic wave to be measured on the meta-surface. In this case, the third antenna portion emits an electron according to the component in the third direction of the electric field strength of the entered electromagnetic wave. Therefore, there can be detected an electron emitted according to the component in the third direction of the electric field strength of the entered electromagnetic wave. Therefore, the polarization state of the entered electromagnetic wave including circular polarization can be detected by a simple computation processing by detecting the electron emitted from the meta-surface.

In yet another aspect mentioned above, the step of emitting an electron from the first antenna portion may be provided with a first electron emission step and a second electron emission step. In the first electron emission step, in the first state, an electron may be emitted from the first antenna portion in response to incidence of an electromagnetic wave to be measured on the meta-surface. In the first state, the electric potentials may be applied to the meta-surface in such a manner that the component of the electric field from the first bias portion toward the first antenna portion in the first direction is positive. In the second electron emission step, in the second state, an electron may be emitted from the first antenna portion in response to incidence of an electromagnetic wave to be measured on the meta-surface. In the second state, the electric potentials may be applied to the meta-surface in such a manner that the component of the electric field from the first bias portion toward the first antenna portion in the first direction is negative. The step of emitting an electron from the second antenna portion may be provided with a third electron emission step and a fourth electron emission step. In the third electron emission step, in the third state, an electron may be emitted from the second antenna portion in response to incidence of an electromagnetic wave to be measured on the meta-surface. In the third state, the electric potentials may be applied to the meta-surface in such a manner that the component of the electric field from the second bias portion toward the second antenna portion in the second direction is positive. In the fourth electron emission step, in the fourth state, an electron may be emitted from the second antenna portion in response to incidence of an electromagnetic wave to be measured on the meta-surface. In the fourth state, the electric potentials may be applied to the meta-surface in such a manner that the component of the electric field from the second bias portion toward the second antenna portion in the second direction is negative. The step of emitting an electron from the third antenna portion may be provided with a fifth electron emission step and a sixth electron emission step. In the fifth electron emission step, in the fifth state, an electron may be emitted from the third antenna portion in response to incidence of an electromagnetic wave to be measured on the meta-surface. In the fifth state, the electric potentials may be applied to the meta-surface in such a manner that the component of the electric field from the third bias portion toward the third antenna portion in the third direction is positive. In the sixth electron emission step, in the sixth state, an electron may be emitted from the third antenna portion in response to incidence of an electromagnetic wave to be measured on the meta-surface. In the sixth state, the electric potentials may be applied to the meta-surface in such a manner that the component of the electric field from the third bias portion toward the third antenna portion in the third direction is negative. Therefore, when the electromagnetic wave enters the meta-surface in the fifth state, the electron is emitted from the second antenna portion according to the positive component in the third direction of the electric field strength of the entered electromagnetic wave. Therefore, when the electromagnetic wave enters the meta-surface in the sixth state, the electron is emitted from the second antenna portion according to the negative component in the third direction of the electric field strength of the entered electromagnetic wave. Therefore, measurement of the electric field strength of the electromagnetic wave entering the electron emitter can be achieved for each polarity in each of the first direction, the second direction, and the third direction by detecting the electron emitted from the meta-surface in each of the states.

An electromagnetic wave detection method according to yet another aspect of the present invention is provided with the photoelectric conversion method mentioned above, and is further provided with a first detection step, a second detection step, a third detection step, a fourth detection step, and a computing step. In the first detection step, an electron emitted from an electron emitter in a first electron emission step is detected. In the second detection step, an electron emitted from the electron emitter in a second electron emission step is detected. In the third detection step, an electron emitted from the electron emitter in a third electron emission step is detected. In the fourth detection step, an electron emitted from the electron emitter in a fourth electron emission step is detected. In the computing step, polarization information of an electromagnetic wave is computed based on results of detection in the first detection step, the second detection step, the third detection step, and the fourth detection step. In this case, the polarization state of an electromagnetic wave can easily be detected.

According to an aspect of the present invention, it is possible to provide a photoelectric conversion device capable of easily achieving detection of the polarization state of an electromagnetic wave. According to another aspect of the present invention, it is possible to provide an electromagnetic wave detection device capable of easily detecting the polarization state of an electromagnetic wave. According to yet another aspect of the present invention, it is possible to provide a photoelectric conversion method capable of easily achieving detection of the polarization state of an electromagnetic wave. According to yet another aspect of the present invention, it is possible to provide an electromagnetic wave detection method capable of easily detecting the polarization state of an electromagnetic wave.

DETAILED DESCRIPTION

Figure 1:
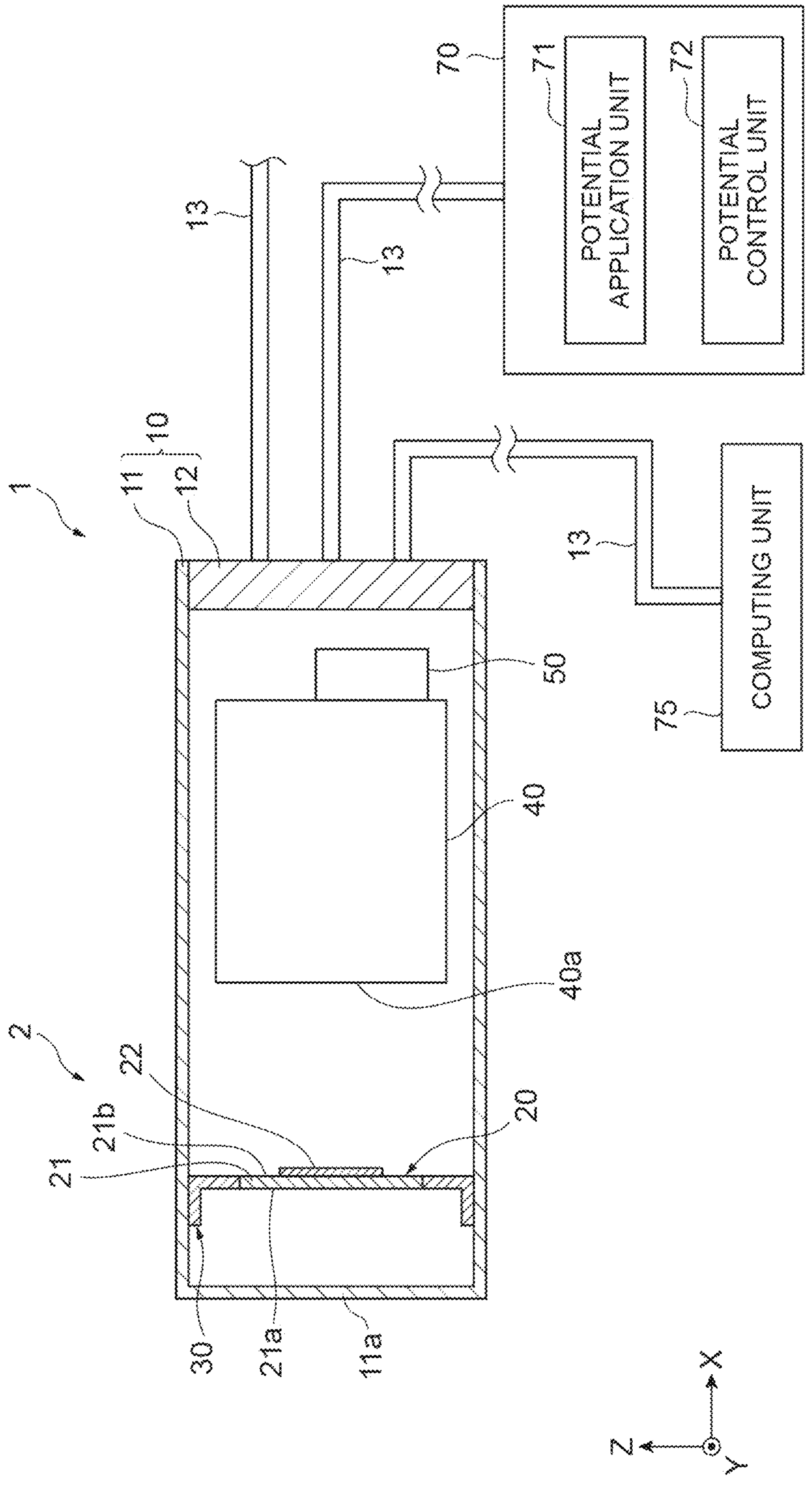
FIG. 1 is a perspective view of the electromagnetic wave detection device according to the present embodiment.

Hereinafter, an embodiment of the present invention will be described in detail with reference to the accompanying drawings. In the following description, the same elements or corresponding elements will be denoted with the same reference numerals and a redundant explanation will be omitted.

First, a configuration of an electromagnetic wave detection device according to the present embodiment will be described with reference to FIG. 1. FIG. 1 is a perspective view of the electromagnetic wave detection device according to the present embodiment.

An electromagnetic wave detection device 1 detects an entered electromagnetic wave. The electromagnetic wave detection device 1 includes a photoelectric conversion device 2. The photoelectric conversion device 2 emits an electron in response to incidence of the electromagnetic wave. In the present specification, the term "light" includes the other electromagnetic waves than a visible light. In the present embodiment, the electromagnetic wave detection device 1 detects the entered electromagnetic wave based on the electron emitted from the photoelectric conversion device 2 in response to incidence of the electromagnetic wave. The photoelectric conversion device 2 emits the electron, for example, in response to the incidence of the electromagnetic wave having a range of wavelength between a so-called millimeter wave and an infrared light. The range of wavelength between the millimeter wave and the infrared light corresponds, for example, to a frequency range between about 0.01 and 150 THz. In the present specification, the term "range of wavelength" may include a range of a plurality of wavelength regions separated from each other, or may be a range of one continuous wavelength region. The photoelectric conversion device 2 emits an electron by a field electron emission (field emission), for example.

The electromagnetic wave detection device 1 is, for example, an electron tube which outputs an electric signal in response to incidence of an electromagnetic wave. For example, the electromagnetic wave detection device 1 emits an electron in response to incidence of the electromagnetic wave, detects the emitted electron and outputs an electric signal based of the result of detection, in an inner portion of the electron tube. The electron tube is, for example, a photomultiplier tube (PMT). The electromagnetic wave detection device 1 emits the electron in the inner portion when the electromagnetic wave enters, and multiplies the emitted electron. According to a modification of the present embodiment, the electromagnetic wave detection device 1 may not be provided with a configuration for detecting the electron in the electron tube. In other words, the electromagnetic wave detection device 1 may be provided with an electron tube emitting the electron to an outer portion in response to incidence of the electromagnetic wave as the photoelectric conversion device 2, and may be provided with a detection unit detecting the electron emitted from the electron tube in an outer portion of the electron tube.

The electromagnetic wave detection device 1 is provided with a housing 10, an electron emitter 20, a holder 30, an electron multiplying unit 40, an electron collecting unit 50, a power supply unit 70, and a computing unit 75. The electron emitter 20, the holder 30, the electron multiplying unit 40 and the electron collecting unit 50 are disposed in the housing 10. The photoelectric conversion device 2 is provided with the housing 10, the electron emitter 20 and the power supply unit 70, and configures a part of the electromagnetic wave detection device 1.

The housing 10 has a valve 11 and a stem 12. The inner portion of the housing 10 is airtightly sealed by the valve 11 and the stem 12. In the present embodiment, the inner portion of the housing 10 is held in a vacuum. The vacuum in the housing 10 may not be an absolute vacuum, but may be a state where the housing is filled with gas having a lower pressure than an atmospheric pressure. For example, the inner portion of the housing 10 is held at $1\times10^{-4}$ to $1\times10^{-7}$ Pa.

The valve 11 includes a window unit 11*a* having an electromagnetic wave transparency. In the present specification, the term "electromagnetic wave transparency" means a property of transmitting at least a partial frequency range of wavelength of the range of wavelength of the entered electromagnetic wave. In the present embodiment, the housing 10 has a circular cylindrical shape. The housing 10 extends in a X-axis direction as illustrated in FIG. 1. The stem 12 configures a bottom surface of the housing 10. The stem 12 configures, for example, one end surface of the housing 10 in the X-axis direction. The valve 11 configures a side surface of the housing 10 and a bottom surface facing the stem 12. The X-axis, Y-axis, and Z-axis are orthogonal to one another.

The window unit 11*a* configures a bottom surface facing the stem 12. For example, the window unit 11*a* is formed into a circular shape as viewed from the X-axis direction while setting a direction of YZ axis to a diametrical direction. A frequency characteristic of transmittance of the electromagnetic wave is different depending on a material. Therefore, the window unit 11*a* is configured by an appropriate material depending on a frequency range of the electromagnetic wave entering the housing 10. For example, the window unit 11*a* includes at least one selected from quartz, silicon, germanium, sapphire, zinc selenide, zinc sulfide, magnesium fluoride, lithium fluoride, barium fluoride, calcium fluoride, magnesium oxide, calcium carbonate, diamond and chalcogenide glass. Therefore, an electromagnetic wave having an arbitrary frequency range between millimeter wave and infrared light can be guided into the inner portion of the housing 10. For example, the quartz is suitable for a material of a member transmitting an electromagnetic wave having a frequency range of 0.1 to 5 THz, the silicon is suitable for a material of a member transmitting an electromagnetic wave having a frequency range of 0.04 to 11 THz and 46 THz or more, the magnesium fluoride is suitable for a material of a member transmitting an electromagnetic wave having a frequency range of 40 THz or more, the germanium is suitable for a material of a member transmitting an electromagnetic wave having a frequency range of 13 THz or more, and the zinc selenide is suitable for a material of a member transmitting an electromagnetic wave having a frequency range of 14 THz or more.

The housing 10 further has a plurality of wires 13 for enabling electrical connection between an outer portion and an inner portion of the housing 10. The plurality of wires 13 are, for example, lead wires or pins. In the present embodiment, the plurality of wires 13 are pins penetrating the stem 12 and extend from the inner portion of the housing 10 to the outer portion thereof. At least one of the plurality of wires 13 is connected to various members provided in the inner portion of the housing 10.

The electron emitter 20 emits the electron in response to incidence of the electromagnetic wave. The electron emitter 20 is provided with a supporting body 21. The supporting body 21 has, for example, a plate shape. The supporting body 21 is formed, for example, into a rectangular shape in plan view. The supporting body 21 has a principal surface 21*a* and a principal surface 21*b* facing each other. The principal surface 21*a* and the principal surface 21*b* are surfaces of the supporting body 21 which are positioned in opposite sides to each other. The principal surface 21*a* and the principal surface 21*b* are, for example, flat surfaces, and are formed into a rectangular shape in plan view. The principal surface 21*a* and the principal surface 21*b* are disposed in parallel to the window unit 11*a*. The principal surface 21*a* faces the window unit 11*a*. The electromagnetic wave passing through the window unit 11*a* enters the principal surface 21*a*.

The supporting body 21 has an electromagnetic wave transparency with respect to the electromagnetic wave passing through the window unit 11*a*. As a result, the supporting body 21 transmits at least partial frequency range of the electromagnetic wave passing through the window unit 11*a*. The supporting body 21 can be made of the same material as that of the window unit 11*a*. The material of the supporting body 21 includes, for example, silicon. In one photoelectric conversion device 2, the supporting body 21 and the window unit 11*a* may not be made of the same material. The supporting body 21 is spaced away from the window unit 11*a* and the electron multiplying unit 40.

The electron emitter 20 includes a meta-surface 22. The meta-surface 22 is provided in the supporting body 21. The meta-surface 22 emits the electron in response to incidence of the electromagnetic wave. For example, the meta-surface 22 has a sensitivity for the electromagnetic wave in a range of wavelength between the so-called millimeter wave and the infrared light. The meta-surface 22 also has a sensitivity for terahertz-wave. The range of wavelength of the terahertz-wave corresponds to a frequency range between 100 GHz and 30 THz. The term "having a sensitivity for an electromagnetic wave" means that an electron is emitted in response to incidence of the electromagnetic wave.

For example, the meta-surface 22 includes an oxide layer formed on the principal surface 21*b* of the supporting body 21, and a metal layer formed on the oxide layer. The material of the oxide layer includes, for example, silicon dioxide and titanium oxide. For example, the oxide layer includes a layer including the silicon dioxide, and a layer including the titanium oxide. The material of the metal layer includes, for example, gold. In the present embodiment, the oxide layer is formed on the principal surface 21*b* of the supporting body 21 made of quartz, and the metal layer is formed on the oxide layer. For example, a thickness of the supporting body 21 is 525 μm, a thickness of the layer including the silicon diode in the meta-surface 22 is 1 μm, a thickness of the layer including the titanium dioxide in the meta-surface 22 is 10 nm, and a thickness of the metal layer in the meta-surface 22 is 200 nm. The meta-surface 22 has a rectangular shape in plan view. In the modification of the present embodiment, the meta-surface 22 may be provided on the principal surface 21*a*.

The holder 30 holds the electron emitter 20 in the inner portion of the housing 10. The holder 30 is positioned to the inner surface 10*a* of the housing 10. The holder 30 positions the electron emitter 20 for the housing 10. The holder 30 has a frame shape along the inner surface 10*a* of the housing 10, and a penetration opening is formed in the holder 30. The meta-surface 22 of the electron emitter 20 is disposed in an inner side of an edge defining the penetration opening as seen from an orthogonal direction to the principal surfaces 21*a* and 21*b* of the electron emitter 20.

The electron multiplying unit 40 is disposed in the inner portion of the housing 10, and has an incidence surface 40*a* on which the electron emitted from the electron emitter 20 enters. The electron multiplying unit 40 multiplies the electron entering the incidence surface 40*a*. In the present embodiment, the principal surface 21*b* of the electron emitter 20 faces the incidence surface 40*a* of the electron multiplying unit 40. The meta-surface 22 faces the incidence surface 40*a* of the electron multiplying unit 40, and the electron emitted from the meta-surface 22 enters the incidence surface 40*a*. The principal surface 21*a* of the electron emitter 20 faces the window unit 11*a* of the housing 10. The electron multiplying unit 40 has, for example, multistage dynodes.

The electron collecting unit 50 is disposed in the inner portion of the housing 10, and collects the electron which is multiplied by the electron multiplying unit 40. The electron collecting unit 50 is a detection unit detecting the electron emitted from the electron emitter 20. The electromagnetic wave detection device 1 detects the electromagnetic wave by detecting the electron in the electron collecting unit 50. In the present embodiment, for example, the electron collecting unit 50 has an anode to which one of a plurality of wires 13 is connected. A predetermined electric potential is applied to the anode through the wire 13. The anode catches the electron which is multiplied by the dynodes of the electron multiplying unit 40. The electron collecting unit 50 may have a diode in place of the anode.

In the present embodiment, the meta-surface 22 is of an active type and is operated by application of bias voltage. The meta-surface 22 is operated by application of electric potentials by means of the power supply unit 70. The power supply unit 70 is electrically connected to the meta-surface 22. The power supply unit 70 includes a potential application unit 71 and a potential control unit 72. The potential application unit 71 applies the electric potential to the meta-surface 22. The potential control unit 72 controls the potential application unit 71. The electric potentials applied to the meta-surface 22 are controlled by the potential control unit 72. The meta-surface 22 is operated in response to the electric potential controlled by the potential control unit 72. In other words, the meta-surface 22 emits the electron in response to the control of electric potential by the potential control unit 72.

The computing unit 75 acquires a result of detection in the electron collecting unit 50, and computes information relating to an electric field strength of an electromagnetic wave based on the result of detection. For example, the computing unit 75 acquires an electric signal based on the electron collected in the electron collecting unit 50 as the result of detection. The information relating to the electric field strength of the electromagnetic wave to be computed may be the electric field strength itself. The computing unit 75 computes the polarization information of the electromagnetic wave based on the information relating to the electric field strength of the electromagnetic wave. The "polarization information" is information relating the "polarization state". For example, the computing unit 75 computes the polarization direction of linear polarization. For example, the computing unit 75 outputs and displays the information relating to the computed electric field strength and the polarization information on a display unit which is not illustrated.

The potential control unit 72 and the computing unit 75 are one computer or a plurality of computers, for example, constructed by a hardware and a software such as programs. The potential control unit 72 and the computing unit 75 are provided, for example, with a processor, a main storage unit, an auxiliary storage unit, a communication device and an input device, as the hardware. The processor executes an operating system and an application program. The main storage is constructed by Read Only Memory (ROM) and Random Access Memory (RAM). The auxiliary storage unit is a storage medium which is constructed by a hard disc and a flash memory. The auxiliary storage unit generally stores a larger amount of data than the main storage unit. The communication device is constructed by a network card or a wireless communication module. The input device is constructed by a keyboard, a mouse and a touch panel. The potential control unit 72 and the computing unit 75 may be integrally configured or may be separated.

[Configuration of Photoelectric Conversion Device]

Figure 2:
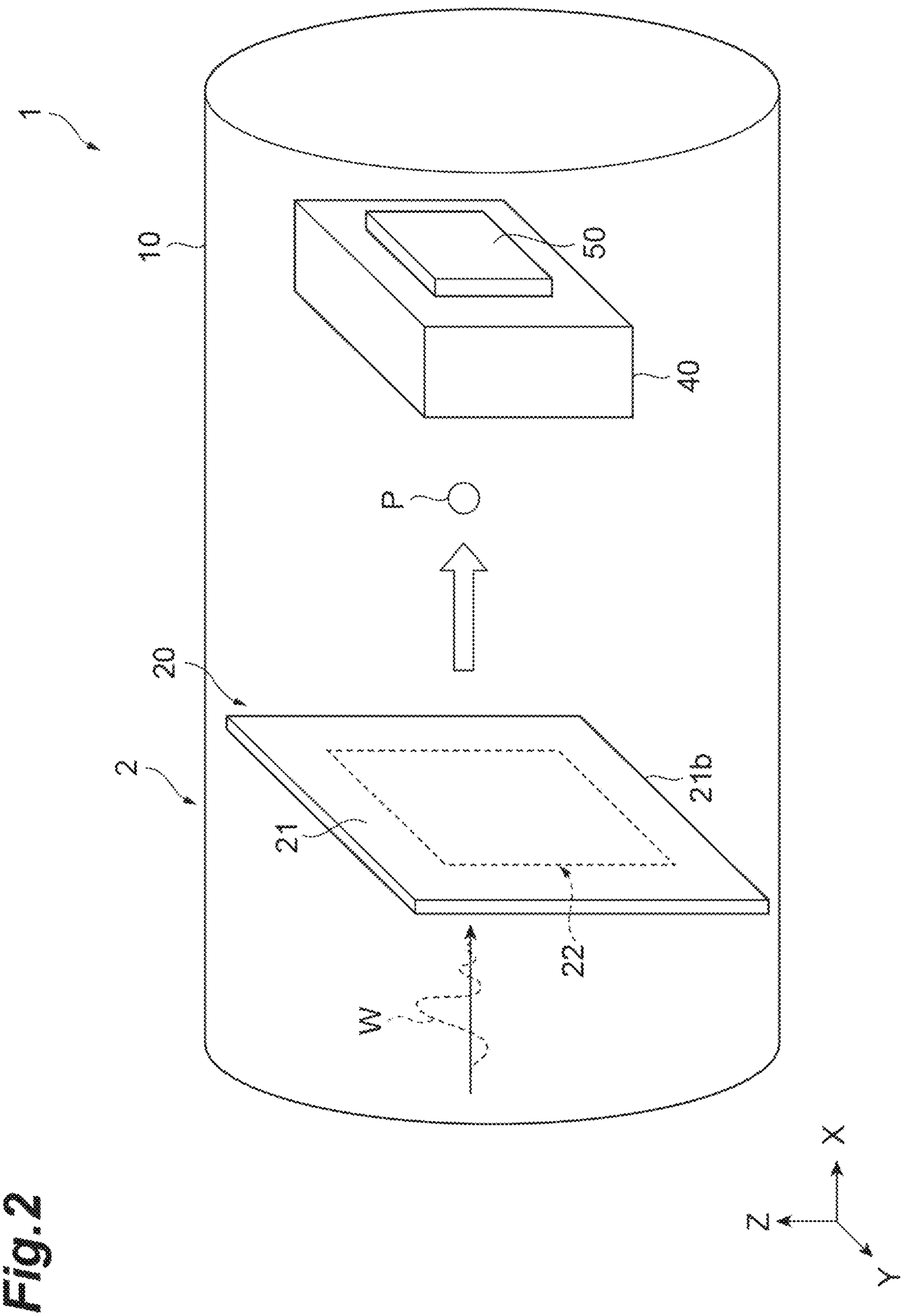
FIG. 2 is a schematic view of the photoelectric conversion device.
Figure 3:
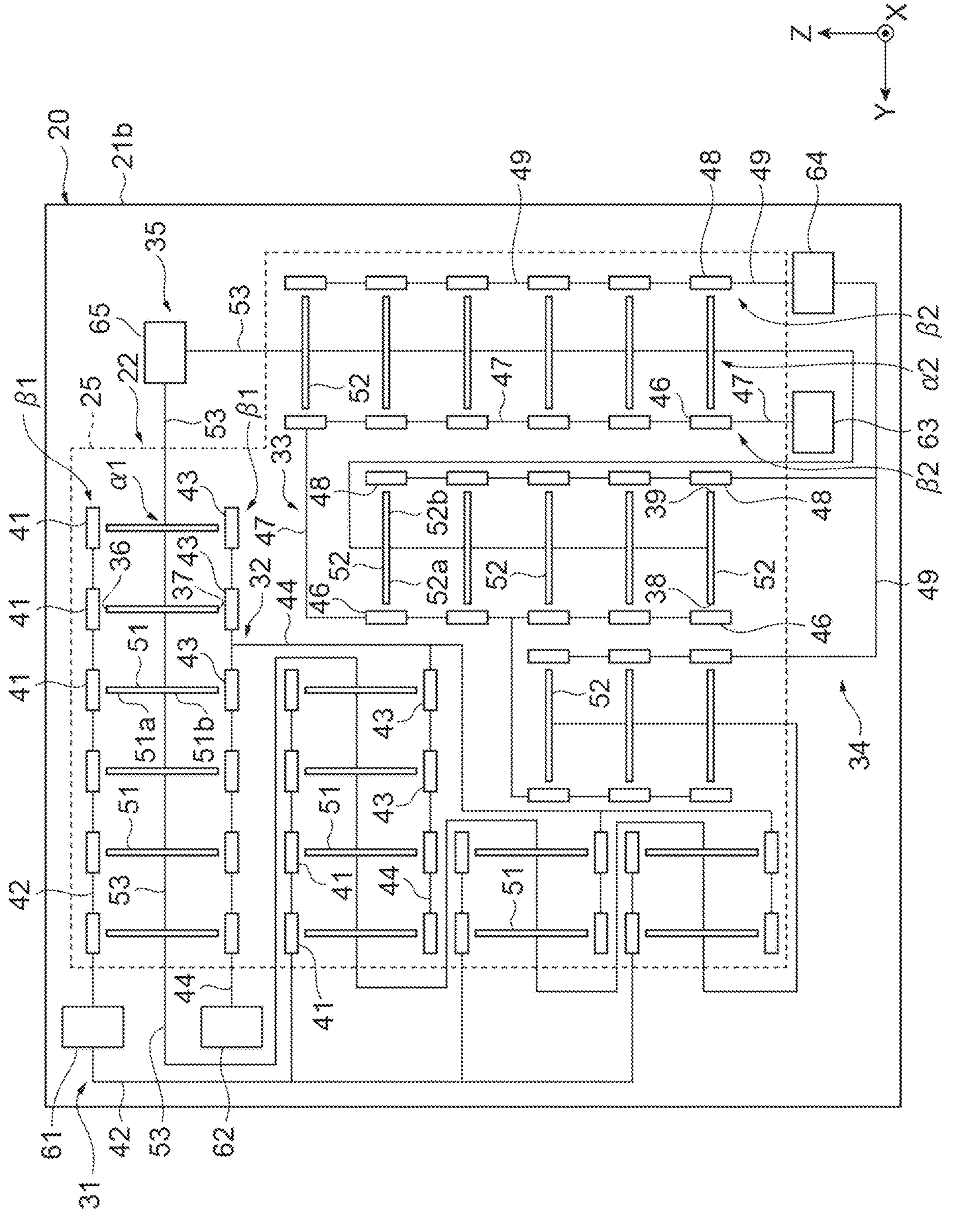
FIG. 3 is a plan view of an electron emitter.

Next, the photoelectric conversion device 2 will be described further in detail with reference to FIGS. 2 and 3. FIG. 2 is a schematic view of the photoelectric conversion device. FIG. 3 is a plan view of an electron emitter in the photoelectric conversion device.

In the example illustrated in FIG. 2, an electromagnetic wave W entering the housing 10 enters the meta-surface 22, and the meta-surface 22 emits an electron P in response to incidence of the electromagnetic wave W. An electric field strength of the electromagnetic wave W includes a component in a Y-axis direction and a component in a Z-axis direction. An electron P emitted from the meta-surface 22 enters the electron multiplying unit 40. The electron multiplied in the electron multiplying unit 40 is collected in the electron collecting unit 50. For example, when the Z-axis direction corresponds to the first direction, the Y-axis direction corresponds to the second direction.

As illustrated in FIG. 3, the meta-surface 22 includes at least one photoelectric conversion unit 25. The photoelectric conversion unit 25 emits the electron P in response to incidence of the electromagnetic wave W having a corresponding wavelength. For example, the photoelectric conversion unit 25 has a sensitivity for a frequency range around a center frequency of 0.5 THz. For example, the photoelectric conversion unit 25 has a sensitivity for components of the electric field of the electromagnetic wave W in the Y-axis direction and the Z-axis direction. A state where the photoelectric conversion unit 25 has a sensitivity for the positive component in the Y-axis direction, a state where the photoelectric conversion unit 25 has a sensitivity for the negative component in the Y-axis direction, a state where the photoelectric conversion unit 25 has a sensitivity for the positive component in the Z-axis direction, and a state where the photoelectric conversion unit 25 has a sensitivity for the negative component in the Z-axis direction are switched according to the electric potential control by the potential control unit 72. The frequency range and the directional component of the electric field for which the photoelectric conversion unit 25 has the sensitivity are not limited to the above.

As illustrated in FIG. 3, the meta-surface 22 includes a plurality of patterns 31, 32, 33, 34, and 35 which are spaced away from each other. The frequency range and the directional component of the electric field for which the photoelectric conversion unit 25 has the sensitivity depends on the configurations of the plurality of patterns 31, 32, 33, 34, and 35. The term "configuration" includes various attributes such as a shape and a material. The term "shape" also includes a size. The patterns 31 and 32 each include a bias portion $\beta\mathbf{1}$. The patterns 33 and 34 each include a bias portion $\beta\mathbf{2}$. The pattern 35 includes an antenna portion $\alpha\mathbf{1}$ and an antenna portion $\alpha\mathbf{2}$. In each of the antenna portions $\alpha\mathbf{1}$ and $\alpha\mathbf{2}$, the smaller the size of the antenna portions $\alpha\mathbf{1}$ and $\alpha\mathbf{2}$ are, the more the field electron emission tends to be generated for the electromagnetic wave having short wavelength, that is, the electromagnetic wave having a great frequency. The antenna portion $\alpha\mathbf{1}$ and the antenna portion $\alpha\mathbf{2}$ have a sensitivity for mutually different directional components. The antenna portion $\alpha\mathbf{1}$ has a sensitivity for the Z-axis directional component. The antenna portion $\alpha\mathbf{2}$ has a sensitivity for the Y-axis directional component. For example, when the antenna portion $\alpha\mathbf{1}$ corresponds to the first antenna portion, the antenna portion $\alpha\mathbf{2}$ corresponds to the second antenna portion. When the bias portion $\beta\mathbf{1}$ corresponds to the first bias portion, the bias portion $\beta\mathbf{2}$ corresponds to the second bias portion.

The antenna portions $\alpha\mathbf{1}$ and $\alpha\mathbf{2}$ emit the electron P in response to incidence of the electromagnetic wave W. The antenna portion $\alpha\mathbf{1}$ extends in the Z-axis direction. The bias portion $\beta\mathbf{1}$ faces the antenna portion $\alpha\mathbf{1}$. The bias portion $\beta\mathbf{1}$ is configured to generate an electric field having a component in the Z-axis direction between the bias portion $\beta\mathbf{1}$ and the corresponding antenna portion $\alpha\mathbf{1}$ when the bias electric potential is applied. In the present embodiment, the bias portion $\beta\mathbf{1}$ generates an electric field in the Z-axis direction between the bias portion $\beta\mathbf{1}$ and the antenna portion $\alpha\mathbf{1}$. When a higher electric potential than the antenna portion $\alpha\mathbf{1}$ is applied to the bias portion $\beta\mathbf{1}$, an electric potential barrier in the leading end portion of the bias portion $\beta\mathbf{1}$ side in the antenna portion $\alpha\mathbf{1}$ becomes thin. When a lower electric potential than the antenna portion $\alpha\mathbf{1}$ is applied to the bias portion $\beta\mathbf{1}$, the electric potential barrier in the leading end portion of the bias portion $\beta\mathbf{1}$ side in the antenna portion $\alpha\mathbf{1}$ becomes thick.

The antenna portion $\alpha\mathbf{2}$ extends in the Y-axis direction. The bias portion $\beta\mathbf{2}$ faces the antenna portion $\alpha\mathbf{2}$. The bias portion $\beta\mathbf{2}$ is configured to generate an electric field having a component in the Y-axis direction between the bias portion $\beta\mathbf{2}$ and the corresponding antenna portion $\alpha\mathbf{2}$ when the bias electric potential is applied. In the present embodiment, the bias portion $\beta\mathbf{2}$ generates an electric field in the Y-axis direction between the bias portion $\beta\mathbf{2}$ and the antenna portion $\alpha\mathbf{2}$. When a higher electric potential than the antenna portion $\alpha\mathbf{2}$ is applied to the bias portion $\beta\mathbf{2}$, an electric potential barrier in the leading end portion of the bias portion $\beta\mathbf{2}$ side in the antenna portion $\alpha\mathbf{2}$ becomes thin. When a lower electric potential than the antenna portion $\alpha\mathbf{2}$ is applied to the bias portion $\beta\mathbf{2}$, the electric potential barrier in the leading end portion of the bias portion $\beta\mathbf{2}$ side in the antenna portion $\alpha\mathbf{2}$ becomes thick. A state where a higher electric potential than the antenna portion is applied to the bias portion is called as "forward bias". A state where a lower electric potential than the antenna portion is applied to the bias portion is called as "reverse bias".

When the electromagnetic wave W enters the antenna portions α1 and α2, the electric field is induced around the antenna portions α1 and α2. The electric potential barrier at the antenna-vacuum interface becomes thin by the electric field induced around the antenna portions α1 and α2. In a case where the electric potential barrier becomes further thin by the incidence of the electromagnetic wave W on the antenna portions α1 and α2 in the forward bias state, the electron existing in the antenna portions α1 and α2 can slip out of the electric potential barrier due to a tunnel effect. The electron P slipping out of the electric potential barrier is accelerated by the electric field around the antenna portions α1 and α2. As mentioned above, the field electron emission can be generated by the incidence of the electromagnetic wave W on the antenna portions α1 and α2 in the forward bias state.

Each of the patterns 31, 32, 33, 34, and 35 is disposed on the principal surface 21*b* of the supporting body 21. The plurality of patterns 31, 32, 33, 34, and 35 are connected via an oxide layer. The plurality of patterns 31, 32, 33, 34, and 35 are separated from each other by the oxide layer, and are insulated from each other at least when the photoelectric conversion device 2 is not operated. Each of the patterns 31, 32, 33, 34, and 35 is a conductive line, and conducts the electron. Each of the patterns 31, 32, 33, 34, and 35 includes a metal layer which is formed at least on the oxide layer of the meta-surface 22. A material of the metal layer includes, for example, gold.

In the example illustrated in FIG. 3, the pattern 31 includes a plurality of linear parts 41 and a linear part 42 electrically connecting the plurality of linear parts 41 to each other. Each of the linear parts 41 extends in a Y-axis direction. Each of the linear parts 41 configures the bias portion β1. Each of the linear parts 41 is formed into a rectangular shape extending in the Y-axis direction, for example. The linear part 42 is connected to each of the linear parts 41. In the present embodiment, the plurality of linear parts 41 are arrayed on the same line extending in the Y-axis direction, and the linear parts 41 adjacent to each other are connected by the plurality of linear parts 42. A plurality of groups each including the plurality of linear parts 41 disposed on the same line extending in the Y-axis direction, are arrayed in parallel to each other in the Z-axis direction.

The pattern 32 includes a plurality of linear parts 43 and a linear part 44 electrically connecting the plurality of linear parts 43 to each other. Each of the linear parts 43 extends in a Y-axis direction. Each of the linear parts 43 configures the bias portion β1. Each of the linear parts 43 is formed into a rectangular shape extending in the Y-axis direction, for example. The linear part 41 and the linear part 43 corresponding to each other are disposed on the same line extending in the Z-axis direction. The pattern 35 is disposed between the linear part 41 and the linear part 43 corresponding to each other. The linear part 44 is connected to each of the linear parts 43. In the present embodiment, the plurality of linear parts 43 are arrayed on the same line in the Y-axis direction, and the linear parts 43 adjacent to each other are connected by a plurality of linear parts 44. A plurality of groups each including the plurality of linear parts 43 disposed on the same line extending in the Y-axis direction, are arrayed in parallel to each other in the Z-axis direction. The pattern 35 is disposed between the one group including the plurality of linear parts 41 and the one group including the plurality of linear parts 43. When the linear part 41 corresponds to the first portion, the linear part 43 corresponds to the second portion.

The pattern 33 includes a plurality of linear parts 46 and a linear part 47 electrically connecting the plurality of linear parts 46 to each other. Each of the linear parts 46 extends in a Z-axis direction. Each of the linear parts 46 configures the bias portion β2. Each of the linear parts 46 is formed into a rectangular shape extending in the Z-axis direction, for example. The linear part 47 is connected to each of the linear parts 46. In the present embodiment, the plurality of linear parts 46 are arrayed on the same line in the Z-axis direction, and the linear parts 46 adjacent to each other are connected by a plurality of linear parts 47. A plurality of groups each including the plurality of linear parts 46 disposed on the same line extending in the Z-axis direction, are arrayed in parallel to each other in the Y-axis direction.

The pattern 34 includes a plurality of linear parts 48 and a linear part 49 electrically connecting the plurality of linear parts 48 to each other. Each of the linear parts 48 extends in a Z-axis direction. Each of the linear parts 48 configures the bias portion β2. Each of the linear parts 48 is formed into a rectangular shape extending in the Z-axis direction, for example. The linear part 46 and the linear part 48 corresponding to each other are disposed on the same line extending in the Y-axis direction. The pattern 35 is disposed between the linear part 46 and the linear part 48 corresponding to each other. The linear part 49 is connected to each of the linear parts 48. In the present embodiment, the plurality of linear parts 48 are arrayed on the same line in the Z-axis direction, and the linear parts 48 adjacent to each other are connected by a plurality of linear parts 49. A plurality of groups each including the plurality of linear parts 48 disposed on the same line extending in the Z-axis direction, are arrayed in parallel to each other in the Y-axis direction. The pattern 35 is disposed between the one group including the plurality of linear parts 46 and the one group including the plurality of linear parts 48. When the linear part 46 corresponds to the third portion, the linear part 48 corresponds to the fourth portion.

The pattern 35 extends toward the patterns 31 and 32 and the patterns 33 and 34. In a state where a lower electric potential than that applied to the pattern 31, the pattern 32, the pattern 33, or the pattern 34 is applied to the pattern 35, the pattern 35 emits the electron P in response to incidence of the electromagnetic wave W. The pattern 35 includes a plurality of linear parts 51 and a plurality of linear parts 52. The linear part 51 and the linear part 52 respectively extend in directions intersecting each other. In other words, a direction where the linear part 51 extends and a direction where the linear part 52 extends intersect each other. In the present embodiment, the linear part 51 and the linear part 52 respectively extend in directions orthogonal to each other.

Each of the linear parts 51 extends in a Z-axis direction. Each of the linear parts 51 configures the antenna portion α1. Each of the linear parts 51 is formed into a rectangular shape extending in the Z-axis direction, for example. The plurality of linear parts 51 are in parallel to each other. The pattern 35 includes a linear part 53 electrically connecting the plurality of linear parts 51 to each other. The linear part 53 is connected to each of the linear parts 51. In the present embodiment, the plurality of linear parts 51 are arrayed on the same line in the Y-axis direction, and the linear parts 51 adjacent to each other are connected by a plurality of linear parts 53. A plurality of groups each including the plurality of linear parts 51 disposed on the same line extending in the Z-axis direction, are arrayed in the Y-axis direction. The plurality of linear parts 51 included in mutually different groups are disposed on the same line extending in the Z-axis direction.

Each of the linear parts 51 extends in a +Z-axis direction and a-Z-axis direction from a portion connected to the linear part 53. Each of the linear parts 53 is connected to the center of each of the linear parts 51. Each of the linear parts 51 includes a pair of linear parts 51*a* and 51*b*. The linear part 51*a* extends in a +Z-axis direction from a portion connected to the linear part 53. The linear part 51*b* extends in a-Z-axis direction from a portion connected to the linear part 53. In the present embodiment, the pair of linear parts 51*a* and 51*b* in each of the linear parts 51 extend on the same line extending in the Z-axis direction. Each of the linear parts 51 is disposed between a pair of bias portions β1 in the Z-axis direction. Each of the linear parts 51 is disposed between the pattern 31 and the pattern 32 in the Z-axis direction. Each of the linear parts 51 is disposed between the linear part 41 and the linear part 43 in the Z-axis direction.

Each of the linear parts 52 extends in a Y-axis direction. Each of the linear parts 52 configures the antenna portion α2. Each of the linear parts 52 is formed into a rectangular shape extending in the Y-axis direction, for example. The plurality of linear parts 52 are in parallel to each other. The above-mentioned linear part 53 electrically connects the plurality of linear parts 52 to each other. The linear part 53 is connected to each of the linear parts 52. In the present embodiment, the plurality of linear parts 52 are arrayed on the same line in the Z-axis direction, and the linear parts 52 adjacent to each other are connected by a plurality of linear parts 53. A plurality of groups each including the plurality of linear parts 52 disposed on the same line extending in the Z-axis direction, are arrayed in the Y-axis direction. The plurality of linear parts 52 included in mutually different groups are disposed on the same line extending in the Y-axis direction. In the present embodiment, the plurality of linear parts 51 and the plurality of linear parts 52 are electrically connected by the linear part 53.

Each of the linear parts 52 extends in a +Y-axis direction and a-Y-axis direction from a portion connected to the linear part 53. Each of the linear parts 53 is connected to the center of each of the linear parts 52. Each of the linear parts 52 includes a pair of linear parts 52*a* and 52*b*. The linear part 52*a* extends in a +Y-axis direction from a portion connected to the linear part 53. The linear part 52*b* extends in a-Y-axis direction from a portion connected to the linear part 53. In the present embodiment, the pair of linear parts 52*a* and 52*b* in each of the linear parts 52 extend on the same line extending in the Y-axis direction. Each of the linear parts 52 is disposed between a pair of bias portions β2 in the Y-axis direction. Each of the linear parts 52 is disposed between the pattern 33 and the pattern 34 in the Y-axis direction. Each of the linear parts 52 is disposed between the linear part 46 and the linear part 48 in the Y-axis direction.

The pattern 35 includes a leading end 36 facing the pattern 31, a leading end 37 facing the pattern 32, a leading end 38 facing the pattern 33, and a leading end 39 facing the pattern 34. For example, the leading end 36 corresponds to the first leading end, the leading end 37 corresponds to the second leading end, the leading end 38 corresponds to the third leading end, and the leading end 39 corresponds to the fourth leading end. In the present embodiment, each of the linear parts 51 configuring the antenna portion α1 includes the leading end 36 and the leading end 37, and each of the linear parts 52 configuring the antenna portion α2 includes the leading end 38 and the leading end 39.

The leading ends 36 and the leading end 37 are positioned in both ends of each of the linear parts 51. The leading end 36 is included in the linear part 51*a*. The leading end 37 is included in the linear part 51*b*. The leading end 36 and the leading end 37 included in the same linear part 51 are disposed on the same line extending in the Z-axis direction. The leading ends 38 and the leading end 39 are positioned in both ends of each of the linear parts 52. The leading end 38 is included in the linear part 52*a*. The leading end 39 is included in the linear part 52*b*. The leading end 38 and the leading end 39 included in the same linear part 52 are disposed on the same line extending in the Y-axis direction.

The leading end 36 faces the bias portion β1. The leading end 36 faces the corresponding linear part 41 of the bias portion β1. The linear part 41 generates an electric field having a Z-axis directional component between the linear part 41 and the leading end 36. The leading end 36 is the closest portion to the pattern 31 in the linear part 51 including the leading end 36. The leading end 36 is disposed closer to the corresponding linear part 41 than the other portions of the pattern 35.

The leading end 37 faces the bias portion β1. The leading end 37 faces the corresponding linear part 43 of the bias portion β1. The linear part 43 generates an electric field having a Z-axis directional component between the linear part 43 and the leading end 37. The leading end 37 is the closest portion to the pattern 32 in the linear part 51 including the leading end 37. The leading end 37 is disposed closer to the corresponding linear part 43 than the other portions of the pattern 35.

The leading end 36 and the leading end 37, and the linear part 41 and the linear part 43 are disposed in the order of the linear part 43, the leading end 37, the leading end 36, and the linear part 41 in the Z-axis direction. In the photoelectric conversion unit 25, each of the linear parts 51 can emit the electron P in response to incidence of the electromagnetic wave W in a state where a lower electric potential than the linear part 41 or the linear part 43 is applied thereto.

The leading end 38 faces the bias portion β2. The leading end 38 faces the corresponding linear part 46 of the bias portion β2. The linear part 46 generates an electric field having a Y-axis directional component between the linear part 46 and the leading end 38. The leading end 38 is the closest portion to the pattern 33 in the linear part 52 including the leading end 38. The leading end 38 is disposed closer to the corresponding linear part 46 than the other portions of the pattern 35.

The leading end 39 faces the bias portion β2. The leading end 39 faces the corresponding linear part 48 of the bias portion β2. The linear part 48 generates an electric field having a Y-axis directional component between the linear part 48 and the leading end 39. The leading end 39 is the closest portion to the pattern 34 in the linear part 52 including the leading end 39. The leading end 39 is disposed closer to the corresponding linear part 48 than the other portions of the pattern 35.

The leading end 38 and the leading end 39, and the linear part 46 and the linear part 48 are disposed in the order of the linear part 48, the leading end 39, the leading end 38, and the linear part 46 in the Y-axis direction. In the photoelectric conversion unit 25, each of the linear parts 52 can emit the electron P in response to incidence of the electromagnetic wave W in a state where a lower electric potential than the linear part 46 or the linear part 48 is applied thereto.

The photoelectric conversion unit 25 is configured to correspond to a range of wavelength, for example, from a millimeter wave to an infrared light by a change of a configuration of the linear parts 51 and 52. For example, a length of the linear part 51 in the Z-axis direction corresponds to a wavelength region of the electromagnetic wave W which allows the electron P to be emitted in the photoelectric conversion unit 25. For example, the length of the linear part 51 in the Z-axis direction is designed according to a desired wavelength region emitting the electron P from the photoelectric conversion unit 25. In the same manner, a length of the linear part 52 in the Y-axis direction corresponds to a wavelength region of the electromagnetic wave W which allows the electron P to be emitted in the photoelectric conversion unit 25. For example, the length of the linear part 52 in the Y-axis direction is designed according to a desired wavelength region emitting the electron P from the photoelectric conversion unit 25. For example, each of the linear parts 51 and 52 has a length which is half the length of a center wavelength in the desired wavelength region. The length of each of the linear parts 51 is a length from the leading end 36 to the leading end 37 in the Z-axis direction. The length of each of the linear parts 52 is a length from the leading end 38 to the leading end 39 in the Y-axis direction.

In a case where the electromagnetic wave W having transmitted the supporting body 21 enters the linear parts 51 and 52 as in the present embodiment, a refractive index of the supporting body 21 through which the electromagnetic wave has passed is also taken into consideration. For example, in a case where a wavelength of the electromagnetic wave entering the electron tube is 600 μm, and a refractive index of the supporting body 21 is 3.4 for the electromagnetic wave W, a wavelength of the electromagnetic wave entering the linear parts 51 and 52 is 600 μm/3.4=176 μm. Therefore, in this case, for example, as the length of the linear part 51 in the Z-axis direction and the length of the linear part 52 in the Y-axis direction, 176 μm/2=88 μm may be appropriate.

The electron emitter 20 is further provided with a plurality of electrodes 61, 62, 63, 64, and 65 which are spaced away from each other, as illustrated in FIG. 3. The plurality of electrodes 61, 62, 63, 64, and 65 are provided on the principal surface 21*b* of the supporting body 21. The plurality of electrodes 61, 62, 63, 64, and 65 are electrically connected to the photoelectric conversion unit 25. In the present embodiment, each of the electrodes 61, 62, 63, 64, and 65 is formed into a rectangular shape. As a modification of the present embodiment, each of the electrodes 61, 62, 63, 64, and 65 may be formed into a linear shape in the same manner as the linear parts 42, 44, 47, 49, and 53. These electrodes may be connected to the principal surface 21*a* side of the supporting body 21 by a through electrode.

For example, the electrode 61 is included in the pattern 31. The electrode 61 is electrically connected to the plurality of linear parts 41 via the linear part 42. The electrode 61 may be integrally formed with the linear part 42 and the plurality of linear parts 41. The electrode 62 is included in the pattern 32. The electrode 62 is electrically connected to the plurality of linear parts 43 via the linear part 44. The electrode 62 may be integrally formed with the linear part 44 and the plurality of linear parts 43. The electrode 63 is included in the pattern 33. The electrode 63 is electrically connected to the plurality of linear parts 46 via the linear part 47. The electrode 63 may be integrally formed with the linear part 47 and the plurality of linear parts 46. The electrode 64 is included in the pattern 34. The electrode 64 is electrically connected to the plurality of linear parts 48 via the linear part 49. The electrode 64 may be integrally formed with the linear part 49 and the plurality of linear parts 48. The electrode 65 is included in the pattern 35. The electrode 65 is electrically connected to the plurality of linear parts 51 and 52 via the linear part 53. The electrode 65 may be integrally formed with the linear part 53 and the plurality of linear parts 51 and 52.

The photoelectric conversion unit 25 is operated by application of electric potentials from the power supply unit 70 via the plurality of electrodes 61, 62, 63, 64, and 65. The potential application unit 71 of the power supply unit 70 applies the electric potentials to the photoelectric conversion unit 25 via the plurality of electrodes 61, 62, 63, 64, and 65. The potential control unit 72 of the power supply unit 70 controls the electric potentials applied to the photoelectric conversion unit 25 of the meta-surface 22.

Figure 4A:
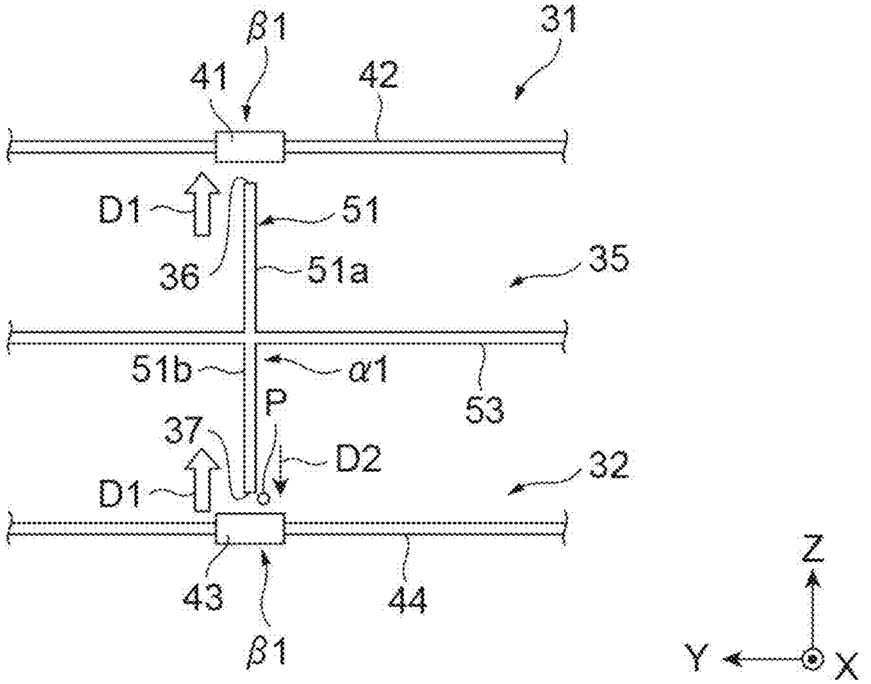
FIG. 4A is a view for describing an operation of the photoelectric conversion device.
Figure 4B:
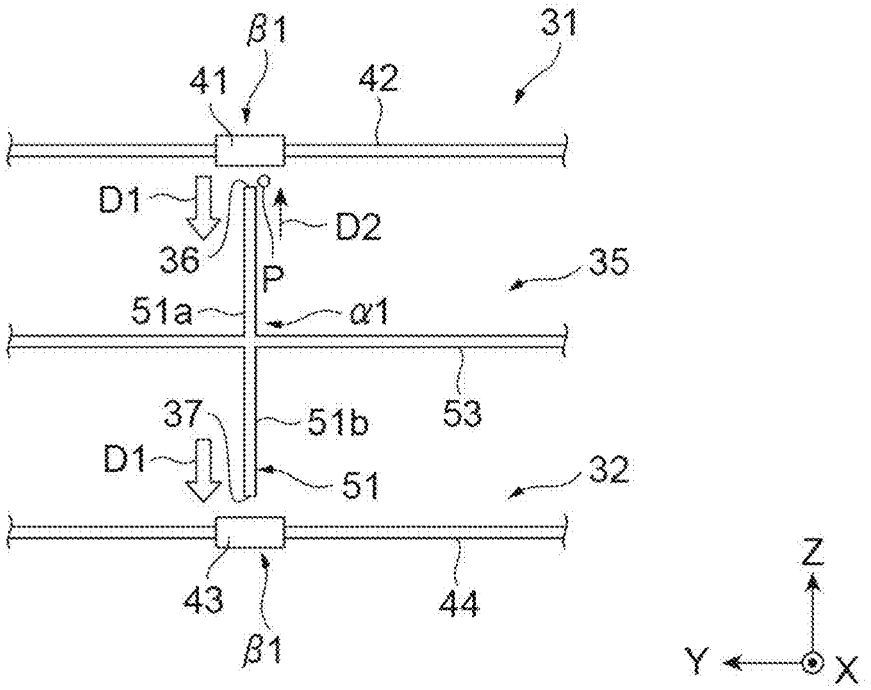
FIG. 4B is a view for describing an operation of the photoelectric conversion device.
Figure 5:
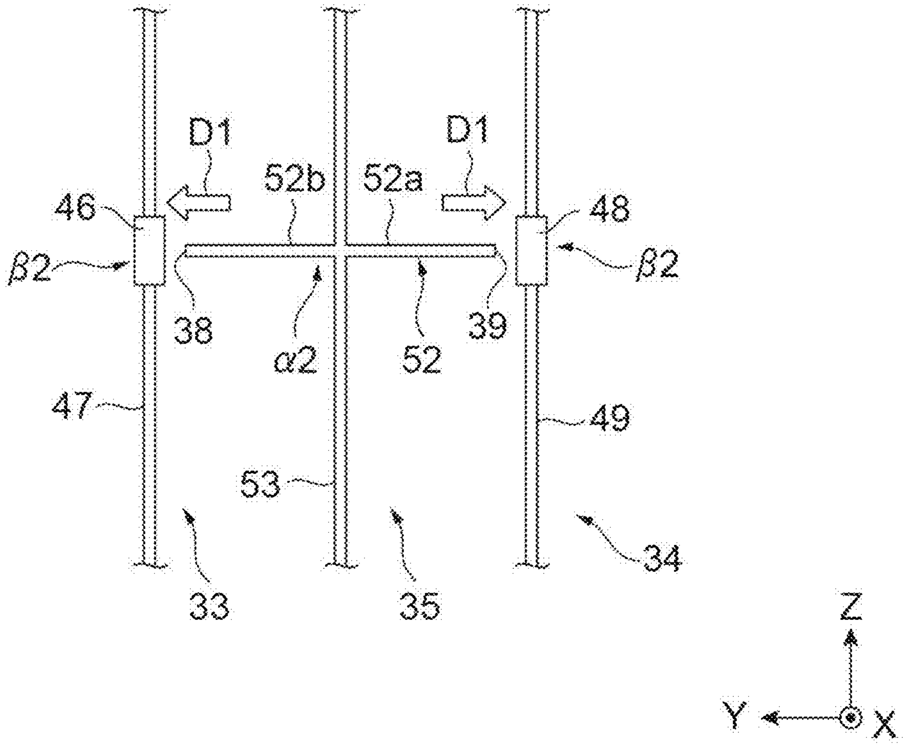
FIG. 5 is a view for describing an operation of a photoelectric conversion device.
Figure 6:
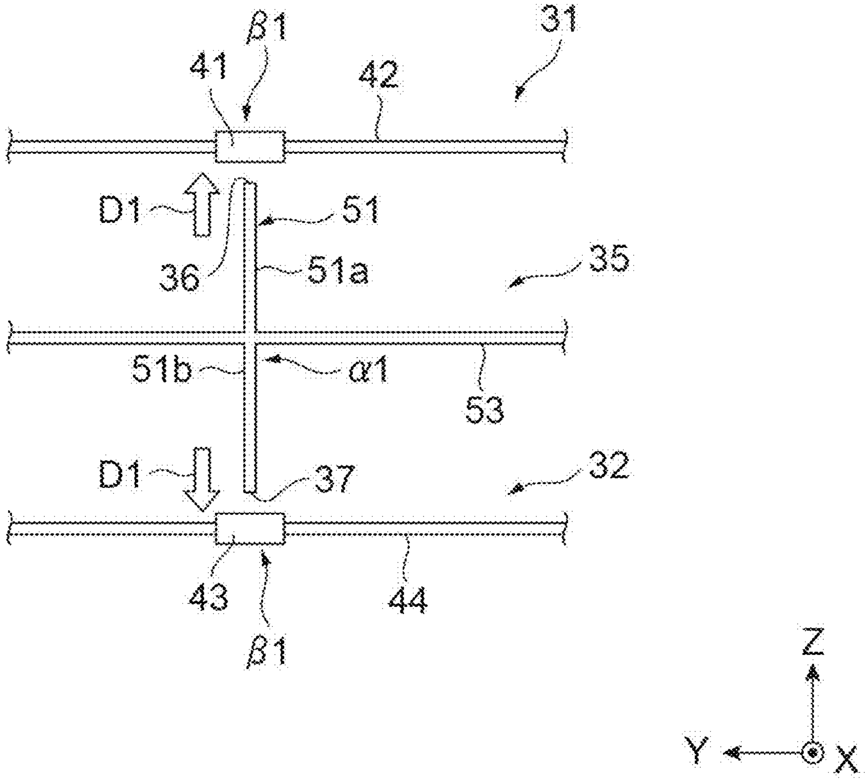
FIG. 6 is a view for describing an operation of a photoelectric conversion device.
Figure 7A:
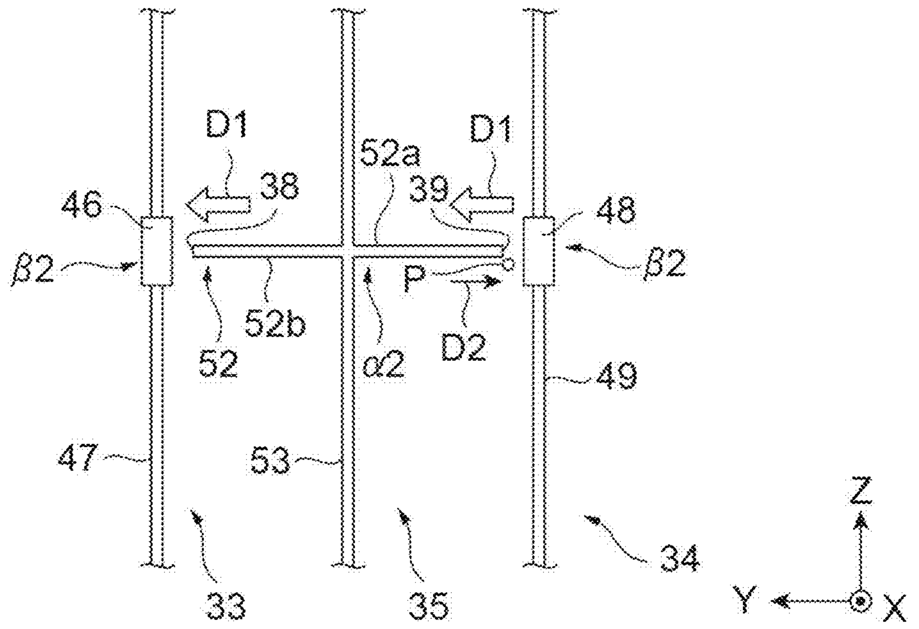
FIG. 7A is a view for describing an operation of a photoelectric conversion device.
Figure 7B:
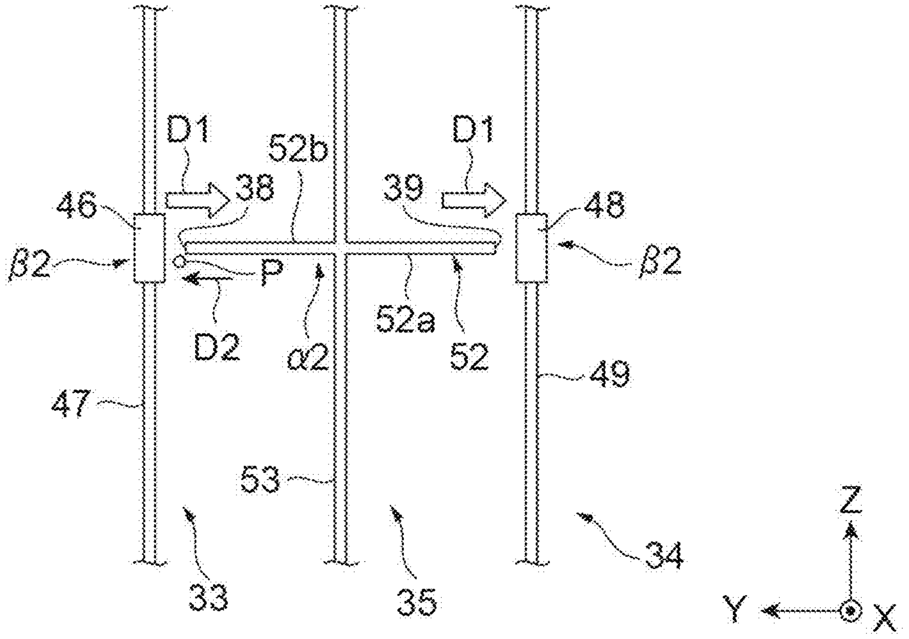
FIG. 7B is a view for describing an operation of a photoelectric conversion device.

Next, an operation of the photoelectric conversion device 2 according to the present embodiment will be described in detail with reference to FIGS. 4A, 4B, 5, 6, 7A, and 7B. FIGS. 4A, 4B, 5, 6, 7A, and 7B illustrate a part of the photoelectric conversion unit 25. FIGS. 4A, 4B, and 6 are views for describing an operation of the antenna portion α1 and the bias portion β1 in states different from each other. FIGS. 5, 7A, and 7B are views for describing an operation of the antenna portion α2 and the bias portion β2. In FIGS. 4A, 4B, 5, 6, 7A, and 7B, an arrow D1 denotes a direction of an electric field generated around the antenna portion α1 or the antenna portion α2. In FIGS. 4A, 4B, 7A, and 7B, an arrow D2 denotes a direction in which the electron P moves in the antenna portion α1 or the antenna portion α2.

The potential control unit 72 switches between the first state and the second state and switches between the third state and the fourth state by controlling the electric potentials applied to the plurality of patterns 31, 32, 33, 34, and 35. The first state corresponds to the state illustrated by FIGS. 4A and 5. In the first state, the potential control unit 72 controls the electric potentials in such a manner that the electron P is emitted from the leading end 37 of the antenna portion α1 in response to incident of the electromagnetic wave W, and emission of electron from the leading end 36 of the antenna portion α1 and the leading ends 38 and 39 of the antenna portion α2 is suppressed. The second state corresponds to the state illustrated by FIGS. 4B and 5. In the second state, the potential control unit 72 controls the electric potentials in such a manner that the electron P is emitted from the leading end 36 of the antenna portion α1 in response to incident of the electromagnetic wave W, and emission of electron from the leading end 37 of the antenna portion α1 and the leading ends 38 and 39 of the antenna portion α2 is suppressed. The third state corresponds to the state illustrated in FIGS. 6 and 7A. In the third state, the potential control unit 72 controls the electric potentials in such a manner that the electron P is emitted from the leading end 39 of the antenna portion α2 in response to incident of the electromagnetic wave W, and emission of electron from the leading ends 36 and 37 of the antenna portion α1 and the leading end 38 of the antenna portion α2 is suppressed. The fourth state corresponds to the state illustrated in FIGS. 6 and 7B. In the fourth state, the potential control unit 72 controls the electric potentials in such a manner that the electron P is emitted from the leading end 38 of the antenna portion α2 in response to incident of the electromagnetic wave W, and emission of electron from the leading ends 36 and 37 of the antenna portion α1 and the leading end 39 of the antenna portion α2 is suppressed.

In the first state, an electric potential applied to the pattern 35 is higher than an electric potential applied to the pattern 31, and is lower than an electric potential applied to the pattern 32. In other words, an electric potential applied to the linear part 41 configuring the bias portion β1 is lower than an electric potential applied to the linear part 51*a* configuring the antenna portion α1. An electric potential applied to the linear part 43 configuring the bias portion β1 is higher than an electric potential applied to the linear part 51*b* configuring the antenna portion α1.

In this case, as illustrated in FIG. 4A, an electric field is generated in the +Z-axis direction between the leading end 36 and the linear part 41, and an electric field is generated in the +Z-axis direction between the leading end 37 and the linear part 43. In other words, an electric field from the linear part 51*a* configuring the antenna portion α1 toward the linear part 41 configuring the bias portion β1 is generated. An electric field from the linear part 43 configuring the bias portion β1 toward the linear part 51*b* configuring the antenna portion α1 is generated.

As a result, in the first state, an electric potential barrier of the leading end portion of the antenna portion α1 configured by the linear part 51*a* becomes thick. In other words, an electric potential barrier in an antenna-vacuum interface becomes thicker due to the electric potential difference between the pattern 35 and the pattern 31. Therefore, the emission of electron from the linear part 51*a* in response to incidence of the electromagnetic wave W on the linear part 51*a* is suppressed. In the first state, the component of the electric field from the leading end 36 of the linear part 51*a* toward the linear part 41 configuring the bias portion β1 in the Z-axis direction is positive.

In the first state, an electric potential barrier of the leading end portion of the antenna portion α1 configured by the linear part 51*b* becomes thin. In other words, an electric potential barrier in an antenna-vacuum interface becomes thinner due to the electric potential difference between the pattern 35 and the pattern 32. Therefore, the emission of electron P from the linear part 51*b* in response to incidence of the electromagnetic wave W on the linear part 51*b* is promoted. In the first state, the component of the electric field from the linear part 43 configuring the bias portion β1 toward the leading end 37 of the linear part 51*b* configuring the antenna portion α1 in the Z-axis direction is positive. Therefore, in a case where the component of the electric field strength of the electromagnetic wave W entering the photoelectric conversion unit 25 in the first state in the Z-axis direction is positive, the electric potential barrier in the antenna-vacuum interface becomes further thinner in response to incidence of the electromagnetic wave W. Therefore, in a case where the component of the electric field strength of the electromagnetic wave W entering the photoelectric conversion unit 25 in the first state in the Z-axis direction is positive, the electron P is emitted from the linear part 51*b*.

In the first state, the electric potential applied to pattern 35 is higher than electric potentials applied to pattern 33 and pattern 34. In other words, the electric potential applied to the linear part 46 configuring the bias portion β2 is lower than an electric potential applied to the linear part 51*b* configuring the antenna portion α2. A electric potential applied to the linear part 48 configuring the bias portion β2 is lower than an electric potential applied to the linear part 51*b* configuring the antenna portion α2.

In this case, as illustrated in FIG. 5, an electric field is generated in the +Y-axis direction between the leading end 38 and the linear part 46, and an electric field is generated in the −Y-axis direction between the leading end 39 and the linear part 48. In other words, an electric field from the linear part 52*a* configuring the antenna portion α2 toward the linear part 46 configuring the bias portion β2 is generated. An electric field from the linear part 52*b* configuring the antenna portion α2 toward the linear part 48 configuring the bias portion β2 is generated.

As a result, in the first state, an electric potential barrier in each of the leading end portions of the antenna portion α2 configured by the linear parts 52*a* and 52*b* becomes thick. In other words, an electric potential barrier in an antenna-vacuum interface becomes thicker due to the electric potential differences between the pattern 35 and the patterns 33 and 34. Therefore, the emission of electron from the linear parts 52*a* and 52*b* in response to incidence of the electromagnetic wave W on the linear parts 52*a* and 52*b* is suppressed. In the first state, the component of the electric field from the leading end 38 of the linear part 52*a* toward the linear part 46 configuring the bias portion β2 in the Y-axis direction is positive, and the component of the electric field from the leading end 39 of the linear part 52*b* toward the linear part 48 configuring the bias portion β2 in the Y-axis direction is negative.

In the second state, the electric potential applied to the pattern 35 is lower than the electric potential applied to the pattern 31, and is higher than the electric potential applied to the pattern 32. In other words, the electric potential applied to the linear part 41 configuring the bias portion β1 is higher than the electric potential applied to the linear part 51*a* configuring the antenna portion α1. The electric potential applied to the linear part 43 configuring the bias portion β1 is lower than the electric potential applied to the linear part 51*b* configuring the antenna portion α1.

In this case, as illustrated in FIG. 4B, an electric field is generated in the −Z-axis direction between the leading end 36 and the linear part 41, and an electric field is generated in the −Z-axis direction between the leading end 37 and the linear part 43. In other words, an electric field from the linear part 41 configuring the bias portion β1 toward the linear part 51*a* configuring the antenna portion α1 is generated. An electric field from the linear part 51*b* configuring the antenna portion α1 toward the linear part 43 configuring the bias portion β1 is generated.

As a result, in the second state, an electric potential barrier of the leading end portion of the antenna portion α1 configured by the linear part 51*a* becomes thin. In other words, an electric potential barrier in an antenna-vacuum interface becomes thinner due to the electric potential difference between the pattern 35 and the pattern 31. Therefore, the emission of electron P from the linear part 51*a* in response to incidence of the electromagnetic wave W on the linear part 51*a* is promoted. In the second state, the component of the electric field from the linear part 41 configuring the bias portion β1 toward the leading end 36 of the linear part 51*a* configuring the antenna portion α1 in the Z-axis direction is negative. Therefore, in a case where the component of the electric field strength of the electromagnetic wave W entering the photoelectric conversion unit 25 in the second state in the Z-axis direction is negative, the electric potential barrier in the antenna-vacuum interface becomes further thinner in response to incidence of the electromagnetic wave W. As a result, in a case where the component of the electric field strength of the electromagnetic wave W entering the photoelectric conversion unit 25 in the second state in the Z-axis direction is negative, the electron P is emitted from the linear part 51*a*.

In the second state, an electric potential barrier of the leading end portion of the antenna portion α1 configured by the linear part 51*b* becomes thick. In other words, an electric potential barrier in an antenna-vacuum interface becomes thicker due to the electric potential difference between the pattern 35 and the pattern 32. Therefore, the emission of electron from the linear part 51*b* in response to incidence of the electromagnetic wave W on the linear part 51*b* is suppressed. In the second state, the component of the electric field from the leading end 37 of the linear part 51*b* toward the linear part 43 configuring the bias portion β1 in the Z-axis direction is negative.

In the second state, the electric potential applied to the pattern 35 is higher than the electric potential applied to the pattern 33 and the pattern 34, in the same manner as the first state. In other words, the electric potential applied to the linear part 46 configuring the bias portion β2 is lower than the electric potential applied to the linear part 51*b* configuring the antenna portion α2. The electric potential applied to the linear part 48 configuring the bias portion β2 is lower than the electric potential applied to the linear part 51*b* configuring the antenna portion α2.

Also in the second state, as illustrated in FIG. 5, an electric field is generated in the +Y-axis direction between the leading end 38 and the linear part 46, and an electric field is generated in the −Y-axis direction between the leading end 39 and the linear part 48. As a result, in the second state, an electric potential barrier in each of the leading end portions of the antenna portion α2 configured by the linear parts 52*a* and 52*b* becomes thick. In other words, an electric potential barrier in an antenna-vacuum interface becomes thicker due to the electric potential differences between the pattern 35 and the patterns 33 and 34.

Therefore, the emission of electron from the linear parts 52*a* and 52*b* in response to incidence of the electromagnetic wave W on the linear parts 52*a* and 52*b* is suppressed. In the second state, the component of the electric field from the leading end 38 of the linear part 52*a* toward the linear part 46 configuring the bias portion β2 in the Y-axis direction is positive, and the component of the electric field from the leading end 39 of the linear part 52*b* toward the linear part 48 configuring the bias portion β2 in the Y-axis direction is negative.

In the third state, the electric potential applied to pattern 35 is higher than the electric potentials applied to pattern 31 and pattern 32. In other words, the electric potential applied to the linear part 41 configuring the bias portion β1 is lower than the electric potential applied to the linear part 51*a* configuring the antenna portion α1. The electric potential applied to the linear part 43 configuring the bias portion β1 is lower than the electric potential applied to the linear part 51*a* configuring the antenna portion α1.

In this case, as illustrated in FIG. 6, an electric field is generated in the +Z-axis direction between the leading end 36 and the linear part 41, and an electric field is generated in the −Z-axis direction between the leading end 37 and the linear part 43. In other words, an electric field from the linear part 51*a* configuring the antenna portion α1 toward the linear part 41 configuring the bias portion β1 is generated. An electric field from the linear part 51*b* configuring the antenna portion α1 toward the linear part 43 configuring the bias portion β1 is generated.

As a result, in the third state, an electric potential barrier in each of the leading end portions of the antenna portion α1 configured by the linear parts 51*a* and 51*b* becomes thick. In other words, an electric potential barrier in an antenna-vacuum interface becomes thicker due to the electric potential differences between the pattern 35 and the patterns 31 and 32. Therefore, the emission of electron from the linear parts 51*a* and 51*b* in response to incidence of the electromagnetic wave W on the linear parts 51*a* and 51*b* is suppressed. In the third state, the component of the electric field from the leading end 36 of the linear part 51*a* toward the linear part 41 configuring the bias portion β1 in the Z-axis direction is positive, and the component of the electric field from the leading end 37 of the linear part 51*b* toward the linear part 43 configuring the bias portion β1 in the Z-axis direction is negative.

In the third state, the electric potential applied to the pattern 35 is higher than the electric potential applied to the pattern 33, and is lower than the electric potential applied to the pattern 34. In other words, the electric potential applied to the linear part 46 configuring the bias portion β2 is lower than the electric potential applied to the linear part 52*a* configuring the antenna portion α2. The electric potential applied to the linear part 48 configuring the bias portion β2 is higher than the electric potential applied to the linear part 52*b* configuring the antenna portion α2.

In this case, as illustrated in FIG. 7A, an electric field is generated in the +Y-axis direction between the leading end 38 and the linear part 46, and an electric field is generated in the +Y-axis direction between the leading end 39 and the linear part 48. In other words, an electric field from the linear part 52*a* configuring the antenna portion α2 toward the linear part 46 configuring the bias portion β2 is generated. An electric field from the linear part 48 configuring the bias portion β2 toward the linear part 52*b* configuring the antenna portion α2 is generated.

As a result, in the third state, an electric potential barrier of the leading end portion of the antenna portion α2 configured by the linear part 52*a* becomes thick. In other words, an electric potential barrier in an antenna-vacuum interface becomes thicker due to the electric potential difference between the pattern 35 and the pattern 33. Therefore, the emission of electron from the linear part 52*a* in response to incidence of the electromagnetic wave W on the linear part 52*a* is suppressed. In the third state, the component of the electric field from the leading end 38 of the linear part 52*a* toward the linear part 46 configuring the bias portion β2 in the Y-axis direction is positive.

In the third state, an electric potential barrier of the leading end portion of the antenna portion α2 configured by the linear part 52*b* becomes thin. In other words, an electric potential barrier in an antenna-vacuum interface becomes thinner due to the electric potential difference between the pattern 35 and the pattern 34. Therefore, the emission of electron P from the linear part 52*b* in response to incidence of the electromagnetic wave W on the linear part 52*b* is promoted. In the third state, the component of the electric field from the linear part 48 configuring the bias portion β2 toward the leading end 39 of the linear part 52*b* configuring the antenna portion α2 in the Y-axis direction is positive. Therefore, in a case where the component of the electric field strength of the electromagnetic wave W entering the photoelectric conversion unit 25 in the third state in the Y-axis direction is positive, the electric potential barrier in the antenna-vacuum interface becomes further thinner in response to incidence of the electromagnetic wave W. Therefore, in a case where the component of the electric field strength of the electromagnetic wave W entering the photoelectric conversion unit 25 in the third state in the Z-axis direction is positive, the electron P is emitted from the linear part 52*b*.

In the fourth state, the electric potential applied to the pattern 35 is higher than the electric potentials applied to the pattern 31 and the pattern 32, in the same manner as the third state. In other words, the electric potential applied to the linear part 41 configuring the bias portion β1 is lower than the electric potential applied to the linear part 51*a* configuring the antenna portion α1. The electric potential applied to the linear part 43 configuring the bias portion β1 is lower than the electric potential applied to the linear part 51*a* configuring the antenna portion α1.

Also in the fourth state, as illustrated in FIG. 6, an electric field is generated in the +Z-axis direction between the leading end 36 and the linear part 41, and an electric field is generated in the −Z-axis direction between the leading end 37 and the linear part 43. As a result, in the fourth state, an electric potential barrier in each of the leading end portions of the antenna portion α1 configured by the linear parts 51*a* and 51*b* becomes thick. In other words, an electric potential barrier in an antenna-vacuum interface becomes thicker due to the electric potential differences between the pattern 35 and the patterns 31 and 32. Therefore, the emission of electron from the linear parts 51*a* and 51*b* in response to incidence of the electromagnetic wave W on the linear parts 51*a* and 51*b* is suppressed. In the fourth state, the component of the electric field from the leading end 36 of the linear part 51*a* toward the linear part 41 configuring the bias portion β1 in the Z-axis direction is positive, and the component of the electric field from the leading end 37 of the linear part 51*b* toward the linear part 43 configuring the bias portion β1 in the Z-axis direction is negative.

In the fourth state, the electric potential applied to the pattern 35 is lower than the electric potential applied to the pattern 33, and is higher than the electric potential applied to the pattern 34. In other words, the electric potential applied to the linear part 46 configuring the bias portion β2 is higher than the electric potential applied to the linear part 52*a* configuring the antenna portion α2. The electric potential applied to the linear part 48 configuring the bias portion β2 is lower than the electric potential applied to the linear part 52*b* configuring the antenna portion α2.

In this case, as illustrated in FIG. 7B, an electric field is generated in the −Y-axis direction between the leading end 38 and the linear part 46, and an electric field is generated in the −Y-axis direction between the leading end 39 and the linear part 48. In other words, an electric field from the linear part 46 configuring the bias portion β2 toward the linear part 52*a* configuring the antenna portion α2 is generated. An electric field from the linear part 52*b* configuring the antenna portion α2 toward the linear part 48 configuring the bias portion β2 is generated.

As a result, in the fourth state, an electric potential barrier of the leading end portion of the antenna portion α2 configured by the linear part 52*a* becomes thin. In other words, an electric potential barrier in an antenna-vacuum interface becomes thinner due to the electric potential difference between the pattern 35 and the pattern 33. Therefore, the emission of electron P from the linear part 52*a* in response to incidence of the electromagnetic wave W on the linear part 52*a* is promoted. In the fourth state, the component of the electric field from the linear part 46 configuring the bias portion β2 toward the leading end 38 of the linear part 52*a* configuring the antenna portion α2 in the Y-axis direction is negative. Therefore, in a case where the component of the electric field strength of the electromagnetic wave W entering the photoelectric conversion unit 25 in the fourth state in the Y-axis direction is negative, the electric potential barrier in the antenna-vacuum interface becomes further thinner in response to incidence of the electromagnetic wave W. As a result, in a case where the component of the electric field strength of the electromagnetic wave W entering the photoelectric conversion unit 25 in the fourth state in the Y-axis direction is negative, the electron P is emitted from the linear part 52*a*.

In the fourth state, an electric potential barrier of the leading end portion of the antenna portion α2 configured by the linear part 52*b* becomes thick. In other words, an electric potential barrier in an antenna-vacuum interface becomes thicker due to the electric potential difference between the pattern 35 and the pattern 34. Therefore, the emission of electron from the linear part 52*b* in response to incidence of the electromagnetic wave W on the linear part 52*b* is suppressed. In the fourth state, the component of the electric field from the leading end 39 of the linear part 52*b* toward the linear part 48 configuring the bias portion β2 in the Y-axis direction is negative.

The computing unit 75 computes the polarization information of the electric field strength of the electromagnetic wave W entering the electron emitter 20, based on the results of detection of the electron collecting unit 50 in the first state, the second state, the third state, and the fourth state. The result of detection of the electron collecting unit 50 is information indicating the emission intensity of the electron emitted from the electron emitter 20, for example. The emission intensity stands for the amount of the emitted electron, and depends upon the electric field strength of the electromagnetic wave W entering the electron emitter 20. For example, the computing unit 75 computes first information relating to a positive component in the Z-axis direction of the electric field strength of the electromagnetic wave W, based on the result of detection of the electron collecting unit 50 in the first state. The computing unit 75 computes second information relating to a negative component in the Z-axis direction of the electric field strength of the electromagnetic wave W, based on the result of detection of the electron collecting unit 50 in the second state. The computing unit 75 computes third information relating to a positive component in the Y-axis direction of the electric field strength of the electromagnetic wave W, based on the result of detection of the electron collecting unit 50 in the third state. The computing unit 75 computes fourth information relating to a negative component in the Y-axis direction of the electric field strength of the electromagnetic wave W, based on the result of detection of the electron collecting unit 50 in the fourth state. The computing unit 75 computes the polarization information of the electric field strength of the electromagnetic wave W entering the electron emitter 20, based on the first information, the second information, the third information, and the fourth information.

The computing unit 75 computes the electric field strength of the Z-axis directional component in the electromagnetic wave W entering the electron emitter 20, based on the results of detection of the electron collecting unit 50 in the first state and the second state. The computing unit 75 determines the polarity in the Z-axis direction for the electric field strength of the electromagnetic wave W entering the electron emitter 20, based on the results of detection of the electron collecting unit 50 in the first state and the second state. For example, the computing unit 75 determines the polarity of the electric field in the Z-axis direction by comparing the result of detection of the electron collecting unit 50 in the first state with the result of detection of the electron collecting unit 50 in the second state. The computing unit 75 computes the electric field strength of the Y-axis directional component in the electromagnetic wave W entering the electron emitter 20, based on the results of detection of the electron collecting unit 50 in the third state and the fourth state. The computing unit 75 determines the polarity in the Y-axis direction for the electric field strength of the electromagnetic wave W entering the electron emitter 20, based on the results of detection of the electron collecting unit 50 in the third state and the fourth state. For example, the computing unit 75 determines the polarity of the electric field in the Y-axis direction by comparing the result of detection of the electron collecting unit 50 in the third state with the result of detection of the electron collecting unit 50 in the fourth state. The computing unit 75 computes the polarization information of the electromagnetic wave W entering the electron emitter 20, based on the electric field strength of the Z-axis directional component and the electric field strength of the Y-axis directional component. For example, the computing unit 75 determines the polarization direction of the electromagnetic wave W entering the electron emitter 20 by comparing the electric field strength of the Z-axis directional component with the electric field strength of the Y-axis directional component.

Figure 8:
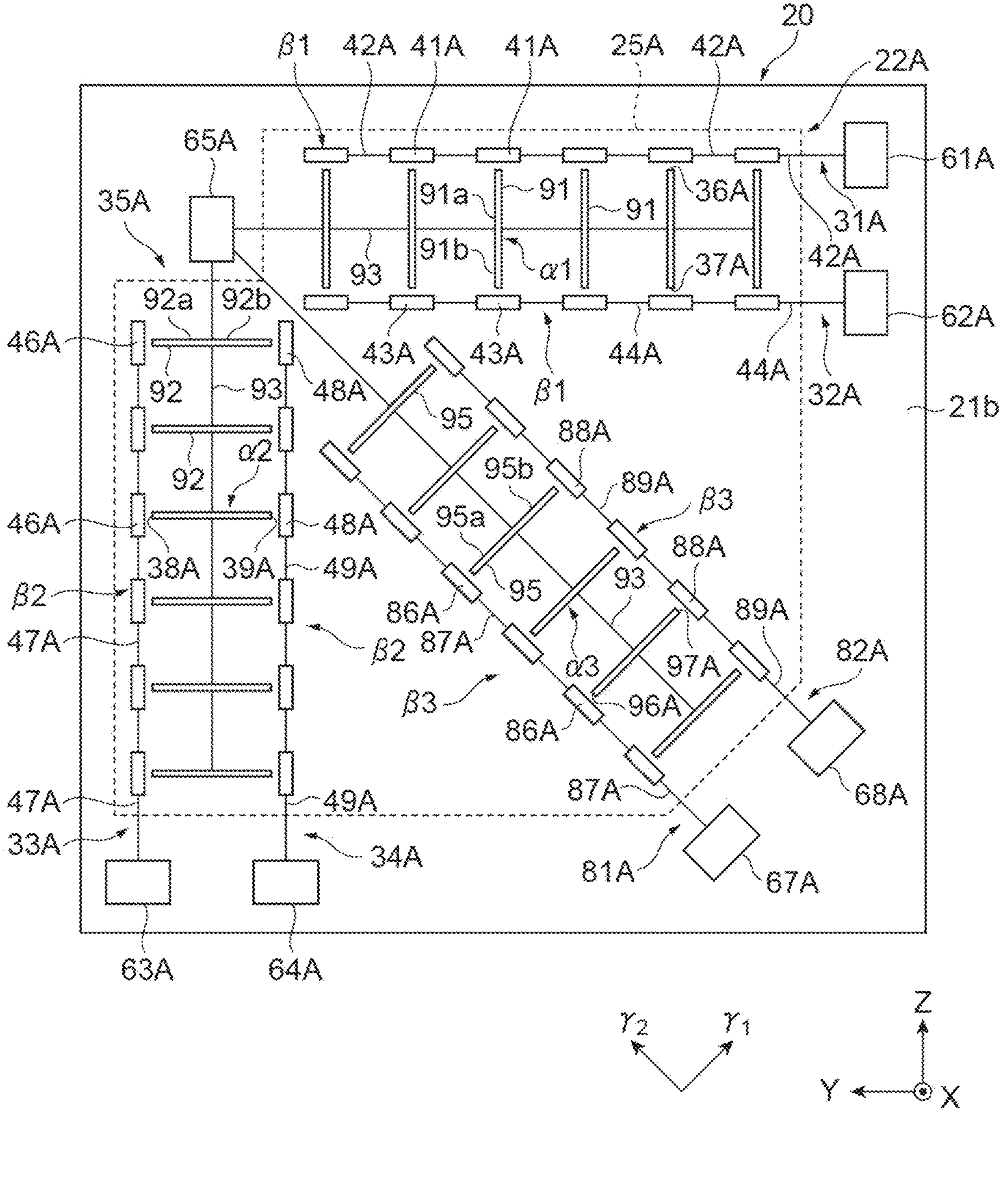
FIG. 8 is a plan view of an electron emitter according to a modification of the present embodiment.

Next, a modification of the electron emitter will be described with reference to FIG. 8. FIG. 8 is a plan view of an electron emitter according to a modification of the present embodiment. The present modification is generally similar to or same as the above-described embodiment. The electron emitter in the present modification is different from that of the above-described embodiment in the regard of being also provided with an antenna portion having a sensitivity for a direction intersecting the Y-axis direction and the Z-axis direction. Hereinafter, the differences between the above-described embodiment and the modification will be mainly described.

In this modification, an electron emitter 20 includes a meta-surface 22A. The meta-surface 22A corresponds to the meta-surface 22. The meta-surface 22A is of an active type, and is operated by application of a bias voltage. The meta-surface 22A is operated by application of electric potentials by means of a power supply unit 70.

The meta-surface 22A illustrated in FIG. 8 includes at least one photoelectric conversion unit 25A. The photoelectric conversion unit 25A emits an electron P in response to incidence of an electromagnetic wave W having a directional component in a corresponding wavelength and a corresponding electric field strength. The photoelectric conversion unit 25A has a sensitivity for a component in the $\gamma_1$-axis direction intersecting the Y-axis direction and the Z-axis direction, in addition to the Y-axis directional component and the Z-axis directional component of the electric field strength of the electromagnetic wave W. The $\gamma_1$-axis is an axis intersecting the Y axis and the Z axis in a YZ plane. The $\gamma_1$-axis direction is orthogonal to a $\gamma_2$-axis direction. The $\gamma_2$-axis direction is inclined at an angle of 45 degrees with respect to the Y-axis direction and the Z-axis direction in the YZ plane. A state where the photoelectric conversion unit 25A has a sensitivity for the positive component in the Y-axis direction, a state where the photoelectric conversion unit 25A has a sensitivity for the negative component in the Y-axis direction, a state where the photoelectric conversion unit 25A has a sensitivity for the positive component in the Z-axis direction, a state where the photoelectric conversion unit 25A has a sensitivity for the negative component in the Z-axis direction, a state where the photoelectric conversion unit 25A has a sensitivity for the positive component in the $\gamma$1-axis direction, and a state where the photoelectric conversion unit 25A has a sensitivity for the negative component in the $\gamma$1-axis direction are switched according to the electric potential control by the potential control unit 72. The frequency range and the directional component of the electric field for which the photoelectric conversion unit 25A has the sensitivity are not limited to the above. When the Z-axis direction and the Y-axis direction correspond to the first direction and the second direction, the $\gamma_1$-axis direction corresponds to the third direction.

The meta-surface 22A illustrated in FIG. 8 includes a plurality of patterns 31A, 32A, 33A, 34A, 35A, 81A, and 82A which are spaced away from each other. The frequency range and the directional component of the electric field for which the photoelectric conversion unit 25A has the sensitivity depends on the configurations of the plurality of patterns 31A, 32A, 33A, 34A, 35A, 81A, and 82A. The plurality of patterns 31A and 32A each include the bias portion $\beta$1. The patterns 33A and 34A each include the bias portion $\beta$2. The pattern 35A includes the antenna portion $\alpha$1, the antenna portion $\alpha$2, and an antenna portion $\alpha$3. The patterns 81A and 82A each include a bias portion $\beta$3. Also in the antenna portion $\alpha$3, in the same manner as the antenna portions $\alpha$1 and $\alpha$2, the smaller the size of the antenna portion $\alpha$3 is, the more the field electron emission tends to be generated for the electromagnetic wave having short wavelength, that is, the electromagnetic wave having a great frequency. The antenna portion $\alpha$3 has a sensitivity for a different directional component from those of the antenna portion $\alpha$1 and the antenna portion $\alpha$2. The antenna portion $\alpha$3 has a sensitivity for a component in the $\gamma_1$-axis direction in the YZ plane. The antenna portion $\alpha$3 extends in the $\gamma_1$-axis direction. For example, when the antenna portion $\alpha$1 and the antenna portion $\alpha$2 correspond to the first and second antenna portions, the antenna portion $\alpha$3 corresponds to the third antenna portion. When the bias portion $\beta$1 and the bias portion $\beta$2 correspond to the first and second bias portions, the bias portion $\beta$3 corresponds to the third bias portion.

The antenna portions $\alpha$1, $\alpha$2, and $\alpha$3 emit the electron P in response to incidence of the electromagnetic wave W. The bias portion $\beta$3 faces the antenna portion $\alpha$3. The bias portion $\beta$3 is configured to generate an electric field having a component in the Y-axis direction between the bias portion $\beta$3 and the corresponding antenna portion $\alpha$3 when the bias electric potential is applied. In this modification, the bias portion $\beta$3 generates an electric field in the $\gamma_1$-axis direction between the bias portion $\beta$3 and the antenna portion $\alpha$3. The bias portion $\beta$3 generates an electric field between the bias portion $\beta$3 and the corresponding antenna portion $\alpha$3 when the bias electric potential is applied. When a higher electric potential than the antenna portion $\alpha$3 is applied to the bias portion $\beta$3, an electric potential barrier in the leading end portion of the bias portion $\beta$3 side in the antenna portion $\alpha$3 becomes thin. When a lower electric potential than the antenna portion $\alpha$3 is applied to the bias portion $\beta$3, the electric potential barrier in the leading end portion of the bias portion $\beta$3 side in the antenna portion $\alpha$3 becomes thick. When the electromagnetic wave W enters the antenna portion $\alpha$3, the electric field is induced around the antenna portion $\alpha$3 in the same manner as the antenna portions $\alpha$1 and $\alpha$2, and in a case where the electric potential barrier becomes further thin by the incidence of the electromagnetic wave W on the antenna portion $\alpha$3 in the forward bias state, the field electron emission can be generated.

Each of the patterns 31A, 32A, 33A, 34A, 35A, 81A, and 82A is disposed on the principal surface 21*b* of the supporting body 21. The plurality of patterns 31A, 32A, 33A, 34A, 35A, 81A, and 82A are connected via an oxide layer. The plurality of patterns 31A, 32A, 33A, 34A, 35A, 81A, and 82A are separated from each other by the oxide layer, and are insulated from each other at least when the photoelectric conversion device 2 is not operated. Each of the patterns 31A, 32A, 33A, 34A, 35A, 81A, and 82A is a conductive line, and conducts the electron. Each of the patterns 31A, 32A, 33A, 34A, 35A, 81A, and 82A includes a metal layer which is formed at least on the oxide layer of the metasurface 22A. A material of the metal layer includes, for example, gold.

In the example illustrated in FIG. 8, the pattern 31A includes a plurality of linear parts 41A and a linear part 42A electrically connecting the plurality of linear parts 41A to each other. Each of the linear parts 41A extends in a Y-axis direction. Each of the linear parts 41A configures the bias portion β1. Each of the linear parts 41A is formed into a rectangular shape extending in the Y-axis direction, for example. The linear part 42A is connected to each of the linear parts 41A. In this modification, the plurality of linear parts 41A are arrayed on the same line extending in the Y-axis direction, and the linear parts 41A adjacent to each other are connected by the plurality of linear parts 42A.

The pattern 32A includes a plurality of linear parts 43A and a linear part 44A electrically connecting the plurality of linear parts 43A to each other. Each of the linear parts 43A extends in a Y-axis direction. Each of the linear parts 43A configures the bias portion β1. Each of the linear parts 43A is formed into a rectangular shape extending in the Y-axis direction, for example. The linear part 41A and the linear part 43A corresponding to each other are disposed on the same line extending in the Z-axis direction. The pattern 35 is disposed between the linear part 41A and the linear part 43A corresponding to each other. The linear part 44A is connected to each of the linear parts 43A. In this modification, the plurality of linear parts 43A are arrayed on the same line in the Y-axis direction, and the linear parts 43A adjacent to each other are connected by a plurality of linear parts 44A. When the linear part 41A corresponds to the first portion, the linear part 43A corresponds to the second portion.

The pattern 33A includes a plurality of linear parts 46A and a linear part 47A electrically connecting the plurality of linear parts 46A to each other. Each of the linear parts 46A extends in a Z-axis direction. Each of the linear parts 46A configures the bias portion β2. Each of the linear parts 46A is formed into a rectangular shape extending in the Z-axis direction, for example. The linear part 47A is connected to each of the linear parts 46A. In this modification, the plurality of linear parts 46A are arrayed on the same line in the Z-axis direction, and the linear parts 46A adjacent to each other are connected by a plurality of linear parts 47A.

The pattern 34A includes a plurality of linear parts 48A and a linear part 49A electrically connecting the plurality of linear parts 48A to each other. Each of the linear parts 48A extends in a Z-axis direction. Each of the linear parts 48A configures the bias portion β2. Each of the linear parts 48A is formed into a rectangular shape extending in the Z-axis direction, for example. The linear part 46A and the linear part 48A corresponding to each other are disposed on the same line extending in the Y-axis direction. The pattern 35 is disposed between the linear part 46A and the linear part 48A corresponding to each other. The linear part 49A is connected to each of the linear parts 48A. In this modification, the plurality of linear parts 48A are arrayed on the same line in the Z-axis direction, and the linear parts 48A adjacent to each other are connected by a plurality of linear parts 49A. When the linear part 46A corresponds to the third portion, the linear part 48A corresponds to the fourth portion.

The pattern 81A includes a plurality of linear parts 86A and a linear part 87A electrically connecting the plurality of linear parts 86A to each other. Each of the linear parts 86A extends in a γ2-axis direction. Each of the linear parts 86A configures the bias portion β3. Each of the linear parts 86A is formed into a rectangular shape extending in the $\gamma_2$-axis direction, for example. The linear part 87A is connected to each of the linear parts 86A. In this modification, the plurality of linear parts 86A are arrayed on the same line in the $\gamma_2$-axis direction, and the linear parts 86A adjacent to each other are connected by a plurality of linear parts 87A.

The pattern 82A includes a plurality of linear parts 88A and a linear part 89A electrically connecting the plurality of linear parts 88A to each other. Each of the linear parts 88A extends in a γ2-axis direction γ2-axis direction. Each of the linear parts 88A configures the bias portion β2. Each of the linear parts 88A is formed into a rectangular shape extending in the $\gamma_2$-axis direction, for example. The linear part 86A and the linear part 88A corresponding to each other are disposed on the same line extending in the $\gamma_1$-axis direction. The pattern 35 is disposed between the linear part 86A and the linear part 88A corresponding to each other. The linear part 89A is connected to each of the linear parts 88A. In this modification, the plurality of linear parts 88A are arrayed on the same line in the $\gamma_2$-axis direction, and the linear parts 88A adjacent to each other are connected by a plurality of linear parts 89A. When the linear part 86A corresponds to the fifth portion, the linear part 88A corresponds to the sixth portion.

The pattern 35A extends toward the patterns 31A and 32A, the patterns 33A and 34A, and the patterns 81A and 82A. In a state where a lower electric potential than that applied to the pattern 31A, the pattern 32A, the pattern 33A, the pattern 34A, the pattern 81A, or the pattern 82A is applied to the pattern 35A, the pattern 35A emits the electron P in response to incidence of the electromagnetic wave W. The pattern 35A includes a plurality of linear parts 91, a plurality of linear parts 92, and a plurality of linear parts 95. The linear part 91, the linear part 92, and the linear part 95 respectively extend in directions intersecting one another in the YZ plane. In other words, a direction where the linear part 91 extends, a direction where the linear part 92 extends, and a direction where the linear part 95 extends intersect each other. In the present modification, the linear part 91 and the linear part 92 respectively extend in directions orthogonal to each other.

Each of the linear parts 91 extends in the Z-axis direction and has the same configuration as that of the above-described linear part 51. Each of the linear parts 91 configures the antenna portion α1 in the same manner as the linear part 51. The pattern 35A includes a linear part 93 electrically connecting the plurality of linear parts 91 to each other. The linear part 93 is connected to each of the linear parts 91. Each of the linear parts 91 includes a pair of linear parts 91*a* and 91*b* corresponding to the pair of linear parts 51*a* and 51*b*. The linear part 91*a* extends in a +Z-axis direction from a portion connected to the linear part 93. The linear part 91*b* extends in a-Z-axis direction from a portion connected to the linear part 93. In this modification, each of the linear parts 91 is disposed between the linear part 41A and the linear part 43A in the Z-axis direction.

Each of the linear parts 92 extends in the Y-axis direction and has the same configuration as that of the above-described linear part 52. Each of the linear parts 92 configures the antenna portion α2 in the same manner as the linear part 52. The above-described linear part 93 electrically connects the plurality of linear parts 92 to each other. The linear part 93 is connected to each of the linear parts 92. Each of the linear parts 92 includes a pair of linear parts 92*a* and 92*b* corresponding to the pair of linear parts 52*a* and 52*b*. The linear part 92*a* extends in a +Y-axis direction from a portion connected to the linear part 93. The linear part 92*b* extends in a-Y-axis direction from a portion connected to the linear part 93. In this modification, each of the linear parts 92 is disposed between the linear part 46A and the linear part 48A in the Y-axis direction. The plurality of linear parts 91 and the plurality of linear parts 92 are electrically connected by the linear part 93.

Each of the linear parts 95 extends in a γ1-axis direction. Each of the linear parts 95 configures the antenna portion α3. Each of the linear parts 95 is formed into a rectangular shape extending in the $\gamma_1$-axis direction, for example. The plurality of linear parts 95 are in parallel to each other. The above-described linear part 93 electrically connects the plurality of linear parts 95 to each other. The linear part 93 is connected to each of the linear parts 95. In this modification, the plurality of linear parts 95 are arrayed on the same line in the $\gamma_2$-axis direction, and the linear parts 95 adjacent to each other are connected by a plurality of linear parts 93.

Each of the linear parts 95 extends in a $+\gamma_1$-axis direction and a $-\gamma_1$-axis direction from a portion connected to the linear part 93. Each of the linear parts 93 is connected to the center of each of the linear parts 95. Each of the linear parts 95 includes a pair of linear parts 95*a* and 95*b*. The linear part 95*a* extends in a $-\gamma_1$-axis direction from a portion connected to the linear part 93. The linear part 95*b* extends in a $+\gamma_1$-axis direction from a portion connected to the linear part 93. In the present modification, the pair of linear parts 95*a* and 95*b* in each of the linear parts 95 extend on the same line extending in the $\gamma_1$-axis direction. Each of the linear parts 95 is disposed between a pair of bias portions β3 in the $\gamma_1$-axis direction. Each of the linear parts 93 is disposed between the pattern 81A and the pattern 82A in the $\gamma_1$-axis direction. Each of the linear parts 95 is disposed between the linear part 86A and the linear part 88A in the $\gamma_1$-axis direction.

The pattern 35A includes a leading end 36A facing the pattern 31A, a leading end 37A facing the pattern 32A, a leading end 38A facing the pattern 33A, a leading end 39A facing the pattern 34A, a leading end 96A facing the pattern 81A, and a leading end 97A facing the pattern 82A. In the present modification, each of the linear parts 91 includes the leading end 36A and the leading end 37A, each of the linear parts 92 includes the leading end 38A and the leading end 39A, and each of the linear parts 95 includes the leading end 96A and the leading end 97A.

The leading ends 36A and 37A correspond to the leading ends 36 and 37 described above, respectively. The leading ends 38A and 39A correspond to the leading ends 38 and 39 described above, respectively. The leading end 36A is included in the linear part 91*a*. The leading end 37A is included in the linear part 91*b*. The leading ends 36A and the leading end 37A are positioned in both ends of each of the linear parts 91. The leading end 38A is included in the linear part 92*a*. The leading end 39A is included in the linear part 92*b*. The leading ends 38A and the leading end 39A are positioned in both ends of each of the linear parts 92.

The leading end 96A faces the bias portion β3. The leading end 96A faces the corresponding linear part 86A. The leading end 96A is the closest portion to the pattern 81A in the linear part 95 including the leading end 96A. The leading end 96A is disposed closer to the corresponding linear part 86A than the other portions of the pattern 35A.

The leading end 97A faces the bias portion β3. The leading end 97A faces the corresponding linear part 88A. The leading end 97A is the closest portion to the pattern 82A in the linear part 95 including the leading end 97A. The leading end 97A is disposed closer to the corresponding linear part 88A than the other portions of the pattern 35A.

The leading end 96A and the leading end 97A, and the linear part 86A and the linear part 88A are disposed in the order of the linear part 86A, the leading end 96A, the leading end 97A, and the linear part 88A in the y-axis direction. In the photoelectric conversion unit 25, each of the linear parts 95 can emit the electron P in response to incidence of the electromagnetic wave W in a state where a lower electric potential than the linear part 86A or the linear part 88A is applied the linear parts 95.

The photoelectric conversion unit 25A is configured to correspond to a range of wavelength, for example, from a millimeter wave to an infrared light by a change of a configuration of the linear parts 91, 92, and 95. For example, a length of the linear part 95 in the γ1-axis direction corresponds to a wavelength region of the electromagnetic wave W which allows the electron P to be emitted in the photoelectric conversion unit 25A. For example, the length of the linear part 95 in the γ1-axis direction is designed according to a desired wavelength region emitting the electron P from the photoelectric conversion unit 25A. For example, each of the linear parts 91, 92, and 95 has a length which is half the length of a center wavelength in the desired wavelength region. The length of each of the linear parts 91 is a length from the leading end 36A to the leading end 37A in the Z-axis direction. The length of each of the linear parts 92 is a length from the leading end 38A to the leading end 39A in the Y-axis direction. The length of each of the linear parts 95 is a length from the leading end 96A to the leading end 97A in the γ1-axis direction. In a case where the electromagnetic wave W having transmitted the supporting body 21 enters the linear parts 91, 92, and 95 in the same manner as the linear parts 51 and 52, a refractive index of the supporting body 21 through which the electromagnetic wave has passed is also taken into consideration.

The electron emitter 20 illustrated in FIG. 8 is further provided with a plurality of electrodes 61A, 62A, 63A, 64A, 65A, 67A, and 68A which are spaced away from each other. The plurality of electrodes 61A, 62A, 63A, 64A, 65A, 67A, and 68A are provided on the principal surface 21*b* of the supporting body 21. The plurality of electrodes 61A, 62A, 63A, 64A, 65A, 67A, and 68A are electrically connected to the photoelectric conversion unit 25A. In the present modification, each of the electrodes 61A, 62A, 63A, 64A, 65A, 67A, and 68A is formed into a rectangular shape. Each of the electrodes 61A, 62A, 63A, 64A, 65A, 67A, and 68A may be formed into a linear shape in the same manner as the linear part 42A, 44A, 47A, 49A, 87A, or 89A.

For example, the electrode 61A is included in the pattern 31A. The electrode 61A is electrically connected to the plurality of linear parts 41A via the linear part 42A. The electrode 61A may be integrally formed with the linear part 42A and the plurality of linear parts 41A. The electrode 62A is included in the pattern 32A. The electrode 62A is electrically connected to the plurality of linear parts 43A via the linear part 44A. The electrode 62A may be integrally formed with the linear part 44A and the plurality of linear parts 43A. The electrode 63A is included in the pattern 33A. The electrode 63A is electrically connected to the plurality of linear parts 46A via the linear part 47A. The electrode 63A may be integrally formed with the linear part 47A and the plurality of linear parts 46A.

The electrode 64A is included in the pattern 34A. The electrode 64A is electrically connected to the plurality of linear parts 48A via the linear part 49A. The electrode 64A may be integrally formed with the linear part 49A and the plurality of linear parts 48A. The electrode 65A is included in the pattern 35A. The electrode 65A is electrically connected to the plurality of linear parts 91, 92, and 95 via the linear part 93. The electrode 65A may be integrally formed with the linear part 93 and the plurality of linear parts 91, 92, and 95. The electrode 67A is included in the pattern 81A. The electrode 67A is electrically connected to the plurality of linear parts 86A via the linear part 87A. The electrode 67A may be integrally formed with the linear part 87A and the plurality of linear parts 86A. The electrode 68A is included in the pattern 82A. The electrode 68A is electrically connected to the plurality of linear parts 88A via the linear part 89A. The electrode 68A may be integrally formed with the linear part 89A and the plurality of linear parts 88A.

The photoelectric conversion unit 25A is operated by application of electric potentials from the power supply unit 70 via the plurality of electrodes 61A, 62A, 63A, 64A, 65A, 67A, and 68A. The potential application unit 71 of the power supply unit 70 applies the electric potentials to the photoelectric conversion unit 25A of the meta-surface 22A via the plurality of electrodes 61A, 62A, 63A, 64A, 65A, 67A, and 68A. The potential control unit 72 of the power supply unit 70 controls the electric potentials applied to the photoelectric conversion unit 25A.

In the photoelectric conversion device 2 provided with the electron emitter 20 in the present modification, the potential control unit 72 switches between the first state and the second state, switches between the third state and the fourth state, and switches between the fifth state and the sixth state by controlling the electric potentials applied to the plurality of patterns 31A, 32A, 33A, 34A, 35A, 81A, and 82A. In the first state, the electric potentials are controlled in such a manner that the electron P is emitted from the leading end 37A of the antenna portion α1 in response to incident of the electromagnetic wave W, and emission of electron from the leading end 36A of the antenna portion α1 as well as the antenna portion α2 and the antenna portion α3 is suppressed. In the second state, the electric potentials are controlled in such a manner that the electron P is emitted from the leading end 36A of the antenna portion α1 in response to incident of the electromagnetic wave W, and emission of electron from the leading end 37A of the antenna portion α1 as well as the antenna portion α2 and the antenna portion α3 is suppressed. In the third state, the electric potentials are controlled in such a manner that the electron P is emitted from the leading end 39A of the antenna portion α2 in response to incident of the electromagnetic wave W, and emission of electron from the leading end 38A of the antenna portion α2 as well as the antenna portion α1 and the antenna portion α3 is suppressed. In the fourth state, the electric potentials are controlled in such a manner that the electron P is emitted from the leading end 38A of the antenna portion α2 in response to incident of the electromagnetic wave W, and emission of electron from the leading end 39A of the antenna portion α2 as well as the antenna portion α1 and the antenna portion α3 is suppressed.

In the fifth state, the electric potentials are controlled in such a manner that the electron P is emitted from the leading end 96A of the antenna portion α3 in response to incident of the electromagnetic wave W, and emission of electron from the leading end 97A of the antenna portion α3 as well as the antenna portion α1 and the antenna portion α2 is suppressed. In the sixth state, the electric potentials are controlled in such a manner that the electron P is emitted from the leading end 97A of the antenna portion α3 in response to incident of the electromagnetic wave W, and emission of electron from the leading end 96A of the antenna portion α3 as well as the antenna portion α1 and the antenna portion α2 is suppressed.

In the fifth state, the electric potential applied to the pattern 35A is lower than the electric potentials applied to the patterns 31A, 32A, 33A, 34A, and 81A, and is higher than the electric potential applied to the pattern 82A. In other words, the electric potential applied to the linear part 88A configuring the bias portion β3 is higher than the electric potential applied to the linear part 95*b* configuring the antenna portion α3. The electric potential applied to the linear part 86A configuring the bias portion β3 is lower than the electric potential applied to the linear part 95*a* configuring the antenna portion α3. In the fifth state, the component of the electric field from the leading end 96A of the linear part 95*a* configuring the antenna portion α3 toward the linear part 86A configuring the bias portion β3 in the $\gamma_1$-axis direction is negative, and the component of the electric field from the linear part 88A configuring the bias portion β3 toward the leading end 97A of the linear part 95*b* configuring the antenna portion α3 in the $\gamma_1$-axis direction is negative.

In the sixth state, the electric potential applied to the pattern 35A is lower than the electric potential applied to the patterns 31A, 32A, 33A, 34A, and 82A, and is higher than the electric potential applied to the pattern 81A. In other words, the electric potential applied to the linear part 88A configuring the bias portion β3 is lower than the electric potential applied to the linear part 95*b* configuring the antenna portion α3. The electric potential applied to the linear part 86A configuring the bias portion β3 is higher than the electric potential applied to the linear part 95*a* configuring the antenna portion α3. In the sixth state, the component of the electric field from the leading end 97A of the linear part 95*b* configuring the antenna portion α3 toward the linear part 88A configuring the bias portion β3 in the $\gamma_1$-axis direction is positive, and the component of the electric field from the linear part 86A configuring the bias portion β3 toward the leading end 96A of the linear part 95*a* configuring the antenna portion α3 in the $\gamma_1$-axis direction is positive.

In the present modification, the computing unit 75 computes the polarization information of the electric field strength of the electromagnetic wave W entering the electron emitter 20, based on the results of detection of the electron collecting unit 50 in the first state, the second state, the third state, the fourth state, the fifth state, and the sixth state. For example, the computing unit 75 computes the first information, the second information, the third information, and the fourth information in the same manner as the above-described embodiment. The computing unit 75 computes fifth information relating to a negative component in the $\gamma_1$-axis direction of the electric field strength of the electromagnetic wave W, based on the result of detection of the electron collecting unit 50 in the fifth state. The computing unit 75 computes sixth information relating to a positive component in the $\gamma_1$-axis direction of the electric field strength of the electromagnetic wave W, based on the result of detection of the electron collecting unit 50 in the sixth state. The computing unit 75 computes the polarization information of the electric field strength of the electromagnetic wave W entering the electron emitter 20, based on the first information, the second information, the third information, the fourth information, the fifth information, and the sixth information.

The computing unit 75 computes the electric field strength of the Z-axis directional component in the electromagnetic wave W entering the electron emitter 20, based on the results of detection of the electron collecting unit 50 in the first state and the second state, in the same manner as the above-described embodiment. The computing unit 75 determines the polarity in the Z-axis direction for the electric field strength of the electromagnetic wave W entering the electron emitter 20, based on the results of detection of the electron collecting unit 50 in the first state and the second state. The computing unit 75 computes the electric field strength of the Y-axis directional component in the electromagnetic wave W entering the electron emitter 20, based on the results of detection of the electron collecting unit 50 in the third state and the fourth state, in the same manner as the above-described embodiment. The computing unit 75 determines the polarity in the Y-axis direction for the electric field strength of the electromagnetic wave W entering the electron emitter 20, based on the results of detection of the electron collecting unit 50 in the third state and the fourth state. The computing unit 75 computes the electric field strength of the $\gamma_1$-axis directional component in the electromagnetic wave W entering the electron emitter 20, based on the results of detection of the electron collecting unit 50 in the fifth state and the sixth state. The computing unit 75 determines the polarity in the $\gamma_1$-axis direction for the electric field strength of the electromagnetic wave W entering the electron emitter 20, based on the results of detection of the electron collecting unit 50 in the fifth state and the sixth state. For example, the computing unit 75 determines the polarity of the electric field in the Y-axis direction by comparing the result of detection of the electron collecting unit 50 in the fifth state with the result of detection of the electron collecting unit 50 in the sixth state. The computing unit 75 computes the polarization information of the electromagnetic wave W entering the electron emitter 20, based on the electric field strength of the Z-axis directional component, the electric field strength of the Y-axis directional component, and the electric field strength of the y-axis directional component. For example, the computing unit 75 determines which of linear polarization, circular polarization, and elliptic polarization the electromagnetic wave entering the electron emitter 20 is by comparing the electric field strength of the Z-axis directional component, the electric field strength of the Y-axis directional component, and the electric field strength of the y-axis directional component. The computing unit 75 determines the polarization direction of the electromagnetic wave W entering the electron emitter 20.

Figure 9:
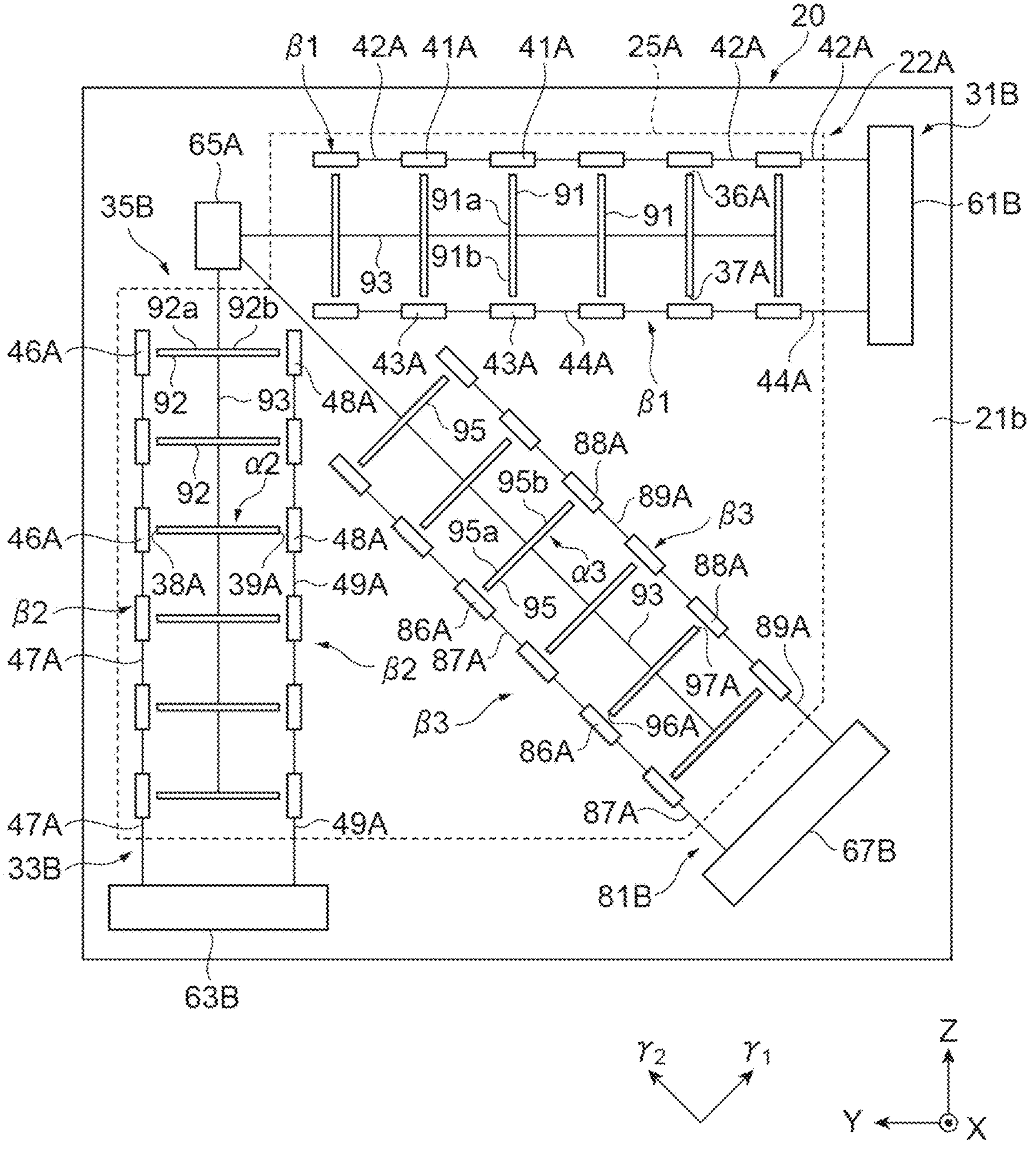
FIG. 9 is a plan view of an electron emitter according to a modification of the present embodiment.

Next, another modification of the electron emitter will be described with reference to FIG. 9. FIG. 9 is a plan view of an electron emitter according to a modification of the present embodiment. The present modification is generally similar to or same as the above-described embodiment and the modification illustrated in FIG. 8. The electron emitter 20 in the present modification is different from that of the modification illustrated in FIG. 8 in that only one electrode is connected to each of the bias portions $\beta$1, $\beta$2, and $\beta$3. Hereinafter, the differences from the modification illustrated in FIG. 8 will be mainly described.

The electron emitter 20 illustrated in FIG. 9 is further provided with a plurality of electrodes 61B, 63B, 65A, and 67B which are spaced away from each other. The plurality of electrodes 61B, 63B, 65A, and 67B are provided on the principal surface 21*b* of the supporting body 21. The plurality of electrodes 61B, 63B, 65A, and 67B are electrically connected to the photoelectric conversion unit 25A. In the present modification, each of the electrodes 61B, 63B, 65A, and 67B is formed into a rectangular shape. Each of the electrodes 61B, 63B, 65A, and 67B may be formed into a linear shape in the same manner as the linear part 42A, 44A, 47A, 49A, 87A, or 89A.

For example, the electrode 61B is included in the pattern 31B. The electrode 61B is electrically connected to the plurality of linear parts 41A via the linear part 42A. The electrode 61B is electrically connected to the plurality of linear parts 43A via the linear part 44A. The electrode 61B may be integrally formed with the linear parts 42A and 44A and the plurality of linear parts 41A and 43A. The electrode 63B is included in the pattern 33B. The electrode 63B is electrically connected to the plurality of linear parts 46A via the linear part 47A. The electrode 63B is electrically connected to the plurality of linear parts 48A via the linear part 49A. The electrode 63B may be integrally formed with the linear parts 47A and 49A and the plurality of linear parts 46A and 48A. The electrode 65A is included in the pattern 35B. The electrode 65A is electrically connected to the plurality of linear parts 91, 92, and 95 via the linear part 93. The electrode 65A may be integrally formed with the linear part 93 and the plurality of linear parts 91, 92, and 95. The electrode 67B is included in the pattern 81B. The electrode 67B is electrically connected to the plurality of linear parts 86A via the linear part 87A. The electrode 67B is electrically connected to the plurality of linear parts 88A via the linear part 89A. The electrode 67B may be integrally formed with the linear parts 87A and 89A and the plurality of linear parts 86A and 88A.

The photoelectric conversion unit 25A is operated by application of electric potentials from the power supply unit 70 via the plurality of electrodes 61B, 63B, 65A, and 67B. The potential application unit 71 of the power supply unit 70 applies the electric potentials to the photoelectric conversion unit 25A via the plurality of electrodes 61B, 63B, 65A, and 67B. The potential control unit 72 of the power supply unit 70 controls the electric potentials applied to the photoelectric conversion unit 25A.

In the photoelectric conversion device 2 provided with the electron emitter 20 in the present modification, the potential control unit 72 switches between the seventh state, the eighth state, and the ninth state by controlling the electric potentials applied to the plurality of patterns 31B, 33B, 35B, and 36B. In the seventh state, the electric potentials are controlled in such a manner that the electron P is emitted from the leading end 36A and the leading end 37A of the antenna portion $\alpha$1 in response to incident of the electromagnetic wave W, and emission of electron from the antenna portion $\alpha$2 and the antenna portion $\alpha$3 is suppressed. In the eighth state, the electric potentials are controlled in such a manner that the electron P is emitted from the leading ends 38A and 39A of the antenna portion $\alpha$2 in response to incident of the electromagnetic wave W, and emission of electron from the antenna portion $\alpha$1 and the antenna portion $\alpha$3 is suppressed. In the ninth state, the electric potentials are controlled in such a manner that the electron P is emitted from the leading ends 96A and 97A of the antenna portion $\alpha$3 in response to incident of the electromagnetic wave W, and emission of electron from the antenna portion $\alpha$1 and the antenna portion $\alpha$2 is suppressed.

In the seventh state, the electric potential applied to the pattern 35B is lower than the electric potential applied to the pattern 31B, and is higher than the electric potentials applied to the patterns 33B and 81B. In other words, the electric potential applied to the bias portion $\beta$1 configured by the linear parts 41A and 43A is higher than the electric potential applied to the antenna portion $\alpha$1 configured by the linear parts 91*a* and 91*b*. In the seventh state, the component of the electric field from the bias portion $\beta$1 configured by the linear part 41A toward the leading end 36A of the linear part 91*a* in the Z-axis direction is negative, and the component of the electric field from the bias portion $\beta$1 configured by the linear part 43A toward the leading end 37A of the linear part 91*b* in the Z-axis direction is positive.

In the eighth state, the electric potential applied to the pattern 35B is lower than the electric potential applied to the pattern 33B, and is higher than the electric potential applied to the patterns 31B and 81B. In other words, the electric potential applied to the bias portion β2 configured by the linear parts 46A and 48A is higher than the electric potential applied to the antenna portion α2 configured by the linear parts 92*a* and 92*b*. In the eighth state, the component of the electric field from the bias portion β2 configured by the linear part 46A toward the leading end 38A of the linear part 92*a* in the Y-axis direction is negative, and the component of the electric field from the bias portion β2 configured by the linear part 48A toward the leading end 39A of the linear part 92*b* in the Y-axis direction is positive.

In the ninth state, the electric potential applied to the pattern 35B is lower than the electric potential applied to the pattern 81B, and is higher than the electric potentials applied to the patterns 31B and 33B. In other words, the electric potential applied to the bias portion β3 configured by the linear parts 86A and 88A is higher than the electric potential applied to the antenna portion α3 configured by the linear parts 95*a* and 95*b*. In the ninth state, the component of the electric field from the bias portion β3 configured by the linear part 86A toward the leading end 96A of the linear part 95*a* in the $\gamma_1$-axis direction is positive, and the component of the electric field from the bias portion β3 configured by the linear part 88A toward the leading end 97A of the linear part 95*b* in the $\gamma_1$-axis direction is negative.

In the present modification, the computing unit 75 computes the electric field strength of the Z-axis directional component in the electromagnetic wave W entering the electron emitter 20, based on the result of detection of the electron collecting unit 50 in the seventh state. The computing unit 75 computes the electric field strength of the Y-axis directional component in the electromagnetic wave W entering the electron emitter 20, based on the result of detection of the electron collecting unit 50 in the eighth state. The computing unit 75 computes the electric field strength of the $\gamma_1$-axis directional component in the electromagnetic wave W entering the electron emitter 20, based on the result of detection of the electron collecting unit 50 in the ninth state. The computing unit 75 computes the polarization information of the electromagnetic wave W entering the electron emitter 20, based on the electric field strength of the Z-axis directional component, the electric field strength of the Y-axis directional component, and the electric field strength of the $\gamma_1$-axis directional component. For example, the computing unit 75 determines which of circular polarization and elliptic polarization the electromagnetic wave W entering the electron emitter 20 is by comparing the electric field strength of the Z-axis directional component, the electric field strength of the Y-axis directional component, and the electric field strength of the $\gamma_1$-axis directional component.

Figure 10A:
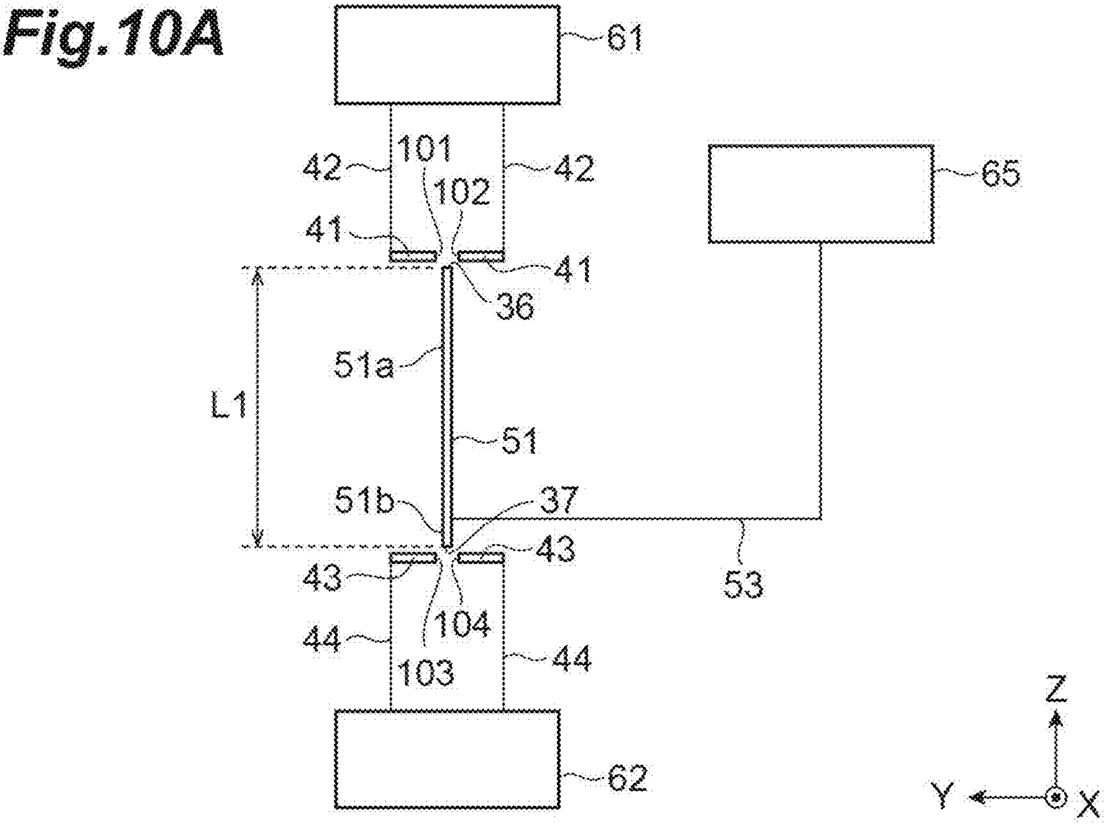
FIG. 10A is a view illustrating a structure of a pattern according to a modification of the present embodiment.
Figure 10B:
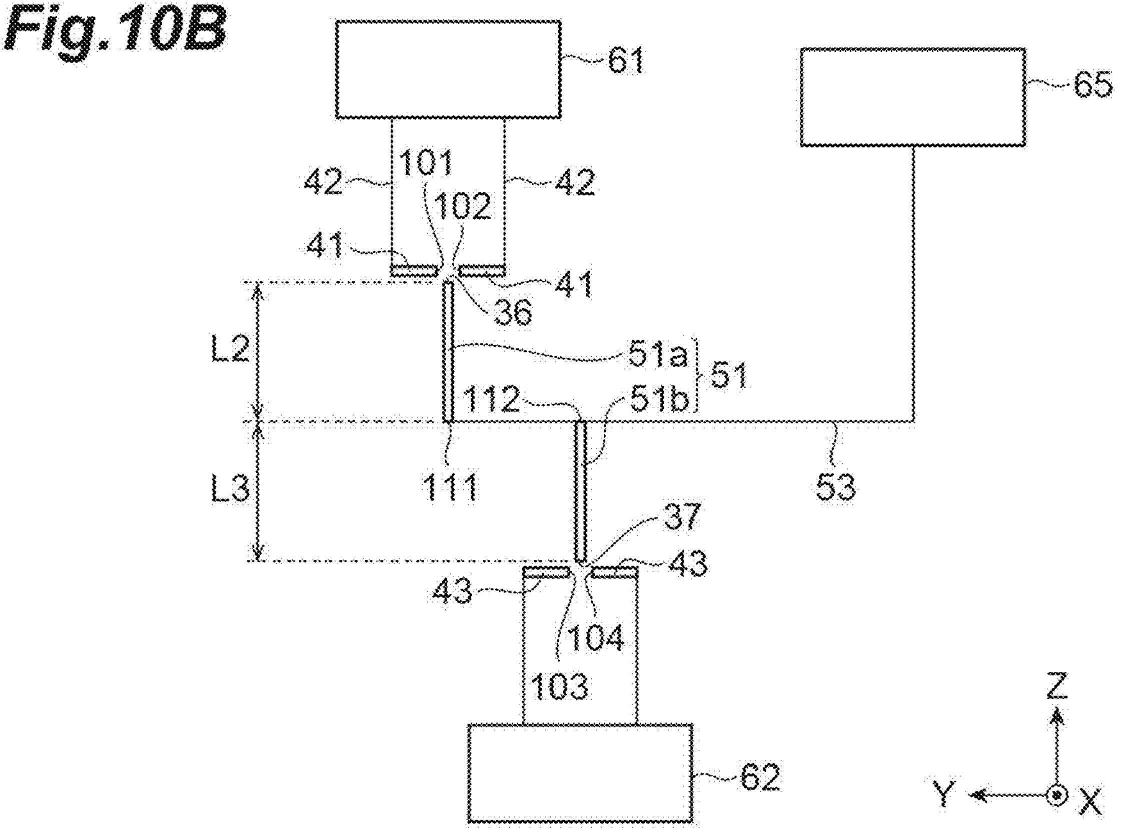
FIG. 10B is a view illustrating a structure of a pattern according to a modification of the present embodiment.

Next, the structure of the pattern according to yet another modification of the present embodiment will be described in detail with reference to FIGS. 10A and 10B. FIGS. 10A and 10B are views illustrating the structure of the pattern according to yet another modification of the present embodiment. FIGS. 10A and 10B illustrate some a part of the patterns 31, 32, and 35. FIGS. 10A and 10B illustrate modifications of the structure relating to the linear parts 41 and 44 configuring the bias portion β1 and the linear part 51 configuring the antenna portion α1 as an example of the configuration of the bias portion and the antenna portion. However, the same configuration may be applied to the bias portions β2 and β3 and the antenna portions α2 and α3.

In the examples illustrated in FIGS. 10A and 10B, a pair of linear parts 41 separated from each other face the linear part 51. The pair of linear parts 41 include a leading end 101 and a leading end 102, respectively. The leading end 101 and the leading end 102 of the pair of linear parts 41 face each other. Each of the linear parts 41 is electrically connected to the electrode 61 via the linear part 42, in the same manner as the above-described embodiment. The pair of linear parts 41 are positioned on the same line extending in the Y-axis direction.

In the examples illustrated in FIGS. 10A and 10B, a pair of linear parts 43 separated from each other face the linear part 51. The pair of linear parts 43 include a leading end 103 and a leading end 104, respectively. The leading end 103 and the leading end 104 of the pair of linear parts 43 face each other. Each of the linear parts 43 is electrically connected to the electrode 62 via the linear part 44, in the same manner as the above-described embodiment. The pair of linear parts 43 are positioned on the same line extending in the Y-axis direction.

In the examples illustrated in FIGS. 10A and 10B, the linear part 51 extends in a +Z-axis direction and a-Z-axis direction from a portion connected to the linear part 53. The linear part 51 includes a pair of linear parts 51*a* and 51*b*, in the same manner as the above-described embodiment. The linear part 51*a* extends in a +Z-axis direction from a portion connected to the linear part 53. The linear part 51*b* extends in a −Z-axis direction from a portion connected to the linear part 53.

The leading end 36 of the linear part 51*a* faces the leading end 101 and the leading end 102. In the Z-axis direction, the leading end 36 of the linear part 51 is positioned between the leading end 101 and the leading end 102. The shortest distance between the leading end 36 and the leading end 101 is equal to the shortest distance between the leading end 36 and the leading end 102. The distance between the leading end 36 and the leading end 101 in the Y-axis direction is equal to the distance between the leading end 36 and the leading end 102 in the Y-axis direction. The distance between the leading end 36 and the leading end 101 in the Z-axis direction is equal to the distance between the leading end 36 and the leading end 102 in the Z-axis direction. The leading end 101 and the leading end 102 facing the same leading end 36 are included in mutually different linear parts 41.

The leading end 37 of the linear part 51*b* faces the leading end 103 and the leading end 104. In the Z-axis direction, the leading end 37 of the linear part 51 is positioned between the leading end 103 and the leading end 104. The shortest distance between the leading end 37 and the leading end 103 is equal to the shortest distance between the leading end 37 and the leading end 104. The distance between the leading end 37 and the leading end 103 in the Y-axis direction is equal to the distance between the leading end 37 and the leading end 104 in the Y-axis direction. The distance between the leading end 37 and the leading end 103 in the Z-axis direction is equal to the distance between the leading end 37 and the leading end 104 in the Z-axis direction. The leading end 103 and the leading end 104 facing the same leading end 37 are included in mutually different linear parts 43.

In the example illustrated in FIG. 10A, the pair of linear parts 51*a* and 51*b* in the linear part 51 are disposed on the same line extending in the Z-axis direction. In the example illustrated in FIG. 10B, the pair of linear parts 51*a* and 51*b* in the linear part 51 are spaced away from each other and are disposed on lines different from each other extending in the Z-axis direction. In the example illustrated in FIG. 10B, the linear part 51*a* is connected to the linear part 53 at the leading end 111 in an opposite side to the leading end 36, and the linear part 51*b* is connected to the linear part 53 at the leading end 112 in an opposite side to the leading end 37.

In the same manner as the embodiment described above, the length of the linear part 51 in the Z-axis direction is designed according to a desired wavelength region emitting the electron P from the photoelectric conversion unit 25. In the example illustrated in FIG. 10A, the linear part 51 has a length which is half the length of a center wavelength in the desired wavelength region. Therefore, in the example illustrated in FIG. 10A, a length L1 from the leading end 36 to the leading end 37 in the Z-axis direction is a length which is half the length of a center wavelength in the desired wavelength region. In a case where the electromagnetic wave W having transmitted the supporting body 21 enters the linear part 51, a refractive index of the supporting body 21 through which the electromagnetic wave has passed is taken into consideration.

In the example illustrated in FIG. 10B, each of the linear parts 51*a* and 51*b* has a length which is half the length of a center wavelength in the desired wavelength region. Therefore, in the example illustrated in FIG. 10B, a length L2 from the leading end 36 to the leading end 111 and a length L3 from the leading end 37 to the leading end 112 are each in the Z-axis direction is a length which is half the length of a center wavelength in the desired wavelength region. Also in this case, in a case where the electromagnetic wave W having passed the supporting body 21 enters the linear parts 51*a* and 51*b*, a refractive index of the supporting body 21 through which the electromagnetic wave has passed is taken into consideration.

[Photoelectric Conversion Method]

Figure 11:
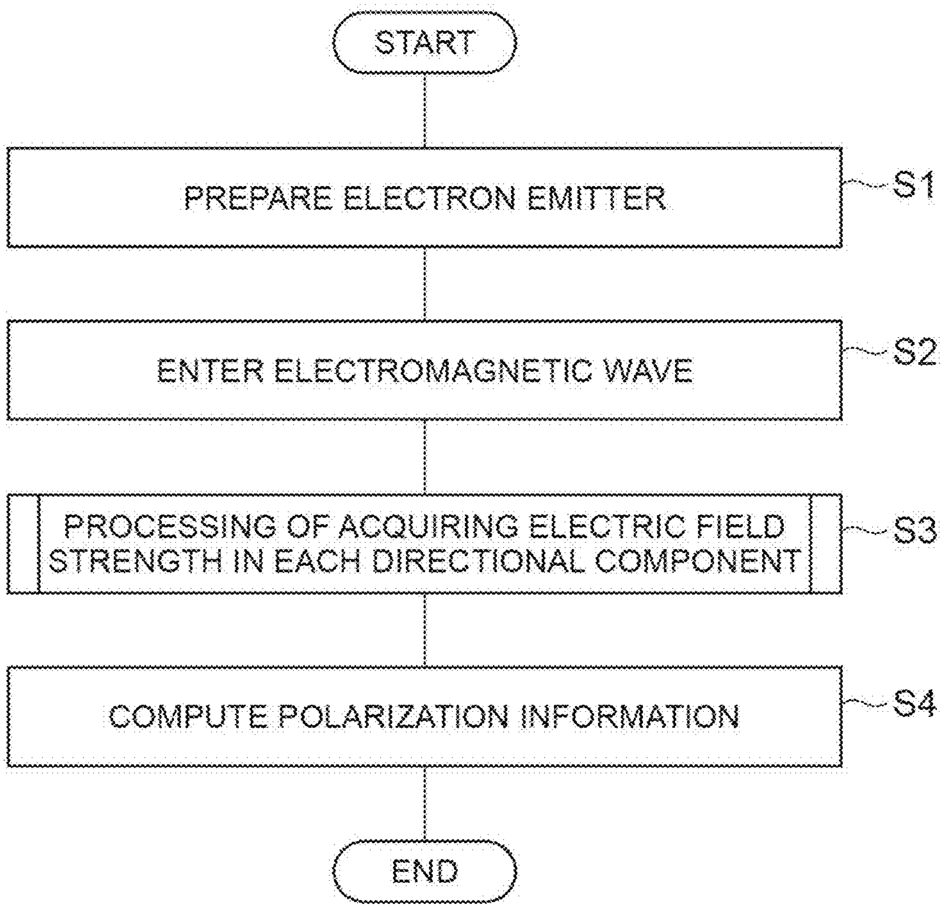
FIG. 11 is a flow chart of an electromagnetic wave detection method.
Figure 12:
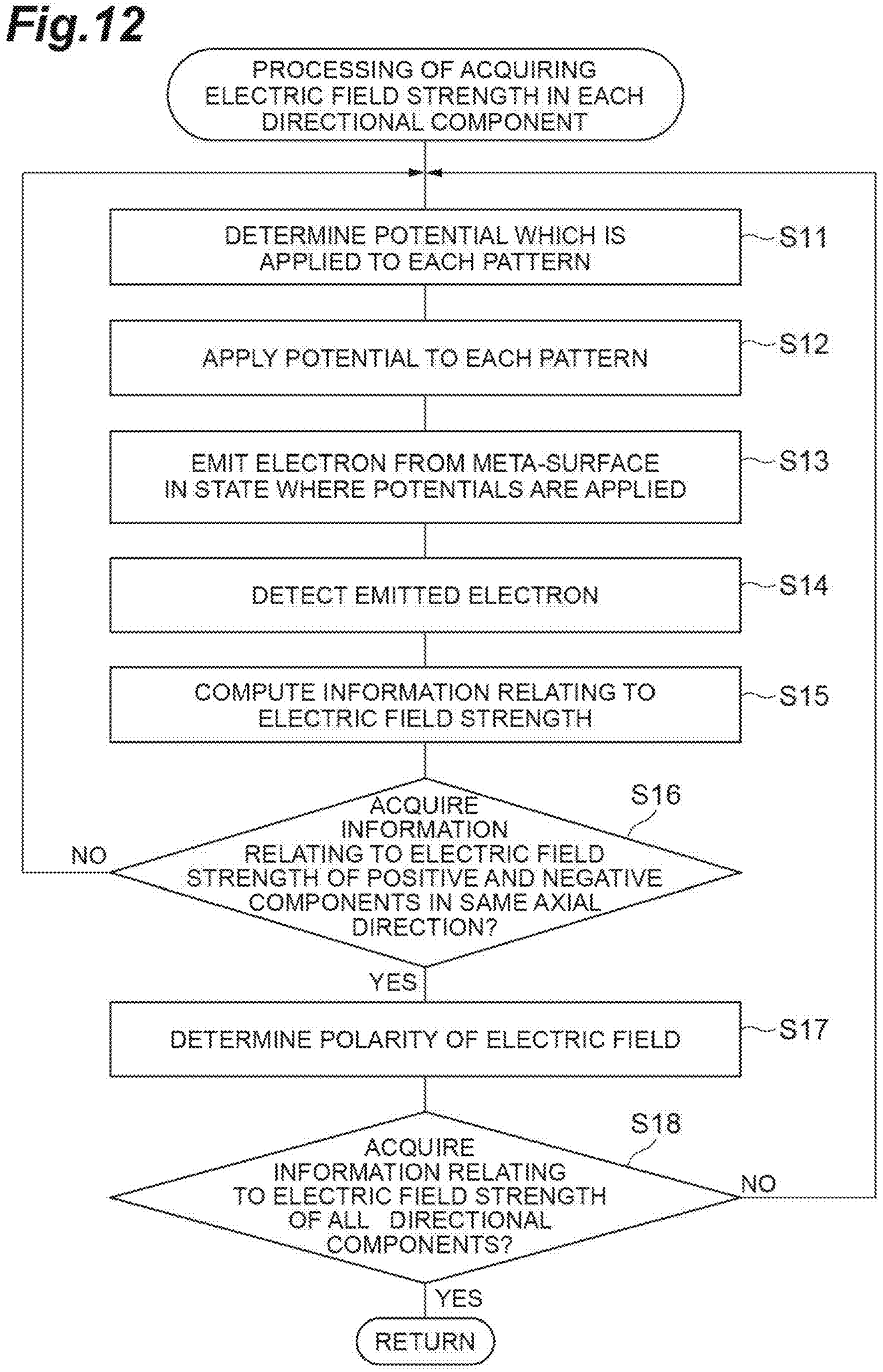
FIG. 12 is a flow chart of an electromagnetic wave detection method.
Figure 13:
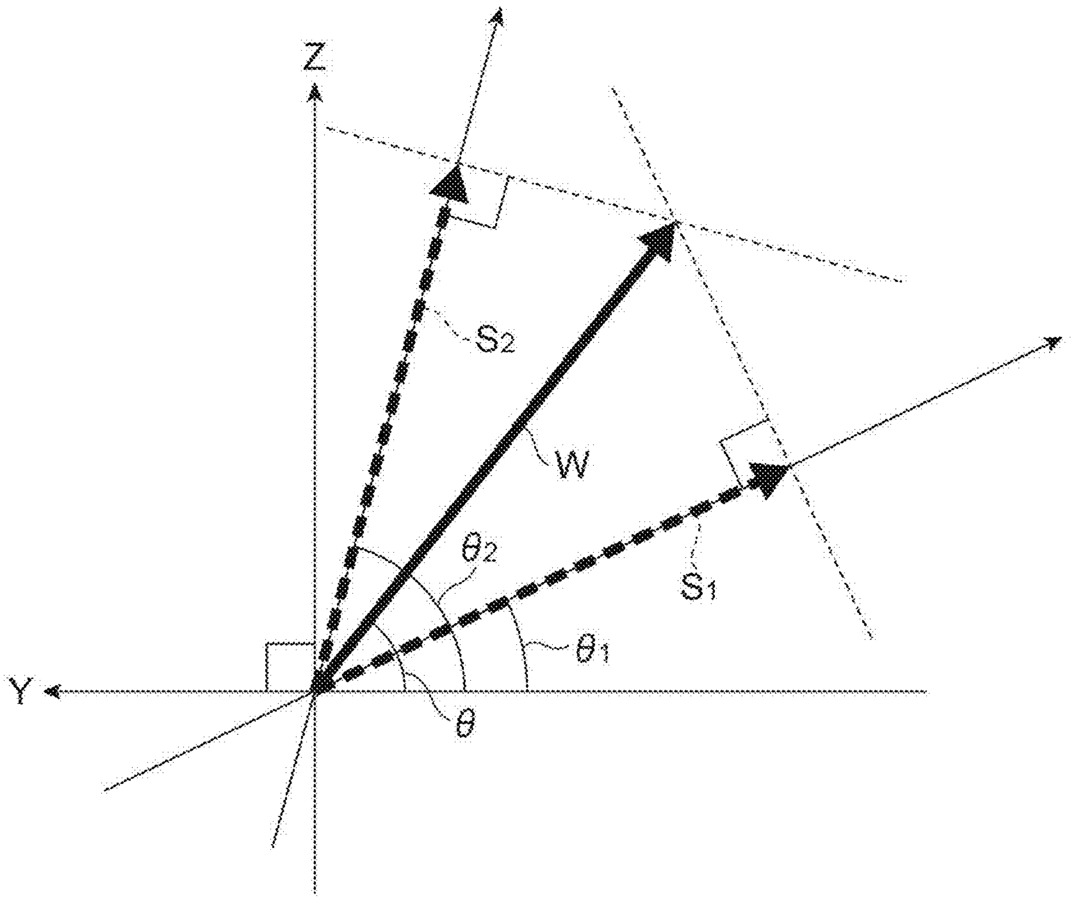
FIG. 13 is a view for describing computing processing according to a modification of the present embodiment.

Next, an electromagnetic wave detection method according to the present embodiment will be described with reference to FIGS. 11 and 12. The electromagnetic wave detection method includes a photoelectric conversion method emitting an electron in response to an entered electromagnetic wave W. FIGS. 11 and 12 are flow charts of the electromagnetic wave detection method according to the present embodiment. In the electromagnetic wave detection method illustrated in FIGS. 11 and 12, an electron P is emitted from a meta-surface 22 at different timings for each directional component of an electric field strength of an electromagnetic wave W entering the electron emitter 20 by controlling a state of electric potentials applied to the meta-surface 22. As a result, the electric field strength of the electromagnetic wave W entering the electron emitter 20 is measured for each directional component. In the configuration illustrated in FIGS. 3 and 8, the electron P is emitted from the meta-surface 22 at different timings for each polarity of each directional component of the electric field strength of the electromagnetic wave W entering the electron emitter 20 by controlling the state of electric potentials applied to the meta-surface 22. As a result, the electric field strength of the electromagnetic wave W entering the electron emitter 20 is measured for each polarity of each directional component.

An outline of the electromagnetic wave detection method according to the present embodiment will be described with reference to FIG. 11. First, an electron emitter 20 is prepared (process S1). For example, an electromagnetic wave detection device 1 with the electron emitter 20 is disposed.

Next, an electromagnetic wave W to be measured enters the electron emitter 20 (process S2). In the present embodiment, in the process S2, the application of the electromagnetic wave W to the electron emitter 20 is started, and the application of the electromagnetic wave W to the electron emitter 20 is continued until the detection of the electromagnetic wave W is finished.

Next, the process of acquiring the electric field strength in each directional component is executed (process S3). In the process S3, the computing unit 75 computes the electric field strength of each directional component.

Next, the polarization information of the electromagnetic wave W entering the electron emitter 20 is computed (process S4). In the process S4, the computing unit 75 computes the polarization information of the electromagnetic wave W entering the electron emitter 20. For example, the computing unit 75 compares the information relating to the electric field strength of each of the directional component acquired in the process S3, and computes the polarization information of the electromagnetic wave W entering the electron emitter 20. For example, the computing unit 75 compares the computed electric field strength of each directional component and outputs the polarization direction of the electromagnetic wave W entering the electron emitter 20.

Next, the process S3 will be described in detail with reference to FIG. 12. FIG. 12 illustrates the flow of the processing of acquiring the electric field strength in each directional component.

First, the electric potential applied to each of the patterns is determined (process S11). In the present embodiment, the potential control unit 72 determines the electric potential applied to each of the patterns 31, 32, 33, 34, and 35 so as to bring into any one of the first state, the second state, the third state, and the fourth state. For example, in the case of the configuration illustrated in FIG. 8, the potential control unit 72 determines the electric potential applied to each of the patterns 31A, 32A, 33A, 34A, 35A, 81A, and 82A so as to bring into any one of the first state to the sixth state.

Next, an electric potential is applied to each of the patterns (process S12). For example, the potential application unit 71 applies an electric potential to each of the patterns via an electrode in accordance with an instruction from the potential control unit 72. For example, the potential application unit 71 applies the electric potential determined in the immediately preceding process S11 to each of the patterns 31, 32, 33, 34, and 35. The potential application unit 71 applies the electric potential determined in the immediately preceding process S11 to each of the patterns at least until the process S13 and the process S14 are finished.

Next, an electron is emitted from the meta-surface in a state where an electric potential is applied to each of the patterns (process S13). For example, when the electromagnetic wave W to be measured enters the meta-surface 22 in a state where the electric potential determined in the immediately preceding process S11 is applied to each of the patterns 31, 32, 33, 34, and 35, the electron emitter 20 emits the electron P from the leading end of any one of the antenna portion α1 and the antenna portion α2. Which leading end of the antenna portion α1 or the antenna portion α2 the electron P is to be emitted from depends on how the electric potential is applied to each of the patterns in the process S12. For example, if the state of electric potential applied to each of the patterns is the first state, the electron P is emitted from the leading end 37 of the antenna portion α1. If the state of electric potential applied to each of the patterns is the second state, the electron P is emitted from the leading end 36 of the antenna portion α1. If the state of electric potential applied to each of the patterns is the third state, the electron P is emitted from the leading end 39 of the antenna portion α2. If the state of electric potential applied to each of the patterns is the fourth state, the electron P is emitted from the leading end 38 of the antenna portion α2.

For example, in the configuration illustrated in FIG. 8, the electron emitter 20 emits the electron P from the leading end of any one of the antenna portion α1, the antenna portion α2, and the antenna portion α3 in a state where the electric potential determined in the immediately preceding process S11 is applied to each of the patterns 31A, 32A, 33A, 34A, 35A, 81A, and 82A. In this case, if the state of electric potential applied to each of the patterns is the first state, the electron P is emitted from the leading end 37A of the antenna portion α1. If the state of electric potential applied to each of the patterns is the second state, the electron P is emitted from the leading end 36A of the antenna portion α1. If the state of electric potential applied to each of the patterns is the third state, the electron P is emitted from the leading end 39A of the antenna portion α2. If the state of electric potential applied to each of the patterns is the fourth state, the electron P is emitted from the leading end 38A of the antenna portion α2. If the state of electric potential applied to each of the patterns is the fifth state, the electron P is emitted from the leading end 97A of the antenna portion α3. If the state of electric potential applied to each of the patterns is the sixth state, the electron P is emitted from the leading end 96A of the antenna portion α3.

Next, the emitted electron P is detected (process S14). For example, the electron collecting unit 50 collects the electron P emitted in the process S13 and detects the collected electron P. The computing unit 75 acquires a signal output from the electron collecting unit 50.

Next, information relating to the electric field strength is computed (process S15). For example, the computing unit 75 computes information relating to an electric field strength of an electromagnetic wave W, based on the signal acquired from the electron collecting unit 50 in the process S14. For example, if the state of electric potential applied to each of the patterns is the first state in the process S13 and the process S14, the computing unit 75 computes the first information relating to the positive component of the electric field strength of the electromagnetic wave W in the Z-axis direction.

Next, it is determined whether or not information relating to the electric field strength of the positive and negative components in the same axial direction has been acquired (process S16). For example, the computing unit 75 determines whether or not information relating to the electric field strength of both the positive and negative components in the same axial direction has been acquired, regarding the directional component of the electric field strength computed in the immediately preceding process S15. For example, if it is acquired that the information relating to the electric field strength of the positive component in the direction of the Z-axis has been computed in the immediately preceding process S15, the computing unit 75 determines that the information relating to the electric field strength of the negative component in the direction of the Z-axis has not been acquired. For example, if the state of electric potential applied to each of the patterns in the immediately preceding processes S13 and S14 is the first state, the computing unit 75 determines that the information in the second state, i.e., the second information relating to the electric field strength of the negative component in the direction of the Z-axis has not been acquired.

If it is not determined that the information relating to the electric field strength of the positive and negative components in the same axial direction has been acquired, the process returns to the process S11. At this time, in the process S11, the electric potential applied to each of the patterns is determined in such a manner that the information relating to the electric field strength of the polarity having not been acquired is acquired. For example, if it is determined that the first information has been acquired and the second information has not been acquired in the process S16, the potential control unit 72 determines the electric potential applied to each of the patterns 31, 32, 33, 34, and 35 so as to bring into the second state in the process S11. For example, if it is determined that the third information has been acquired and the fourth information has not been acquired in the process S16, the potential control unit 72 determines the electric potential applied to each of the patterns 31, 32, 33, 34, and 35 so as to bring into the fourth state in the process S11.

If it is determined that the information relating to the electric field strength of the positive and negative components has been acquired, the polarity of the electric field is determined (process S17). For example, the computing unit 75 determines the polarity of the electric field of the electromagnetic wave W in the Z-axis direction, based on the first information and the second information. The computing unit 75 determines the polarity of the electric field of the electromagnetic wave W in the Y-axis direction, based on the third information and the fourth information. In the configuration illustrated in FIG. 8, the computing unit 75 determines the polarity of the electric field of the electromagnetic wave W in the $\gamma_1$-axis direction, based on the fifth information and the sixth information. The polarity of the electric field of the electromagnetic wave W is switched, for example, in the order of femtoseconds. Therefore, for example, when the first information and the second information are acquired in the order of femtoseconds, the computing unit 75 outputs, as the polarity of the electric field in the Z-axis direction, the larger of the positive component of the electric field strength of the electromagnetic wave W in the Z-axis direction and the negative component of the electric field strength of the electromagnetic wave W in the Z-axis direction. When the third information and the fourth information are acquired in the order of femtoseconds, the computing unit 75 outputs, as the polarity of the electric field in the Y-axis direction, the larger of the positive component of the electric field strength of the electromagnetic wave W in the Y-axis direction and the negative component of the electric field strength of the electromagnetic wave W in the Y-axis direction. The first information, the second information, the third information and the fourth information may be acquired in the order of picoseconds. The acquisition time of the information depends on the time waveform of the electromagnetic wave W.

When the process S17 is finished, it is determined whether or not information relating to the electric field strength of all the directional components has been acquired (process S18). For example, the computing unit 75 determines whether or not the first and second information relating to the electric field strength of the Z-axis directional component and the third and fourth information relating to the electric field strength of the Y-axis directional component have been acquired. In the configuration illustrated in FIG. 8, the computing unit 75 determines whether or not the first and second information relating to the electric field strength of the Z-axis directional component, the third and fourth information relating to the electric field strength of the Y-axis directional component, and the fifth and sixth information relating to the electric field strength of the Z-axis directional component have been acquired.

If it is not determined that the information relating to the electric field strength of all the directional components has been acquired, the process returns to the process S11. At this time, in the process S11, the electric potential applied to each of the patterns is determined in such a manner that the information relating to the electric field strength of the directional component having not been acquired is acquired. For example, if it is determined that the information relating to the electric field strength of the Y-axis directional component has not been acquired in the process S18, the potential control unit 72 determines the electric potential applied to each of the patterns 31, 32, 33, 34, and 35 so as to bring into the third or fourth state in the process S11. In the configuration illustrated in FIG. 8, for example, if it is determined that the information relating to the electric field strength of the $\gamma_1$-axis directional component has not been acquired in the process S18, the potential control unit 72 determines the electric potential which is applied to each of the patterns 31A, 32A, 33A, 34A, 35A, 81A, and 82A so as to bring into the fifth or sixth state in the process S11.

If it is determined that the information relating to the electric field strength of all the directional components has been acquired, the series of process in the process S3 is finished. The process S11 to the process S17 is repeated until the information relating to the electric field strength of all the directional components is acquired in the process S18. By repeating the process S11 to the process S14, the electron P is emitted in each of the above-mentioned first to fourth states. In the present embodiment, by repeating the process S11 to the process S14, an electric potential is applied to each of the patterns in the order of the first state, the second state, the third state, and the fourth state. In the configuration illustrated in FIG. 8, an electric potential is applied to each of the patterns in the order of the first state, the second state, the third state, the fourth state, the fifth state, and the sixth state by repeating the process S11 to the process S14.

By repeating the process S15, the electron P emitted in each of the first to fourth states is detected. In the configuration illustrated in FIG. 8, the electron P is emitted in each of the above-described first to sixth states by repeating the process S11 to the process S14, and the electron P emitted in each of the first to sixth states is detected by repeating the process S15. By repeating the process S17, the polarity of the electric field in each direction is determined.

The orders from the process S1 to the process S4 and from the process S11 to the process S18 are not limited to the orders illustrated in FIGS. 11 and 12. For example, the process S17 may be performed after the process S18. The process S16 and the process S17 may not be present. If the process S16 is not present, it is determined in the process S18 whether or not information relating to the electric field strength has been acquired in all the states. For example, the incidence of the electromagnetic wave W in the process S2 may be performed only in the process S13 and the process S14.

As mentioned above, in the electromagnetic wave detection method according to the present embodiment, the electron P emitted from the electron emitter 20 is detected in each of the states, and the polarization information of the electromagnetic wave W is computed. For example, the computing unit 75 computes the first information to the fourth information, and computes the polarization information of the electromagnetic wave W entering the electron emitter 20, based on the first information to the fourth information. In the configuration illustrated in FIG. 8, the computing unit 75 computes the first information to the sixth information, and computes the polarization information of the electromagnetic wave W entering the electron emitter 20, based on the first information to the sixth information.

[Operation and Effect]

In the photoelectric conversion device 2, the antenna portion $\alpha$1 and the antenna portion $\alpha$2 extend in the Z-axis direction and the Y-axis direction, which intersect with each other. The bias portion $\beta$1 is configured to generate an electric field having a component in the Z-axis direction between the bias portion $\beta$1 and the antenna portion $\alpha$1. The bias portion $\beta$2 is configured to generate an electric field having a component in the Y-axis direction between the bias portion $\beta$2 and the antenna portion $\alpha$2. According to such a configuration, the antenna portion $\alpha$1 emits the electron P according to the component in the Z-axis direction of the electric field strength of the electromagnetic wave W. The antenna portion $\alpha$2 emits the electron P according to the component in the Y-axis direction of the electric field strength of the electromagnetic wave W. As a result, the electron P emitted according to the component in the Z-axis direction of the electric field strength of the electromagnetic wave W and the electron P emitted according to the component in the Y-axis direction of the electric field strength of the electromagnetic wave W can be detected. For example, according to these detection results, a rate between the component of the electric field strength of the electromagnetic wave W in the Z-axis direction and the component of the electric field strength of the electromagnetic wave W in the Y-axis direction can be computed. With the computed rate, detection of the polarization state of an electromagnetic wave can be easily achieved. The photoelectric conversion device 2 is not required to be cooled.

The photoelectric conversion device 2 further includes the potential control unit 72 controlling electric potentials applied to the meta-surface 22 or the meta-surface 22A. For example, the potential control unit 72 switches between the first state and the second state and switches between the third state and the fourth state by controlling the electric potentials applied to the plurality of patterns 31, 32, 33, 34, and 35 of the meta-surface 22. In this case, when the electromagnetic wave W enters the meta-surface 22 or the meta-surface 22A in the first state, the electron P is emitted from the antenna portion $\alpha$1 according to the positive component of the electric field strength of the entered electromagnetic wave W in the Z-axis direction. When the electromagnetic wave W enters the meta-surface 22 or the meta-surface 22A in the second state, the electron P is emitted from the antenna portion $\alpha$1 according to the negative component of the electric field strength of the entered electromagnetic wave W in the Z-axis direction. When the electromagnetic wave W enters the meta-surface 22 or the meta-surface 22A in the third state, the electron P is emitted from the antenna portion $\alpha$2 according to the positive component of the electric field strength of the entered electromagnetic wave W in the Y-axis direction. When the electromagnetic wave W enters the meta-surface 22 or the meta-surface 22A in the fourth state, the electron P is emitted from the antenna portion $\alpha$2 according to the negative component of the electric field strength of the entered electromagnetic wave W in the Y-axis direction. Therefore, the photoelectric conversion device 2 can achieve measurement of the electric field strength of the electromagnetic wave W for each polarity in the Z-axis direction by detecting the electron P emitted from the meta-surface 22 or the meta-surface 22A in the first state and the second state. In the same manner, measurement of the electric field strength of the electromagnetic wave W for each polarity in the Y-axis direction can be achieved by detecting the electron P emitted from the meta-surface 22 or the meta-surface 22A in the third state and the fourth state. As a result, the detection of the polarization state of the electromagnetic wave W can be achieved more accurately in consideration of the polarity of each directional component.

In the photoelectric conversion device 2, the computing unit 75 determines the polarity of the electric field in each axial direction in the electric field strength of the electromagnetic wave W. Therefore, in addition to the polarization state of the electromagnetic wave W, more detailed information relating to the electromagnetic wave W is acquired. For example, electric field waveform data of the electromagnetic wave W can be acquired.

In the configuration illustrated in FIG. 8, the meta-surface 22A further includes the antenna portion α3 and the bias portion β3. The antenna portion α3 extends in the $\gamma_1$-axis direction intersecting the Y-axis direction and the Z-axis direction, and emits the electron P in response to incidence of the electromagnetic wave W. The bias portion β3 faces the antenna portion α3 and is configured to generate an electric field having a component in the $\gamma_1$-axis direction between the bias portion β3 and the antenna portion α3. According to such a configuration, the antenna portion α3 emits the electron P according to the component in the $\gamma_1$-axis direction of the electric field strength of the electromagnetic wave W. In this case, an electron P emitted according to the component in the $\gamma_1$-axis direction of the electric field strength of the entered electromagnetic wave W can be further detected. Therefore, for example, a rate among the component of the electric field strength of the electromagnetic wave W in the Z-axis direction, the component of the electric field strength of the electromagnetic wave W in the Y-axis direction, and the component of the electric field strength of the electromagnetic wave W in the $\gamma_1$-axis direction can be computed. With the computed rate, detection of the polarization state of an electromagnetic wave W can be more easily achieved by a simpler computing processing. The polarization state of the electromagnetic wave W including circular polarization can be detected.

In the configuration illustrated in FIG. 8, the potential control unit 72 may switch between the first state and the second state, switch between the third state and the fourth state, and switch between the fifth state and the sixth state by controlling the electric potentials applied to the plurality of patterns 31A, 32A, 33A, 34A, 35A, 81A, and 82A of the meta-surface 22A. In this case, the photoelectric conversion device 2 is capable of achieving the measurement of the electric field strength of the electromagnetic wave W for each polarity in the Z-axis direction by detecting the electron P emitted from the meta-surface 22A in the first state and the second state. In the same manner, the photoelectric conversion device 2 is capable of achieving the measurement of the electric field strength of the electromagnetic wave W for each polarity in the Y-axis direction by detecting the electron P emitted from the meta-surface 22A in the third state and the fourth state. Furthermore, the photoelectric conversion device 2 is capable of achieving the measurement of the electric field strength of the electromagnetic wave W for each polarity in the $\gamma_1$-axis direction by detecting the electron P emitted from the meta-surface 22A in the fifth state and the sixth state. As a result, the detection of the polarization state of the electromagnetic wave W can be achieved more accurately in consideration of the polarity of each directional component.

The antenna portion α1 of the meta-surface 22 includes the leading ends 36 and 37 which are disposed at mutually different positions in the Z-axis direction. The bias portion β1 includes the linear parts 41 and 43. The linear part 41 faces the leading end 36 and generates an electric field having a component in the Z-axis direction between the linear part 41 and the leading end 36. The linear part 43 faces the leading end 37 and generates an electric field having a component in the Z-axis direction between the linear part 43 and the leading end 37. The antenna portion α2 includes the leading ends 38 and 39 which are disposed at mutually different positions in the Y-axis direction. The bias portion β2 includes the linear parts 46 and 48. The linear part 46 faces the leading end 38 and generates an electric field having a component in the Y-axis direction between the linear part 46 and the leading end 38. The linear part 48 faces the leading end 39 and generates an electric field having a component in the Y-axis direction between the linear part 48 and the leading end 39. The leading ends 36 and 37, and the linear parts 41 and 43 are disposed in the order of the linear part 43, the leading end 37, the leading end 36, and the linear part 41 in the Z-axis direction. The leading ends 38 and 39, and the linear parts 46 and 48 are disposed in the order of the linear part 48, the leading end 39, the leading end 38, and the linear part 46 in the Y-axis direction. In this case, the measurement of the electric field strength of the electromagnetic wave W entering the electron emitter 20 can be achieved for each polarity in each of the Z-axis direction and the Y-axis direction by detecting the electron P emitted from the meta-surface 22, with a simple configuration. The same operations and effects can be also achieved in the meta-surface 22A.

For example, in the first state, the component of the electric field from the leading end 36 toward the linear part 41 in the Z-axis direction is positive, the component of the electric field from the linear part 43 toward the leading end 37 in the Z-axis direction is positive, the component of the electric field from the leading end 38 toward the linear part 46 in the Y-axis direction is positive, and the component of the electric field from the leading end 39 toward the linear part 48 in the Y-axis direction is negative. In the second state, the component of the electric field from the linear part 41 toward the leading end 36 in the Z-axis direction is negative, the component of the electric field from the leading end 37 toward the linear part 43 in the Z-axis direction is negative, the component of the electric field from the leading end 38 toward the linear part 46 in the Y-axis direction is positive, and the component of the electric field from the leading end 39 toward the linear part 48 in the Y-axis direction is negative. In the third state, the component of the electric field from the leading end 36 toward the linear part 41 in the Z-axis direction is positive, the component of the electric field from the leading end 37 toward the linear part 43 in the Z-axis direction is negative, the component of the electric field from the leading end 38 toward the linear part 46 in the Y-axis direction is positive, and the component of the electric field from the linear part 48 toward the leading end 39 in the Y-axis direction is positive. In the fourth state, the component of the electric field from the leading end 36 toward the linear part 41 in the Z-axis direction is positive, the component of the electric field from the leading end 37 toward the linear part 43 in the Z-axis direction is negative, the component of the electric field from the linear part 46 toward the leading end 38 in the Y-axis direction is negative, and the component of the electric field from the leading end 39 toward the linear part 48 in the Y-axis direction is negative. In this case, when the electromagnetic wave W enters the meta-surface 22 in the first state, the electron P is emitted from the antenna portion α1 according to the positive component in the Z-axis direction of the electric field strength of the electromagnetic wave W, and the emission of electron according to the other component of the electric field strength of the electromagnetic wave W is suppressed. When the electromagnetic wave W enters the meta-surface 22 in the second state, the electron P is emitted from the antenna portion α1 according to the negative component in the Z-axis direction of the electric field strength of the electromagnetic wave W, and the emission of electron according to the other component of the electric field strength of the electromagnetic wave W is suppressed. When the electromagnetic wave W enters the meta-surface 22 in the third state, the electron P is emitted from the antenna portion α2 according to the positive component in the Y-axis direction of the electric field strength of the electromagnetic wave W, and the emission of electron according to the other component of the electric field strength of the electromagnetic wave W is suppressed. When the electromagnetic wave W enters the meta-surface 22 in the fourth state, the electron P is emitted from the antenna portion α2 according to the negative component in the Y-axis direction of the electric field strength of the electromagnetic wave W, and the emission of electron according to the other component of the electric field strength of the electromagnetic wave W is suppressed. Therefore, the measurement for each polarity of each directional component can be achieved more accurately. Furthermore, the detection of the polarization state of the electromagnetic wave W can be achieved more accurately. The same operations and effects can be also achieved in the meta-surface 22A.

For example, in the first state, the electric potential applied to the linear part 41 is lower than the electric potential applied to the antenna portion α1, the electric potential applied to the linear part 43 is higher than the electric potential applied to the antenna portion α1, the electric potential applied to the linear part 46 is lower than the electric potential applied to the antenna portion α2, and the electric potential applied to the linear part 48 is lower than the electric potential applied to the antenna portion α2. In the second state, the electric potential applied to the linear part 41 is higher than the electric potential applied to the antenna portion α1, the electric potential applied to the linear part 43 is lower than the electric potential applied to the antenna portion α1, the electric potential applied to the linear part 46 is lower than the electric potential applied to the antenna portion α2, and the electric potential applied to the linear part 48 is lower than the electric potential applied to the antenna portion α2. In the third state, the electric potential applied to the linear part 41 is lower than the electric potential applied to the antenna portion α1, the electric potential applied to the linear part 43 is lower than the electric potential applied to the antenna portion α1, the electric potential applied to the linear part 46 is lower than the electric potential applied to the antenna portion α2, and the electric potential applied to the linear part 48 is higher than the electric potential applied to the antenna portion α2. In the fourth state, the electric potential applied to the linear part 41 is lower than the electric potential applied to the antenna portion α1, the electric potential applied to the linear part 43 is lower than the electric potential applied to the antenna portion α1, the electric potential applied to the linear part 46 is higher than the electric potential applied to the antenna portion α2, and the electric potential applied to the linear part 48 is lower than the electric potential applied to the antenna portion α2. In this case, an electric potential difference occurs between the leading end 36 and the linear part 41, between the leading end 37 and the linear part 43, between the leading end 38 and the linear part 46, and between the leading end 39 and the linear part 48. Due to this electric potential difference, an electric field is generated as described above. As a result, when the electromagnetic wave W enters the meta-surface 22 in the first state, the electron P is emitted from the antenna portion α1 according to the positive component in the Z-axis direction of the electric field strength of the electromagnetic wave W, and the emission of electron according to the other component of the electric field strength of the electromagnetic wave W is suppressed. When the electromagnetic wave W enters the meta-surface 22 in the second state, the electron P is emitted from the antenna portion α1 according to the negative component in the Z-axis direction of the electric field strength of the electromagnetic wave W, and the emission of electron according to the other component of the electric field strength of the electromagnetic wave W is suppressed. When the electromagnetic wave W enters the meta-surface 22 in the third state, the electron P is emitted from the antenna portion α2 according to the positive component in the Y-axis direction of the electric field strength of the electromagnetic wave W, and the emission of electron according to the other component of the electric field strength of the electromagnetic wave W is suppressed. When the electromagnetic wave W enters the meta-surface 22 in the fourth state, the electron P is emitted from the antenna portion α2 according to the negative component in the Y-axis direction of the electric field strength of the electromagnetic wave W, and the emission of electron according to the other component of the electric field strength of the electromagnetic wave W is suppressed. Therefore, the measurement for each polarity of each directional component can be achieved more accurately. Furthermore, the detection of the polarization state of the electromagnetic wave W can be achieved more accurately. The same operations and effects can be also achieved in the meta-surface 22A.

The photoelectric conversion device 2 is further provided with the housing 10 which is airtightly sealed and has the window unit 11*a* transmitting the electromagnetic wave W. The electron emitter 20 is disposed within the housing 10. In this case, the amount of emission of the electron P in response to incidence of the electromagnetic wave W can be improved by making the housing 10 vacuum or filling the housing 10 with the gas.

The electromagnetic wave detection device 1 is provided with the photoelectric conversion device 2, the electron collecting unit 50 and the computing unit 75. The electron collecting unit 50 detects the electron P emitted from the electron emitter 20. The computing unit 75 computes the polarization information of the electromagnetic wave W, based on the result of detection of the electron collecting unit 50 in the first state, the result of detection of the electron collecting unit 50 in the second state, the result of detection of the electron collecting unit 50 in the third state, and the result of detection of the electron collecting unit 50 in the fourth state. In this case, the electromagnetic wave detection device 1 is capable of easily detecting the polarization state of the electromagnetic wave W. The electromagnetic wave detection device 1 is not required to be cooled.

Although the embodiments and the modifications of the present invention have been described, the present invention is not necessarily limited to the embodiments and the modifications and various changes can be made without departing from the gist thereof.

For example, the configurations of the photoelectric conversion units 25 and 25A can be appropriately combined. One electron emitter 20 may be provided with a plurality of types of photoelectric conversion units.

The disposition of various linear parts in the patterns 31, 32, 33, 34, and 35, the patterns 31A, 32A, 33A, 34A, 35A, 81A, and 82A, and the patterns 31B, 33B, and 81B is not limited to the configuration of the above-described embodiment. As long as the functional relationship between the bias portion and the antenna portion corresponding to each other is held, the number and disposition of the linear parts can be appropriately changed.

For example, one linear part may be configured to serve as both an antenna portion that emits the electron P in response to incidence of the electromagnetic wave W and a bias portion that generates an electric field. For example, the photoelectric conversion unit of the electron emitter 20 may be configured to include a pair of first and second linear parts facing each other and extending in the same direction, and may be configured so as to be capable of switching between a state in which the first linear part functions as an antenna portion and the second linear part functions as a bias portion and a state in which the first linear part functions as a bias portion and the second linear part functions as an antenna portion. Leading ends of the pair of first and second linear parts are disposed so as to face each other. For example, in the first linear part and the second linear part, switching between the state of functioning as an antenna portion and the state of functioning as a bias portion is performed by controlling electric potentials applied to an electrode electrically connected to each of the linear parts. By switching which of the first and second linear parts facing each other to function as an antenna portion, it is possible to detect the electric field strength of the electromagnetic wave W for each polarity of the component in the extending direction of the pair of linear parts.

The antenna portion $\alpha$1 and the antenna portion $\alpha$2 may not be orthogonal to each other. The computing unit 75 may be configured to determine the polarization state, based on the electron P emitted from the antenna portion $\alpha$1 and the antenna portion $\alpha$2 which are not orthogonal to each other.

What is claimed is:

1. A photoelectric conversion device comprising:

an electron emitter including a meta-surface emitting an electron in response to incidence of an electromagnetic wave, wherein the meta-surface includes a first antenna portion extending in a first direction and emitting an electron in response to incidence of the electromagnetic wave, a first bias portion facing the first antenna portion and configured to generate an electric field having a component in the first direction between the first bias portion and the first antenna portion, a second antenna portion extending in a second direction intersecting the first direction and emitting an electron in response to incidence of the electromagnetic wave, and a second bias portion facing the second antenna portion and configured to generate an electric field having a component in the second direction between the second bias portion and the second antenna portion, wherein the first antenna portion includes first and second leading ends which are disposed at mutually different positions in the first direction, the first bias portion includes a first portion facing the first leading end and configured to generate an electric field having a component in the first direction between the first portion and the first leading end, and a second portion facing the second leading end and configured to generate an electric field having a component in the first direction between the second portion and the second leading end, the second antenna portion includes third and fourth leading ends which are disposed at mutually different positions in the second direction the second bias portion includes a third portion facing the third leading end and configured to generate an electric field having a component in the second direction between the third portion and the third leading end, and a fourth portion facing the fourth leading end and configured to generate an electric field having a component in the second direction between the fourth portion and the fourth leading end, in the first direction, the second portion, the second leading end, the first leading end, and the first portion are disposed in this order, and in the second direction, the fourth portion, the fourth leading end, the third leading end, and the third portion are disposed in this order.

2. The photoelectric conversion device according to claim 1 further comprising:

a potential control unit configured to control electric potentials applied to the meta-surface, wherein the potential control unit, by controlling the electric potentials applied to the meta-surface, switches between a first state where a component of an electric field from the first bias portion toward the first antenna portion in the first direction is positive, and a second state where a component of an electric field from the first bias portion toward the first antenna portion in the first direction is negative, and switches between a third state where a component of an electric field from the second bias portion toward the second antenna portion in the second direction is positive, and a fourth state where a component of an electric field from the second bias portion toward the second antenna portion in the second direction is negative.

3. An electromagnetic wave detection device comprising:

the photoelectric conversion device according to claim 2;

a detection unit configured to detect an electron emitted from the electron emitter; and a computing unit configured to compute polarization information of an electromagnetic wave based on a result of detection of the detection unit in the first state, a result of detection of the detection unit in the second state, a result of detection of the detection unit in the third state, and a result of detection of the detection unit in the fourth state.

4. The photoelectric conversion device according to claim 3 further comprising:

a housing configured to be airtightly sealed and have a window unit transmitting an electromagnetic wave therethrough, wherein the electron emitter is disposed within the housing.

5. The photoelectric conversion device according to claim 1 further comprising:

a potential control unit configured to control electric potentials applied to the meta-surface, wherein the potential control unit, by controlling the electric potentials applied to the meta-surface, switches between a first state where a component of an electric field from the first leading end toward the first portion in the first direction is positive, a component of an electric field from the second portion toward the second leading end in the first direction is positive, a component of an electric field from the third leading end toward the third portion in the second direction is positive, and a component of an electric field from the fourth leading end toward the fourth portion in the second direction is negative, and a second state where a component of an electric field from the first portion toward the first leading end in the first direction is negative, a component of an electric field from the second leading end toward the second portion in the first direction is negative, a component of an electric field from the third leading end toward the third portion in the second direction is positive, and a component of an electric field from the fourth leading end toward the fourth portion in the second direction is negative, and switches between a third state where a component of an electric field from the first leading end toward the first portion in the first direction is positive, a component of an electric field from the second leading end toward the second portion in the first direction is negative, a component of an electric field from the third leading end toward the third portion in the second direction is positive, and a component of an electric field from the fourth portion toward the fourth leading end in the second direction is positive, and a fourth state where a component of an electric field from the first leading end toward the first portion in the first direction is positive, a component of an electric field from the second leading end toward the second portion in the first direction is negative, a component of an electric field from the third portion toward the third leading end in the second direction is negative, and a component of an electric field from the fourth leading end toward the fourth portion in the second direction is negative.

6. An electromagnetic wave detection device comprising:

the photoelectric conversion device according to claim 5;

a detection unit configured to detect an electron emitted from the electron emitter; and a computing unit configured to compute polarization information of an electromagnetic wave based on a result of detection of the detection unit in the first state, a result of detection of the detection unit in the second state, a result of detection of the detection unit in the third state, and a result of detection of the detection unit in the fourth state.

7. The electromagnetic wave detection device according to claim 6, wherein the photoelectric conversion device further comprises:

a housing configured to be airtightly sealed and have a window unit transmitting an electromagnetic wave therethrough, wherein the electron emitter is disposed within the housing.

8. The photoelectric conversion device according to claim 1 further comprising:

a potential control unit configured to control electric potentials applied to the meta-surface, wherein the potential control unit, by controlling the electric potentials applied to the meta-surface, switches between a first state where an electric potential applied to the first portion is lower than an electric potential applied to the first antenna portion, an electric potential applied to the second portion is higher than the electric potential applied to the first antenna portion, an electric potential applied to the third portion is lower than an electric potential applied to the second antenna portion, and an electric potential applied to the fourth portion is lower than the electric potential applied to the second antenna portion, and a second state where the electric potential applied to the first portion is higher than the electric potential applied to the first antenna portion, the electric potential applied to the second portion is lower than the electric potential applied to the first antenna portion, an electric potential applied to the third portion is lower than the electric potential applied to the second antenna portion, and the electric potential applied to the fourth portion is lower than the electric potential applied to the second antenna portion, and switches between a third state where an electric potential applied to the first portion is lower than the electric potential applied to the first antenna portion, an electric potential applied to the second portion is lower than the electric potential applied to the first antenna portion, an electric potential applied to the third portion is lower than the electric potential applied to the second antenna portion, and an electric potential applied to the fourth portion is higher than the electric potential applied to the second antenna portion, and a fourth state where an electric potential applied to the first portion is lower than the electric potential applied to the first antenna portion, an electric potential applied to the second portion is lower than the electric potential applied to the first antenna portion, an electric potential applied to the third portion is higher than the electric potential applied to the second antenna portion, and an electric potential applied to the fourth portion is lower than the electric potential applied to the second antenna portion.

9. An electromagnetic wave detection device comprising:

the photoelectric conversion device according to claim 8;

a detection unit configured to detect an electron emitted from the electron emitter; and a computing unit configured to compute polarization information of an electromagnetic wave based on a result of detection of the detection unit in the first state, a result of detection of the detection unit in the second state, a result of detection of the detection unit in the third state, and a result of detection of the detection unit in the fourth state.

10. The electromagnetic wave detection device according to claim 9, wherein the photoelectric conversion device further comprises:

a housing configured to be airtightly sealed and have a window unit transmitting an electromagnetic wave therethrough, wherein the electron emitter is disposed within the housing.

11. The photoelectric conversion device according to claim 1, wherein the first direction and the second direction are orthogonal to each other, and the meta-surface further includes a third antenna portion extending in a third direction intersecting the first direction and the second direction and emitting an electron in response to incidence of the electromagnetic wave, and a third bias portion facing the third antenna portion and configured to generate an electric field having a component in the third direction between the third bias portion and the third antenna portion.

12. An electromagnetic wave detection device comprising:

the photoelectric conversion device according to claim 11;

a detection unit configured to detect an electron emitted from the electron emitter; and a computing unit configured to compute polarization information of an electromagnetic wave based on a result of detection of the detection unit in the first state, a result of detection of the detection unit in the second state, a result of detection of the detection unit in the third state, and a result of detection of the detection unit in the fourth state.

13. The electromagnetic wave detection device according to claim 12, wherein the photoelectric conversion device further comprises:

a housing configured to be airtightly sealed and have a window unit transmitting an electromagnetic wave therethrough, wherein the electron emitter is disposed within the housing.

14. A photoelectric conversion device comprising:

an electron emitter including a meta-surface emitting an electron in response to incidence of an electromagnetic wave; and a housing configured to be airtightly sealed and have a window unit transmitting an electromagnetic wave therethrough, wherein the electron emitter is disposed within the housing, and the meta-surface includes a first antenna portion extending in a first direction and emitting an electron in response to incidence of the electromagnetic wave, a first bias portion facing the first antenna portion and configured to generate an electric field having a component in the first direction between the first bias portion and the first antenna portion, a second antenna portion extending in a second direction intersecting the first direction and emitting an electron in response to incidence of the electromagnetic wave, and a second bias portion facing the second antenna portion and configured to generate an electric field having a component in the second direction between the second bias portion and the second antenna portion.

15. A photoelectric conversion method comprising:

a step of using a meta-surface including a first antenna portion extending a first direction, a first bias portion facing the first antenna portion, a second antenna portion extending in a second direction intersecting the first direction, and a second bias portion facing the second antenna portion, and emitting an electron from the first antenna portion in a state where an electric field having a component in the first direction is generated between the first bias portion and the first antenna portion in response to incidence of an electromagnetic wave to be measured on a meta-surface, and a step of using the meta-surface and emitting an electron from the second antenna portion in a state where an electric field having a component in a second direction is generated between the second bias portion and the second antenna portion in response to incidence of an electromagnetic wave to be measured on the meta-surface, wherein the step of emitting an electron from the first antenna portion includes:

a first electron emission step of emitting an electron from the first antenna portion in response to incidence of an electromagnetic wave to be measured on the meta-surface in a first state where electric potentials are applied to the meta-surface in such a manner that a component of an electric field from the first bias portion toward the first antenna portion in the first direction is positive, and a second electron emission step of emitting an electron from the first antenna portion in response to incidence of an electromagnetic wave to be measured on the meta-surface in a second state where electric potentials are applied to the meta-surface in such a manner that a component of an electric field from the first bias portion toward the first antenna portion in the first direction is negative, and the step of emitting an electron from the second antenna portion includes:

a third electron emission step of emitting an electron from the second antenna portion in response to incidence of an electromagnetic wave to be measured on the meta-surface in a third state where electric potentials are applied to the meta-surface in such a manner that a component of an electric field from the second bias portion toward the second antenna portion in the second direction is positive, and a fourth electron emission step of emitting an electron from the second antenna portion in response to incidence of an electromagnetic wave to be measured on the meta-surface in a fourth state where electric potentials are applied to the meta-surface in such a manner that a component of an electric field from the second bias portion toward the second antenna portion in the second direction is negative.

16. The photoelectric conversion method according to claim 15, wherein the first direction and the second direction are orthogonal to each other, the meta-surface further includes a third antenna portion extending in a third direction intersecting the first direction and the second direction, and a third bias portion facing the third antenna portion, and the photoelectric conversion method further includes a step of emitting an electron from the third antenna portion in response to incidence of an electromagnetic wave to be measured on the meta-surface.

17. The photoelectric conversion method according to claim 16, wherein the step of emitting an electron from the first antenna portion includes:

a first electron emission step of emitting an electron from the first antenna portion in response to incidence of an electromagnetic wave to be measured on the meta-surface in a first state where electric potentials are applied to the meta-surface in such a manner that a component of an electric field from the first bias portion toward the first antenna portion in the first direction is positive, and a second electron emission step of emitting an electron from the first antenna portion in response to incidence of an electromagnetic wave to be measured on the meta-surface in a second state where electric potentials are applied to the meta-surface in such a manner that a component of an electric field from the first bias portion toward the first antenna portion in the first direction is negative, the step of emitting an electron from the second antenna portion includes:

a third electron emission step of emitting an electron from the second antenna portion in response to incidence of an electromagnetic wave to be measured on the meta-surface in a third state where electric potentials are applied to the meta-surface in such a manner that a component of an electric field from the second bias portion toward the second antenna portion in the second direction is positive, and a fourth electron emission step of emitting an electron from the second antenna portion in response to incidence of an electromagnetic wave to be measured on the meta-surface in a fourth state where electric potentials are applied to the meta-surface in such a manner that a component of an electric field from the second bias portion toward the second antenna portion in the second direction is negative, and the step of emitting an electron from the third antenna portion includes:

a fifth electron emission step of emitting an electron from the third antenna portion in response to incidence of an electromagnetic wave to be measured on the meta-surface in a fifth state where electric potentials are applied to the meta-surface in such a manner that a component of an electric field from the third bias portion toward the third antenna portion in the third direction is negative, and a sixth electron emission step of emitting an electron from the third antenna portion in response to incidence of an electromagnetic wave to be measured on the meta-surface in a sixth state where electric potentials are applied to the meta-surface in such a manner that a component of an electric field from the third bias portion toward the third antenna portion in the third direction is positive.

18. An electromagnetic wave detection method comprising the photoelectric conversion method according to claim 15 further comprising:

a first detection step of detecting an electron emitted from an electron emitter in the first electron emission step;

a second detection step of detecting an electron emitted from an electron emitter in the second electron emission step;

a third detection step of detecting an electron emitted from an electron emitter in the third electron emission step;

a fourth detection step of detecting an electron emitted from an electron emitter in the fourth electron emission step; and a computing step of computing polarization information of the electromagnetic wave based on results of detection of the first detection step, the second detection step, the third detection step, and the fourth detection step.

* * * * *